United States Patent
Homchaudhuri et al.

(10) Patent No.: US 12,445,944 B2
(45) Date of Patent: Oct. 14, 2025

(54) MIRRORED SPLIT PASSIVE SCANNING

(71) Applicant: QUALCOMM Incorporated, San Diego, CA (US)

(72) Inventors: Sandip Homchaudhuri, San Jose, CA (US); Alireza Raissinia, Monte Sereno, CA (US); Javier Del Prado Pavon, Los Gatos, CA (US); Shuibing Dai, Cupertino, CA (US); Zhao Li, Shanghai (CN); Vikram Phogat, Fremont, CA (US); Prasanna Basaralu Subramanya, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/043,006

(22) PCT Filed: Feb. 23, 2021

(86) PCT No.: PCT/CN2021/077381
§ 371 (c)(1),
(2) Date: Feb. 24, 2023

(87) PCT Pub. No.: WO2022/077826
PCT Pub. Date: Apr. 21, 2022

(65) Prior Publication Data
US 2023/0319691 A1    Oct. 5, 2023

Related U.S. Application Data

(60) Provisional application No. 63/091,917, filed on Oct. 14, 2020.

(51) Int. Cl.
*H04W 48/16* (2009.01)
*H04W 48/12* (2009.01)

(52) U.S. Cl.
CPC .......... *H04W 48/16* (2013.01); *H04W 48/12* (2013.01)

(58) Field of Classification Search
CPC ..... H04W 48/16; H04W 48/12; H04W 8/005; H04W 88/02; H04W 24/02; H04W 84/12; H04W 74/0866
See application file for complete search history.

(56) References Cited

U.S. PATENT DOCUMENTS

| | | | |
|---|---|---|---|
| 12,309,695 B2 * | 5/2025 | Kuppa | ................ H04L 1/1621 |
| 2014/0362420 A1 | 12/2014 | Borges et al. | |
| 2018/0103471 A1 | 4/2018 | Kharia et al. | |

FOREIGN PATENT DOCUMENTS

| | | |
|---|---|---|
| CN | 1860806 A | 11/2006 |
| CN | 104488325 A | 4/2015 |
| CN | 106851784 A | 6/2017 |

OTHER PUBLICATIONS

Shumin C, "Research of an Adaptive Fast Handoff Algorithm in Wireless Local Area Networks", Chinese Master's Theses Full-text Database (Master), Dec. 15, 2013, 62 Pages.

(Continued)

*Primary Examiner* — Diane D Mizrahi
(74) *Attorney, Agent, or Firm* — Holland & Hart LLP/Qualcomm

(57) ABSTRACT

This disclosure provides methods, devices, and systems for performing passive scanning operations on one or more wireless channels. In some implementations, a wireless communication device configures an off-channel scan time and a passive scanning period for passive scanning operations based on latency requirements of a low-latency application, and selects a home channel dwell time for the passive scanning operations. The wireless communication device may perform the passive scanning operation by alternating between listening for beacon frames on one or more second (Continued)

wireless channels for the configured off-channel scan time and dwelling on a home channel for the selected home channel dwell time during a first portion of the configured scanning period. The wireless communication device also may listen for beacon frames on the one or more second wireless channels during a second portion of the configured scanning period that is defined by the selected home channel dwell time.

30 Claims, 26 Drawing Sheets

(56) References Cited

OTHER PUBLICATIONS

Wu H.,et al., "Proactive Scan: Fast Handoff with Smart Triggers for 802.11 Wireless LAN", IEEE Infocom—26th IEEE International Conference on Computer Communications, May 29, 2007, pp. 749-757.
International Search Report and Written Opinion—PCT/CN2021/077381—ISA/EPO—Nov. 9, 2021 (2100119WO1).
Lee H.C., et al., "An Efficient AP Channel Scanning Scheme for Real-Time Streaming Over WLAN" 8th IEEE International Conference on Pervasive Computing and Communications Workshops (Percom Workshops), IEEE, Piscataway, NJ, USA, Mar. 29, 2010, pp. 558-563, XP031679877, ISBN: 978-1-4244-6605-4.
Supplementary European Search Report—EP21878883—Search Authority—Munich—Oct. 22, 2024 (2100119EP).

* cited by examiner

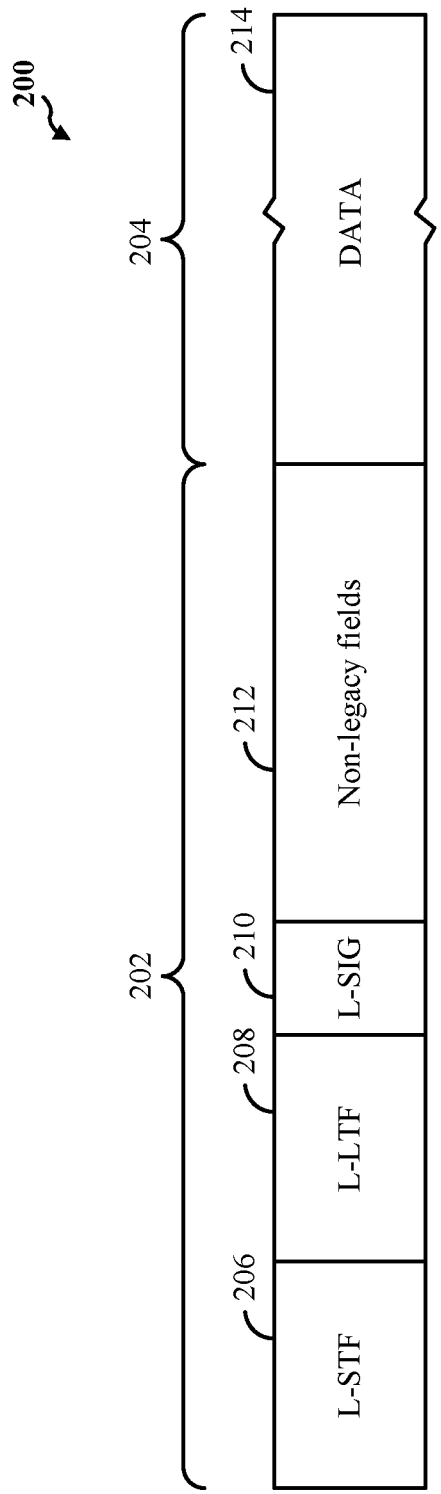
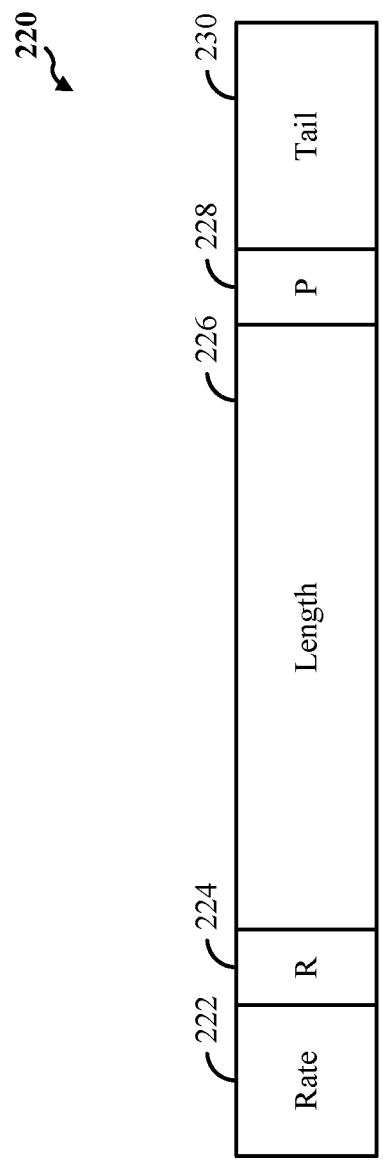
Figure 2A
Figure 2B

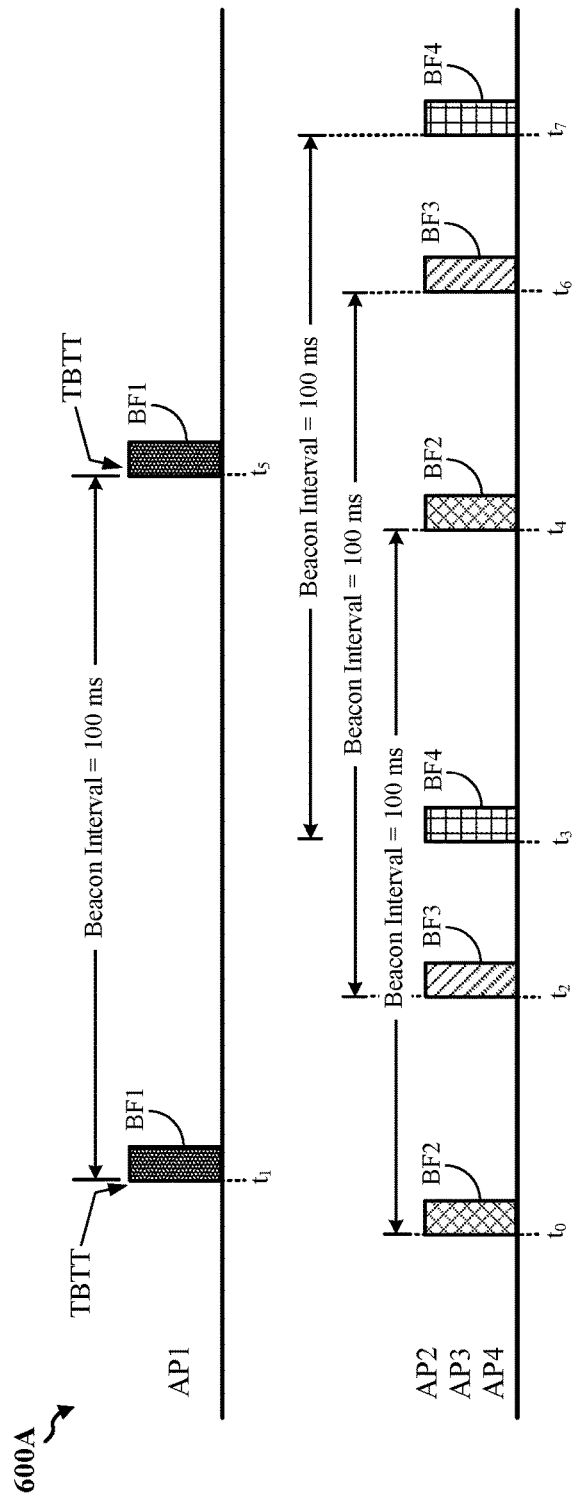
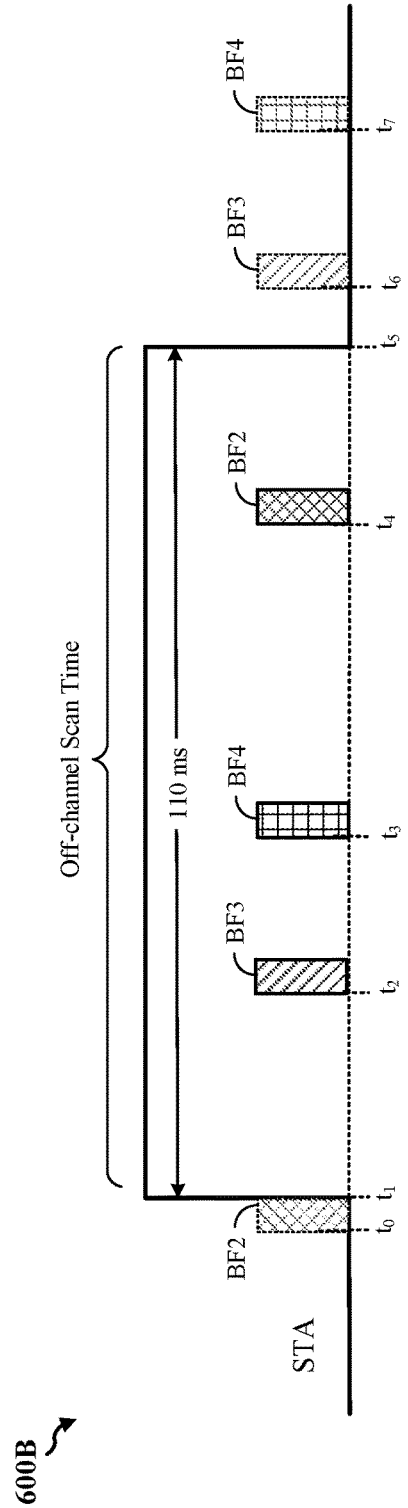

MIRRORED SPLIT PASSIVE SCANNING

CROSS REFERENCE

The present Application is a 371 national stage filing of International PCT Application No. PCT/CN2021/077381 by HOMCHAUDHURI et al. entitled "MIRRORED SPLIT PASSIVE SCANNING," filed Feb. 23, 2021; and claims priority to U.S. Provisional Patent Application No. 63,091,917 by HOMCHAUDHURI et al. entitled "MIRRORED SPLIT PASSIVE SCANNING," filed Oct. 14, 2020, each of which is assigned to the assignee hereof, and each of which is expressly incorporated by reference in its entirety herein.

TECHNICAL FIELD

This disclosure relates generally to wireless communications, and more specifically, to passively scanning one or more wireless channels.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be associated with low-latency traffic having strict end-to-end latency, throughput, and timing requirements. For example, low-latency applications such as (but not limited to) real-time gaming applications, video communications, augmented reality (AR) applications, and virtual reality (VR) applications may specify various latency, throughput, and timing requirements for wireless communication systems that provide connectivity for these applications. It is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a wireless communication device, and may include configuring an off-channel scan time for one or more passive scanning operations to be less than or equal to a maximum off-channel scan duration permitted by a first wireless access point (AP) operating on a first wireless channel. The method may include selecting a home channel dwell time for the one or more passive scanning operations. The method may include configuring a scanning period of the one or more passive scanning operations to be less than or equal to a maximum scanning period permitted by the first AP. The method may include performing the one or more passive scanning operations on one or more corresponding second wireless channels. In some implementations, each of the one or more passive scanning operations may include alternating between listening for beacon frames on a respective second wireless channel for the configured off-channel scan time, and dwelling on the first wireless channel for the selected home channel dwell time during a first portion of the configured scanning period. Each of the one or more passive scanning operations also may include listening for beacon frames on the respective second wireless channel during a second portion of the configured scanning period, the second portion spanning a period of time defined by the selected home channel dwell time. In some implementations, the one or more second wireless channels may be sequentially scanned using a same radio of the wireless communication device. In some other implementations, the one or more second wireless channels may be concurrently scanned using one or more corresponding radios of the wireless communication device.

In some implementations, the maximum off-channel scan duration and the maximum scanning period may be specified by an off-channel scanning procedure associated with the first AP. The first wireless channel may be a home channel associated with an active real-time application that specifies one or more low-latency requirements. In some instances, the one or more second wireless channels may be 16 dynamic frequency selection (DFS) channels in a 5 GHz frequency spectrum. In some other instances, the one or more second wireless channels may be one or more preferred scanning channels (PSCs) in a 6 GHz frequency spectrum. In some aspects, each of the one or more second wireless channels may occupy a unique frequency subband.

In some implementations, alternating between the listening and the dwelling may include passively scanning the respective second wireless channel during a first time period defined by the configured off-channel scan time, dwelling on the first wireless channel during a second time period defined by the selected home channel dwell time, passively scanning the respective second wireless channel during a third time period defined by the configured off-channel scan time, and dwelling on the first wireless channel during a fourth time period defined by the selected home channel dwell time. In some implementations, the listening may include passively scanning the respective second wireless channel during a fifth time period defined by the selected home channel dwell time. In some instances, the fifth time period may be configured to begin one beacon interval after a beginning of the second time period. In some other instances, the fifth time period may be configured for receiving one or more beacon frames over the respective second wireless channel that were missed by the wireless communication device while dwelling on the first wireless channel during the second time period.

In some implementations, the maximum scanning period may be approximately 160 milliseconds (ms), and the maximum off-channel scan time may be approximately 45 ms. In some instances, the configured off-channel scan time may be approximately 40 ms, and the selected home channel dwell time may be approximately 30 ms. In other implementations, the configured off-channel scan time may be approximately 45 ms, and the selected home channel dwell time may be approximately 20 ms. In some other implementations, the configured off-channel scan time may be approximately 47.5 ms, and the selected home channel dwell time may be approximately 15 ms.

Another innovative aspect of the subject matter described in this disclosure can be implemented in a wireless communication device. The wireless communication device may include an interface and a processing system. The processing system may be configured to configure an off-channel scan time for one or more passive scanning operations to be less than or equal to a maximum off-channel scan duration permitted by a first AP operating on a first wireless channel. The processing system also may be configured to select a home channel dwell time for the one or more passive scanning operations, and to configure a scanning period of the one or more passive scanning operations to be less than or equal to a maximum scanning period permitted by the first AP. The interface may be configured to perform the one or more passive scanning operations on one or more corresponding second wireless channels. In some implementations, the interface may be configured to perform each of the one or more passive scanning operations by alternating between listening for beacon frames on a respective second wireless channel for the configured off-channel scan time, and dwelling on the first wireless channel for the selected home channel dwell time during a first portion of the configured scanning period. The interface also may be configured to listen for beacon frames on the respective second wireless channel during a second portion of the configured scanning period, the second portion spanning a period of time defined by the selected home channel dwell time. In some implementations, the one or more second wireless channels may be sequentially scanned using a same radio of the wireless communication device. In some other implementations, the one or more second wireless channels may be concurrently scanned using one or more corresponding radios of the wireless communication device.

In some implementations, the maximum off-channel scan duration and the maximum scanning period may be specified by an off-channel scanning procedure associated with the first AP. The first wireless channel may be a home channel associated with an active real-time application that specifies one or more low-latency requirements. In some instances, the one or more second wireless channels may be 16 DFS channels in a 5 GHz frequency spectrum. In some other instances, the one or more second wireless channels may be one or more PSCs in a 6 GHz frequency spectrum. In some aspects, each of the one or more second wireless channels may occupy a unique frequency subband.

In some other implementations, the interface may be configured to alternate between the listening and the dwelling by passively scanning the respective second wireless channel during a first time period defined by the configured off-channel scan time; dwelling on the first wireless channel during a second time period defined by the selected home channel dwell time, passively scanning the respective second wireless channel during a third time period defined by the configured off-channel scan time, and dwelling on the first wireless channel during a fourth time period defined by the selected home channel dwell time. In some implementations, the interface also may be configured to listen by passively scanning the respective second wireless channel during a fifth time period defined by the selected home channel dwell time. In some instances, the fifth time period may be configured to begin one beacon interval after a beginning of the second time period. In some other instances, the fifth time period may be configured for receiving one or more beacon frames over the respective second wireless channel that were missed by the wireless communication device while dwelling on the first wireless channel during the second time period.

In some implementations, the maximum scanning period may be approximately 160 ms, and the maximum off-channel scan time may be approximately 45 ms. In some instances, the configured off-channel scan time may be approximately 40 ms, and the selected home channel dwell time may be approximately 30 ms. In other implementations, the configured off-channel scan time may be approximately 45 ms, and the selected home channel dwell time may be approximately 20 ms. In some other implementations, the configured off-channel scan time may be approximately 47.5 ms, and the selected home channel dwell time may be approximately 15 ms.

Another innovative aspect of the subject matter described in this disclosure can be implemented as a method for wireless communication. The method may be performed by an apparatus of a wireless communication device, and may include selecting a home channel dwell time for one or more passive scanning operations. The method may include configuring an off-channel scan time for a first passive scanning operation to be less than or equal to a maximum off-channel scan duration permitted by a first AP operating on a first wireless channel. The method may include performing one or more first passive scanning operations on one or more corresponding second wireless channels, each of the one or more first passive scanning operations including alternating between listening for beacon frames on a respective second wireless channel for the configured off-channel scan time. The method may include dwelling on the first wireless channel for the selected home channel dwell time. The method may include performing a second passive scanning operation on each respective second wireless channel, the second passive scanning operation including dwelling on the first wireless channel for the configured off-channel scan time. The method may include listening for beacon frames on the respective second wireless channel for the selected home channel dwell time. In some implementations, the one or more second wireless channels may be sequentially scanned using a same radio of the wireless communication device. In some other implementations, the one or more second wireless channels may be concurrently scanned using one or more corresponding radios of the wireless communication device.

In some implementations, the maximum off-channel scan duration may be specified by an off-channel scanning procedure associated with the first AP. The first wireless channel may be a home channel associated with an active real-time application that specifies one or more low-latency requirements. In some instances, the one or more second wireless channels may be 16 DFS channels in a 5 GHz frequency spectrum. In some other instances, the one or more second wireless channels may be one or more PSCs in a 6 GHz frequency spectrum. In some aspects, each of the one or more second wireless channels may occupy a unique frequency subband.

In some implementations, each of the one or more first passive scanning operations may have a first scanning period of approximately 110 ms, and the second passive scanning operation may have a second scanning period of approximately 70 ms. In some instances, the maximum scanning period may be approximately 160 milliseconds (ms). In some other instances, the configured off-channel scan time may be approximately 40 ms, and the selected home channel dwell time may be approximately 30 ms.

In some implementations, alternating between the listening and the dwelling may include passively scanning the respective second wireless channel during a first time period defined by the configured off-channel scan time, dwelling on the first wireless channel during a second time period defined by the selected home channel dwell time, and passively scanning the respective second wireless channel during a third time period defined by the configured off-channel scan time. In some instances, the second passive scanning operation may be configured to discover one or more beacon frames missed by the wireless communication device while dwelling on the first wireless channel during a respective first passive scanning operation.

In some implementations, performing a respective first passive scanning operation may include receiving a transmission of a first group of beacon frames over the respective second wireless channel during a first time period defined by the configured off-channel scan time, missing a transmission of a second group of beacon frames over the respective second wireless channel during a second time period defined by the selected home channel dwell time, and receiving a transmission of a third group of beacon frames over the respective second wireless channel during a third time period defined by the configured off-channel scan time. The method also may include dwelling on the first wireless channel for a fourth time period defined by the configured off-channel scan time, and receiving a subsequent transmission of the second group of beacon frames over the respective second wireless channel during a fifth time period defined by the selected home channel dwell time.

In some implementations, the method also may include discovering one or more second APs operating on a corresponding second wireless channel during the respective first passive scanning operation, and determining an AP presence level on the corresponding second wireless channel provided by the one or more discovered second APs before performing the second passive scanning operation. In some other implementations, the method may include reporting the one or more discovered APs from a MAC layer of the wireless communication device to an application layer of the wireless communication device before performing the second passive scanning operation. In some instances, the second passive scanning operation may be performed only when the determined AP presence level is less than a value. In some other instances, the method also may include refraining from performing the second passive scanning operation when the determined AP presence level is greater than or equal to the value.

Another innovative aspect of the subject matter described in this disclosure can be implemented in a wireless communication device. The wireless communication device may include an interface and a processing system. The processing system may be configured to select a home channel dwell time for one or more passive scanning operations. The processing system also may configure an off-channel scan time for a first passive scanning operation to be less than or equal to a maximum off-channel scan duration permitted by a first AP operating on a first wireless channel. The interface may be configured to perform one or more first passive scanning operations on one or more corresponding second wireless channels, each of the one or more first passive scanning operations including alternating between listening for beacon frames on a respective second wireless channel for the configured off-channel scan time. The interface may be configured to dwell on the first wireless channel for the selected home channel dwell time. The interface also may be configured to perform a second passive scanning operation on each respective second wireless channel. The interface also may be configured to listen for beacon frames on the respective second wireless channel for the selected home channel dwell time. In some implementations, the one or more second wireless channels may be sequentially scanned using a same radio of the wireless communication device. In some other implementations, the one or more second wireless channels may be concurrently scanned using one or more corresponding radios of the wireless communication device.

In some implementations, the maximum off-channel scan duration may be specified by an off-channel scanning procedure associated with the first AP. The first wireless channel may be a home channel associated with an active real-time application that specifies one or more low-latency requirements. In some instances, the one or more second wireless channels may be 16 DFS channels in a 5 GHz frequency spectrum. In some other instances, the one or more second wireless channels may be one or more PSCs in a 6 GHz frequency spectrum. In some aspects, each of the one or more second wireless channels may occupy a unique frequency subband.

In some implementations, each of the one or more first passive scanning operations may have a first scanning period of approximately 110 ms, and the second passive scanning operation may have a second scanning period of approximately 70 ms. In some instances, the maximum scanning period may be approximately 160 ms. In some other instances, the configured off-channel scan time may be approximately 40 ms, and the selected home channel dwell time may be approximately 30 ms.

In some implementations, the interface may be configured to alternate between the listening and the dwelling by passively scanning the respective second wireless channel during a first time period defined by the configured off-channel scan time, dwelling on the first wireless channel during a second time period defined by the selected home channel dwell time, and passively scanning the respective second wireless channel during a third time period defined by the configured off-channel scan time. In some instances, the second passive scanning operation may be configured to discover one or more beacon frames missed by the wireless communication device while dwelling on the first wireless channel during a respective first passive scanning operation.

In some implementations, the interface may be configured to perform a respective first passive scanning operation by obtaining a transmission of a first group of beacon frames over the respective second wireless channel during a first time period defined by the configured off-channel scan time, missing a transmission of a second group of beacon frames over the respective second wireless channel during a second time period defined by the selected home channel dwell time, and obtaining a transmission of a third group of beacon frames over the respective second wireless channel during a third time period defined by the configured off-channel scan time. The interface also may be configured to dwell on the first wireless channel for a fourth time period defined by the configured off-channel scan time, and to obtain a subsequent transmission of the second group of beacon frames over the respective second wireless channel during a fifth time period defined by the selected home channel dwell time.

In some implementations, the interface also may be configured to discover one or more second APs operating on a corresponding second wireless channel during the respective first passive scanning operation, and to determine an AP presence level on the corresponding second wireless channel provided by the one or more discovered second APs before performing the second passive scanning operation. In some other implementations, the interface also may be configured to report the one or more discovered APs from a MAC layer of the wireless communication device to an application layer of the wireless communication device before performing the second passive scanning operation. In some instances, the second passive scanning operation may be performed only when the determined AP presence level is less than a value. In some other instances, the interface also may be configured to refrain from performing the second passive scanning operation when the determined AP presence level is greater than or equal to the value.

Another innovative aspect of the subject matter described in this disclosure can be implemented as a method for wireless communication. The method may be performed by an apparatus of a wireless communication device, and may include obtaining a home channel dwell time for a first wireless channel. The method may include obtaining an off-channel scan time for passive scanning operations on one or more second wireless channels. The method may include performing a first passive scanning operation on each of the one or more second wireless channels. The method may include performing a second passive scanning operation on each of the one or more second wireless channels. In some instances, the second passive scanning operation may be used to discover one or more beacon frames missed by the wireless communication device while dwelling on the first wireless channel during the first passive scanning operation.

In some implementations, each of the first passive scanning operations may include alternating between dwelling on the first wireless channel for the home channel dwell time and listening for beacon frames on a respective second wireless channel for the off-channel scan time. In some instances, alternating between the dwelling and the listening during the first passive scanning operation may include dwelling on the first wireless channel for a first time period indicated by the home channel dwell time, passively scanning the respective second wireless channel for a second time period indicated by the off-channel scan time, dwelling on the first wireless channel for a third time period indicated by the home channel dwell time, passively scanning the respective second wireless channel for a fourth time period indicated by the off-channel scan time, and dwelling on the first wireless channel for a fifth time period indicated by the home channel dwell time. In some other instances, performing the first passive scanning operation may include receiving a transmission of one or more first beacon frames over the respective second wireless channel while passively scanning the respective second wireless channel. Performing the first passive scanning operation may also include missing a transmission of one or more second beacon frames over the respective second wireless channel while dwelling on the first wireless channel.

In some implementations, each of the second passive scanning operations may include alternating between listening for beacon frames on a respective second wireless channel for the home channel dwell time and dwelling on the first wireless channel for the off-channel scan time. In some instances, alternating between the dwelling and the listening during the second passive scanning operation may include passively scanning the respective second wireless channel for the first time period indicated by the home channel dwell time, dwelling on the first wireless channel for the second time period indicated by the off-channel scan time, passively scanning the respective second wireless channel for the third time period indicated by the home channel dwell time, dwelling on the first wireless channel for the fourth time period indicated by the off-channel scan time, and passively scanning the respective second wireless channel for a fifth time period indicated by the home channel dwell time. In some other instances, alternating between the dwelling and the listening during the second passive scanning operation may include passively scanning the respective second wireless channel for the first time period indicated by the home channel dwell time, dwelling on the first wireless channel for the second time period indicated by the off-channel scan time, passively scanning the respective second wireless channel for the third time period indicated by the home channel dwell time, dwelling on the first wireless channel for the fourth time period indicated by the off-channel scan time, and passively scanning the respective second wireless channel for a fifth time period indicated by the home channel dwell time. In some other instances, performing the second passive scanning operation may include receiving a subsequent transmission of the one or more second beacon frames over the respective second wireless channel while passively scanning the respective second wireless channel for a time period based on the determined home channel dwell time.

In some implementations, the scanning period of the first and second passive scanning operations may be based on a beacon interval of an access point operating on a respective second wireless channel. In some instances, the duration of at least one of the home channel dwell time or the off-channel scan time may be based on one or more of a quality-of-service (QoS), a traffic class, a traffic identifier (TID), or an access category (AC) of low-latency traffic received by or transmitted from the wireless communication device. In some instances, the scanning period of the first and second passive scanning operations is approximately 100 time units (TUs). In some other instances, the home channel dwell time is approximately 20 ms, and the off-channel scan time is approximately 20 ms.

In some instances, the first wireless channel may include a home channel associated with low-latency traffic or low-latency wireless communication devices. In some other instances, the first wireless channel may include a home channel associated with an automotive infotainment system. In some implementations, at least one of the home channel dwell time or the off-channel scan time may be obtained from an application layer of the wireless communication device. In some instances, the one or more second wireless channels include one or more DFS channels in the 5 GHz frequency spectrum. In some other instances, one or more second wireless channels include one or more PSCs in the 6 GHz frequency spectrum. In addition, or in the alternative, each of the one or more second wireless channels may occupy a unique frequency subband and is associated with a different AP.

Another innovative aspect of the subject matter described in this disclosure can be implemented in a wireless communication device. The wireless communication device may include an interface and a processing system. The interface may be configured to obtain a home channel dwell time for a first wireless channel. The interface also may be configured to obtain an off-channel scan time for passive scanning operations on one or more second wireless channels. The processing system may be configured to perform a first passive scanning operation on each of the one or more second wireless channels. The processing system may be configured to perform a second passive scanning operation on each of the one or more second wireless channels. In some instances, the second passive scanning operation may be used to discover one or more beacon frames missed by the wireless communication device while dwelling on the first wireless channel during the first passive scanning operation.

In some implementations, each of the first passive scanning operations may include alternating between dwelling on the first wireless channel for the home channel dwell time and listening for beacon frames on a respective second wireless channel for the off-channel scan time. In some instances, the wireless communication device may alternate between the dwelling and the listening during the first passive scanning operation by dwelling on the first wireless channel for a first time period indicated by the home channel dwell time, passively scanning the respective second wireless channel for a second time period indicated by the off-channel scan time, dwelling on the first wireless channel for a third time period indicated by the home channel dwell time, passively scanning the respective second wireless channel for a fourth time period indicated by the off-channel scan time, and dwelling on the first wireless channel for a fifth time period indicated by the home channel dwell time. In some other instances, performing the first passive scanning operation may include receiving a transmission of one or more first beacon frames over the respective second wireless channel while passively scanning the respective second wireless channel, and missing a transmission of one or more second beacon frames over the respective second wireless channel while dwelling on the first wireless channel.

In some implementations, each of the second passive scanning operations may include alternating between listening for beacon frames on the respective second wireless channel for the home channel dwell time and dwelling on the first wireless channel for the off-channel scan time. In some instances, the wireless communication device may alternate between the dwelling and the listening during the second passive scanning operation by passively scanning the respective second wireless channel for the first time period indicated by the home channel dwell time, dwelling on the first wireless channel for the second time period indicated by the off-channel scan time, passively scanning the respective second wireless channel for the third time period indicated by the home channel dwell time, dwelling on the first wireless channel for the fourth time period indicated by the off-channel scan time, and passively scanning the respective second wireless channel for a fifth time period indicated by the home channel dwell time. In some other instances, the wireless communication device may alternate between the dwelling and the listening during the second passive scanning operation by passively scanning the respective second wireless channel for the first time period indicated by the home channel dwell time, dwelling on the first wireless channel for the second time period indicated by the off-channel scan time, passively scanning the respective second wireless channel for the third time period indicated by the home channel dwell time, dwelling on the first wireless channel for the fourth time period indicated by the off-channel scan time, and passively scanning the respective second wireless channel for a fifth time period indicated by the home channel dwell time. In some other instances, performing the second passive scanning operation may include receiving a subsequent transmission of the one or more second beacon frames over the respective second wireless channel while passively scanning the respective second wireless channel for a time period based on the determined home channel dwell time.

In some implementations, the scanning period of the first and second passive scanning operations may be based on a beacon interval of an access point operating on a respective second wireless channel. In some instances, the duration of at least one of the home channel dwell time or the off-channel scan time may be based on one or more of QoS, a traffic class, a TID, or an AC of low-latency traffic received by or transmitted from the wireless communication device. In some instances, the scanning period of the first and second passive scanning operations is approximately 100 time TUs. In some other instances, the home channel dwell time is approximately 20 ms, and the off-channel scan time is approximately 20 ms.

In some instances, the first wireless channel may include a home channel associated with low-latency traffic or low-latency wireless communication devices. In some other instances, the first wireless channel may include a home channel associated with an automotive infotainment system. In some implementations, at least one of the home channel dwell time or the off-channel scan time may be obtained from an application layer of the wireless communication device. In some instances, the one or more second wireless channels include one or more DFS channels in the 5 GHz frequency spectrum. In some other instances, one or more second wireless channels include one or more PSCs in the 6 GHz frequency spectrum. In addition, or in the alternative, each of the one or more second wireless channels may occupy a unique frequency subband and is associated with a different AP.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

FIG. 2A shows an example protocol data unit (PDU) usable for communications between an access point (AP) and a number of stations (STAs)

FIG. 2B shows an example field in the PDU of FIG. 2A.

FIG. 6A shows a timing diagram illustrating example transmissions of beacon frames.

FIG. 6B shows a timing diagram illustrating an example passive scanning operation.

Like reference numbers and designations in the various drawings indicate like elements.

DETAILED DESCRIPTION

Figure 1:
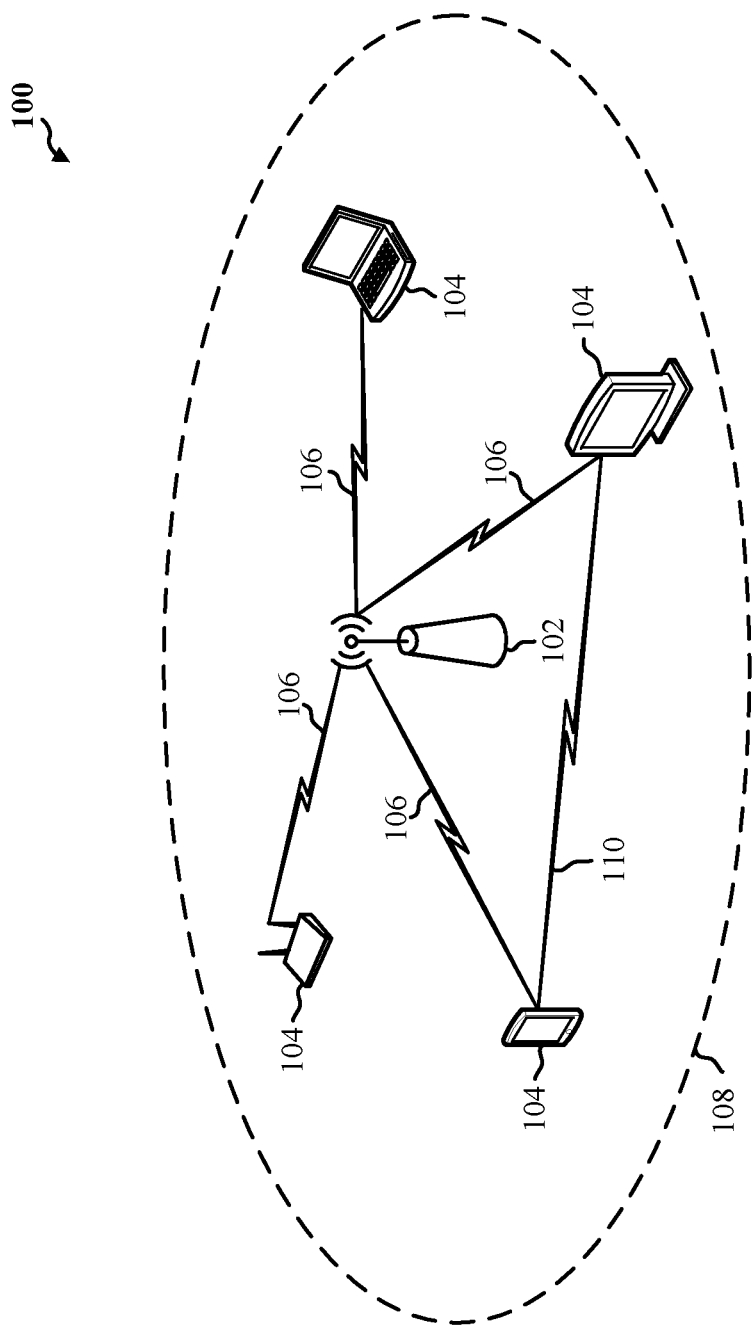
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

A wireless communication device associated with a wireless access point (AP) may periodically perform scanning operations to determine whether there are other nearby APs that can provide better service than the associated AP. For example, as the wireless communication device moves relative to the associated AP, the signal strength and quality of wireless links with the associated AP may be degraded. This may result in reduced throughput, higher latencies, and even termination of wireless links with the associated AP. To prevent this result, one or more amendments to the IEEE 802.11 family of wireless communication standards define a roaming process in which a wireless communication device (such as a STA) can seamlessly transfer communications from one AP to another AP without losing wireless connectivity.

Wireless communication devices that operate in accordance with the IEEE 802.11 family of wireless communication standards may be prohibited from actively scanning wireless channels in the 6 GHz frequency band, particularly on the preferred scanning channels (PSCs) in the 6 GHz frequency band. These wireless communication devices also may be prohibited from actively scanning dynamic frequency selection (DFS) channels in the 5 GHz frequency band to avoid interfering with RADAR signals. Thus, a wireless communication device associated with an AP or an application that may operate on one or more DFS channels in the 5 GHz frequency band or operate in the 6 GHz frequency band may be limited to passive scanning operations to determine whether another nearby AP operating on the same or similar channels can provide better service than the associated AP. For implementations in which the wireless communication device is connected to or otherwise associated with an application having specific latency, throughput, or timing requirements, the use of existing passive scanning techniques to determine whether another AP can provide better service may violate one or more of the specified latency requirements, throughput requirements, or timing requirements due at least in part to an inability of the wireless communication device to dynamically configure parameters of the existing passive scanning techniques.

Implementations of the subject matter described in this disclosure may be used for passive scanning operations in a wireless network associated with low-latency applications or low-latency traffic. In some implementations, a wireless communication device associated with an AP operating on a first wireless channel may configure one or more of a passive scanning period, an off-channel scan time, or a home channel dwell time for passive scanning operations based on one or more of the latency, throughput, or timing requirements specified by the low-latency application (or indicated by the AP). For example, in some instances, the wireless communication device may configure the passive scanning period to be less than or equal to a maximum passive scanning period permitted by the AP or specified by the low-latency application. For another example, the wireless communication device may configure the off-channel scanning time to be less than or equal to a maximum off-channel scanning duration permitted by the AP or specified by the low-latency application.

In some implementations, the wireless communication device may select the home channel dwell time, and passively scan one or more second wireless channels using the configured parameters. In some instances, the wireless communication device may mirror the home channel dwell time to an additional off-channel scanning window during which the wireless communication device passively scans the one or more second wireless channels to receive beacon frames that were missed by the wireless communication device during the home channel dwell time. That is, the wireless communication device may select an off-channel scan time for the additional off-channel scanning window that is of the same or at least similar duration as the home channel dwell window.

In some other implementations, the wireless communication device may obtain a home channel dwell time for a first wireless channel, and may obtain an off-channel scan time for passive scanning operations on one or more second wireless channels. The wireless communication device may perform a first passive scanning operation on each of the one or more second wireless channels, and may perform a second passive scanning operation on each of the one or more second wireless channels. In some instances, the wireless communication device may alternate between dwelling on the first wireless channel for the home channel dwell time and listening for beacon frames on a respective second wireless channel for the off-channel scan time during each of the first passive scanning operations. In some other instances, the wireless communication device may alternate between listening for beacon frames on the respective second wireless channel for the home channel dwell time and dwelling on the first wireless channel for the off-channel scan time during each of the second passive scanning operations.

Particular implementations of the subject matter described in this disclosure can be implemented to realize one or more of the following potential advantages. Existing passive scanning operations may not include a mechanism through which a wireless communication device can dynamically configure a passive scanning operation based on one or more latency, throughput, or timing requirements specified by a low-latency application or indicated by an AP associated with low-latency traffic. As a result, existing passive scanning operations may not be used with certain low-latency applications or traffic without violating one or more of the latency, throughput, or timing requirements specified by a respective low-latency application or traffic. In some implementations, the techniques disclosed herein can be used to configure one or more parameters of a passive scanning operation in a manner that allows the configured passive scanning operation to be used with a variety of low-latency applications having different latency, throughput, or timing requirements. In this way, implementations of the subject matter disclosed herein may allow wireless communication devices to passively scan for nearby APs while meeting the latency, throughput, and timing requirements of one or more low-latency applications.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204 after the preamble, for example, in the form of a PSDU including a data field 214. For example, the PHY preamble 202 may include a legacy portion that itself includes a legacy short training field (L-STF) 206, a legacy long training field (L-LTF) 208, and a legacy signaling field (L-SIG) 210. The PHY preamble 202 also may include a non-legacy portion including one or more non-legacy fields 212. The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

FIG. 2B shows an example L-SIG field 220 in the PDU of FIG. 2A. The L-SIG 220 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (µs).

Figure 3A:
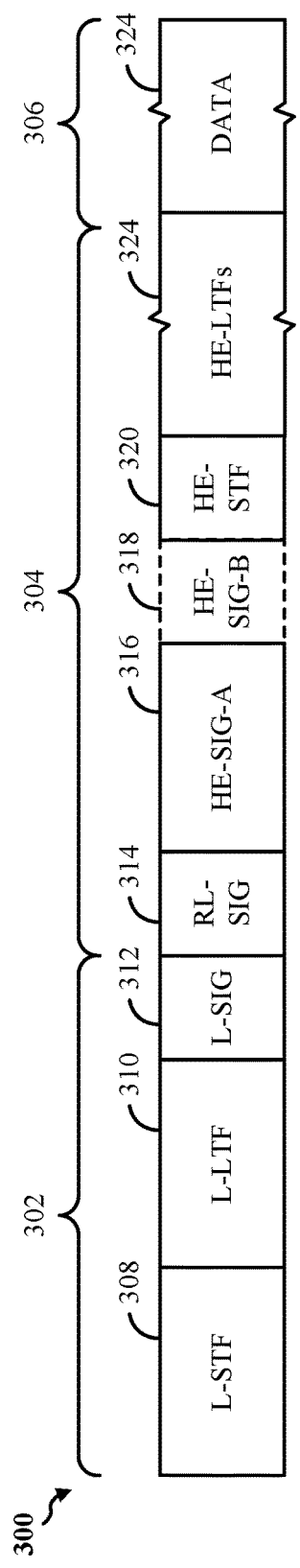
FIG. 3A shows an example physical layer (PHY) preamble usable for communications between an AP and each of a number of STAs.

FIG. 3A shows an example PHY preamble 300 usable for wireless communication between an AP and one or more STAs. The PHY preamble 300 may be used for SU, OFDMA or MU-MIMO transmissions. The PHY preamble 300 may be formatted as a High Efficiency (HE) WLAN PHY preamble in accordance with the IEEE 802.11ax amendment to the IEEE 802.11 wireless communication protocol standard. The PHY preamble 300 includes a legacy portion 302 and a non-legacy portion 304. The PHY preamble 300 may be followed by a PHY payload 306, for example, in the form of a PSDU including a data field 324.

The legacy portion 302 of the PHY preamble 300 includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU carrying the PHY preamble 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
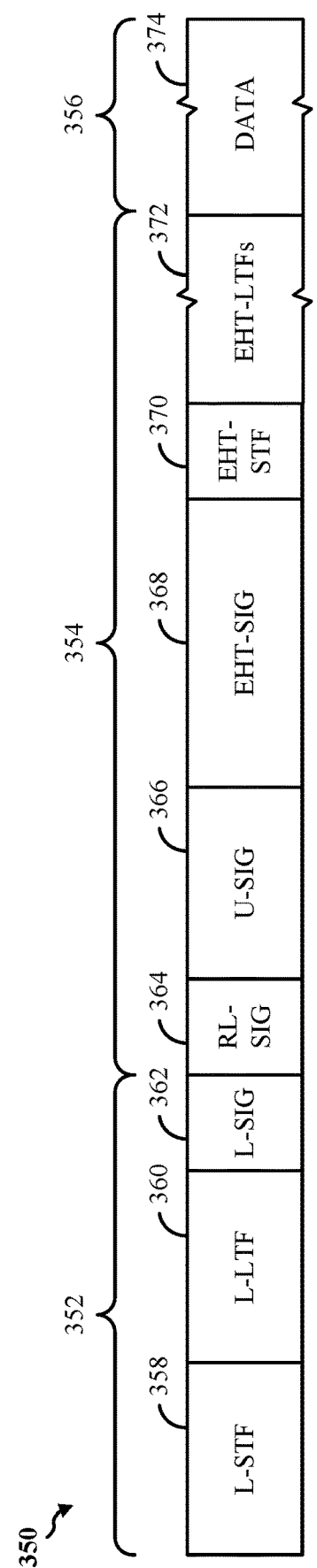
FIG. 3B shows another example PHY preamble usable for communications between an AP and each of a number of STAs.

FIG. 3B shows another example PHY preamble 350 usable for wireless communication between an AP and one or more STAs. The PHY preamble 350 may be used for SU, OFDMA or MU-MIMO transmissions. The PHY preamble 350 may be formatted as an Extreme High Throughput (EHT) WLAN PHY preamble in accordance with the IEEE 802.11be amendment to the IEEE 802.11 wireless communication protocol standard, or may be formatted as a PHY preamble conforming to any later (post-EHT) version of a new wireless communication protocol conforming to a future IEEE 802.11 wireless communication protocol standard or other wireless communication standard. The PHY preamble 350 includes a legacy portion 352 and a non-legacy portion 354. The PHY preamble 350 may be followed by a PHY payload 356, for example, in the form of a PSDU including a data field 374.

The legacy portion 352 of the PHY preamble 350 includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374.

For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PDU carrying the PHY preamble 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
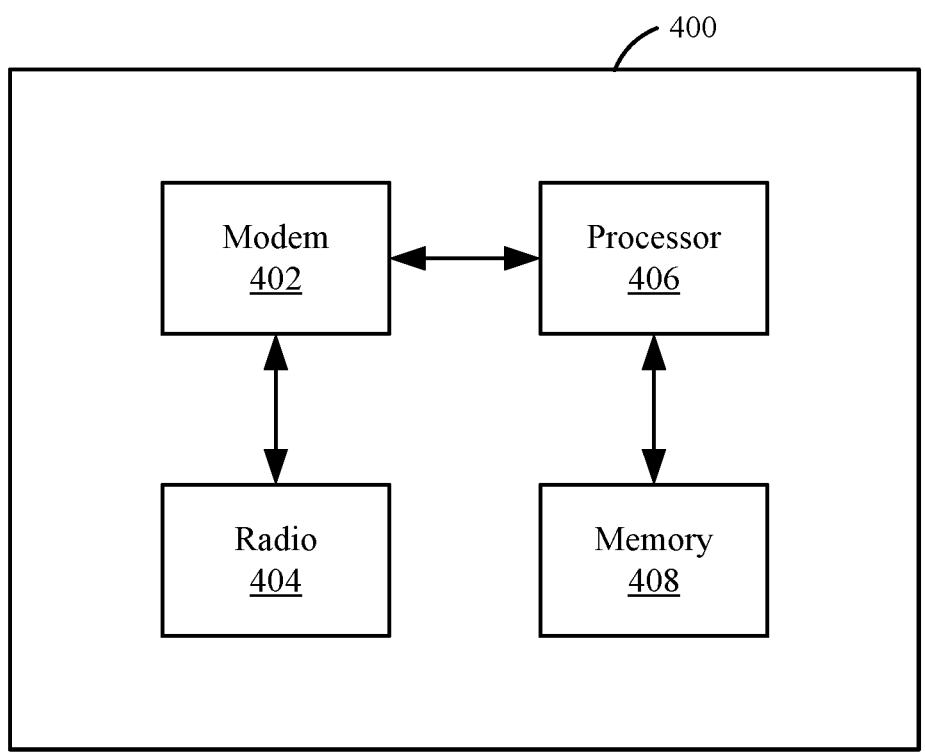
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some other implementations, the wireless communication device 400 can be an example of a device for use in an AP such as the AP 102 described above with reference to FIG. 1. In some other implementations, the wireless communication device 400 can include a processing system and an interface configured to perform the described functions.

The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406"), and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 406) for processing, evaluation, or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which transmits the symbols via the coupled antennas. Similarly, symbols received via the antennas are obtained by the radio 404, which provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 5B:
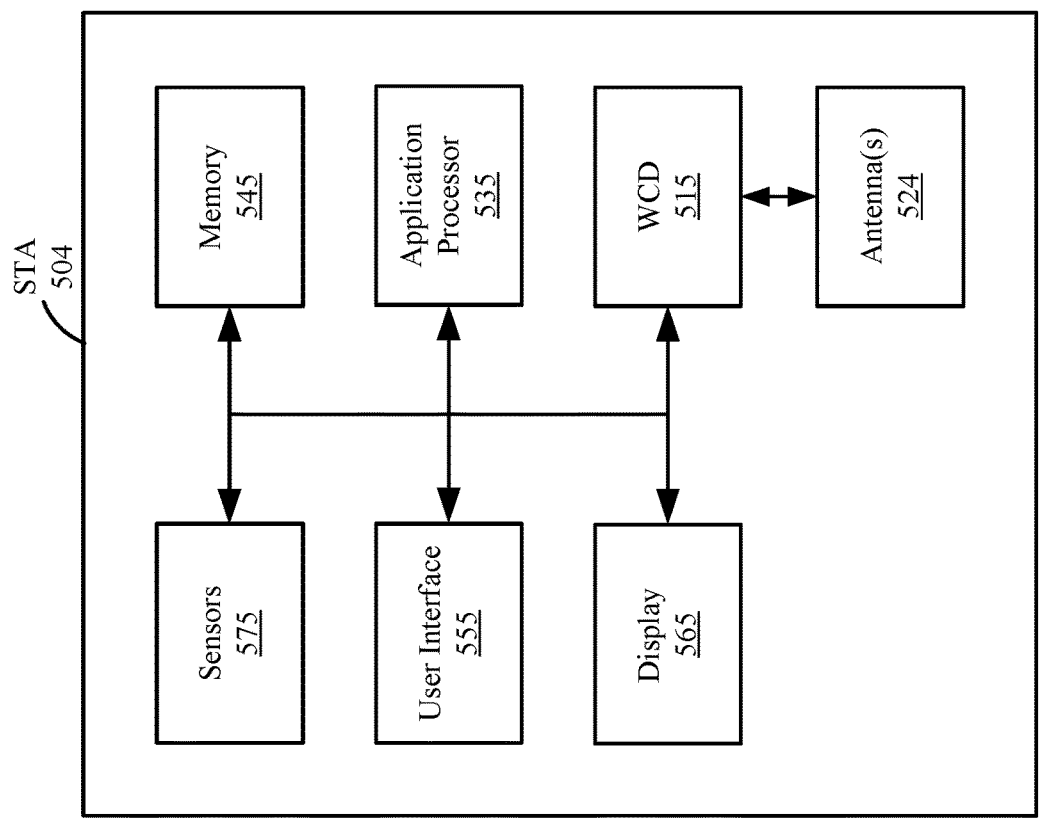
FIG. 5B shows a block diagram of an example STA.
Figure 5A:
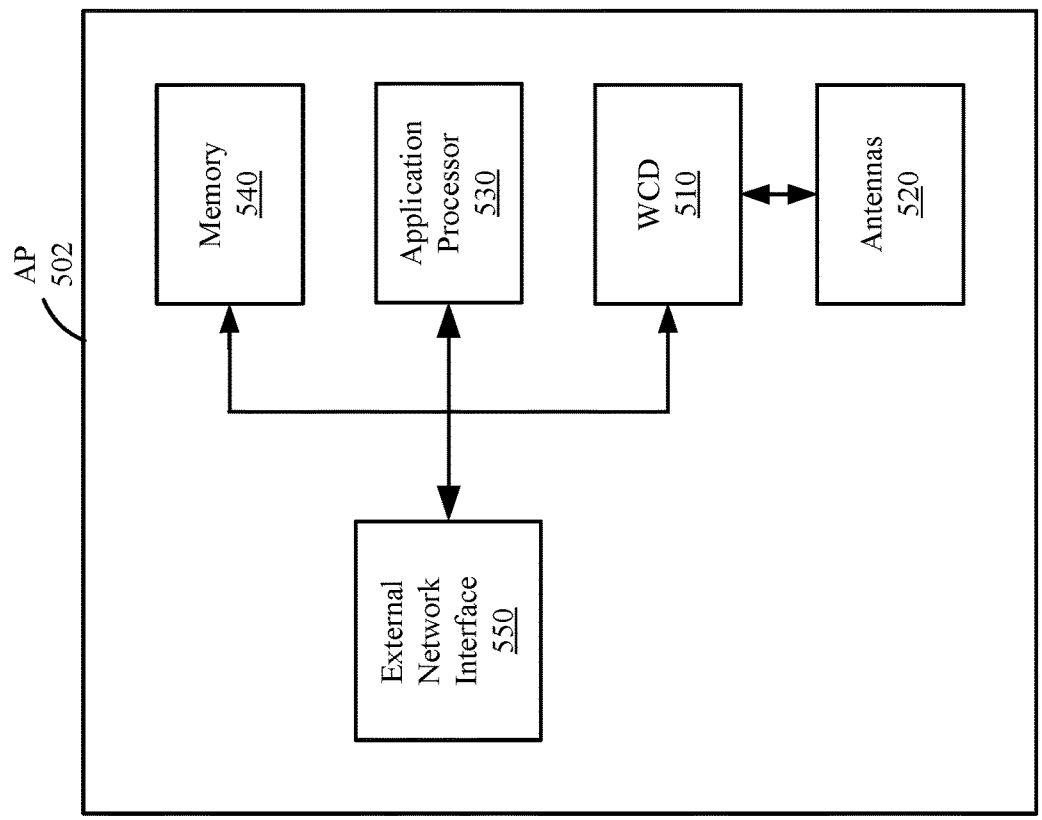
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565. In some other implementations, the STA 504 may include a processing system and an interface configured to perform the described functions.

As discussed, wireless communication devices that operate in accordance with the IEEE 802.11 family of wireless communication standards may be prohibited from actively scanning wireless channels in the 6 GHz frequency band, particularly on the preferred scanning channels (PSCs) in the 6 GHz frequency band. These wireless communication devices also may be prohibited from actively scanning dynamic frequency selection (DFS) channels in the 5 GHz frequency band to avoid interfering with RADAR signals. Thus, a wireless communication device associated with an AP or an application that may operate on one or more DFS channels in the 5 GHz frequency band or operate in the 6 GHz frequency band may be limited to passive scanning operations to determine whether another nearby AP operating on the same or similar channels can provide better service than the associated AP. For implementations in which the wireless communication device is connected to or otherwise associated with an application having specific latency requirements, throughput requirements, or timing requirements, the use of existing passive scanning techniques to determine whether another AP can provide better service may violate one or more of the specified latency, throughput, or timing requirements due at least in part to an inability of the wireless communication device to dynamically configure parameters of the existing passive scanning techniques.

FIG. 6A shows a timing diagram illustrating example beacon frame transmissions 600A from four wireless access points AP1-AP4. The first access point AP1 operates on a first wireless channel, and the other access points AP2-AP4 operate on a second wireless channel that is different than the first wireless channel. In the example of FIG. 6A, the first wireless channel is designated as the home channel for a low-latency application implemented at least in part by AP1. In some implementations, the other access points AP2-AP4 may operate on the same second wireless channel as one another. In some other implementations, the other access points AP2-AP4 may operate on one or more different wireless channels. For example, in some instances, the other access points AP2-AP4 may operate on one or more dynamic frequency selection (DFS) channels that restrict or prohibit active scanning operations. In some other instances, the other access points AP2-AP4 may operate on one or more preferred scanning channels (PSCs) that restrict or prohibit active scanning operations. Although FIG. 6A depicts only three other access points AP2-AP4, in some other implementations, there may be more than three other APs within wireless range of AP1.

Each of the access points AP1-AP4 broadcasts a series of beacon frames over their respective wireless channels. The beacon frames BF1-BF4, which may include discovery and capability information of the respective APs, are typically broadcast at specified time intervals referred to as beacon intervals. A beacon interval may be denoted as a time unit (TU) having a duration of approximately 1024 microseconds (μs). Although the access points AP1-AP4 may have the same or similar beacon intervals, the target beacon transmission times (TBTTs) of the access points AP1-AP4 may be different or offset in time relative to one another. For example, AP1 broadcasts beacon frames BF1 over the home channel at times $t_1$ and $t_5$, AP2 broadcasts beacon frames BF2 over the second channel at times $t_0$ and $t_4$, AP3 broadcasts beacon frames BF3 over the second channel at times $t_2$ and $t_6$, and AP4 broadcasts beacon frames BF4 over the second channel at times $t_3$ and $t_7$. The overlapping beacon intervals of AP1-AP4 may make it difficult for a wireless communication device such as a STA to receive beacon frames from each of the access points AP1-AP4 during a single beacon interval of approximately 100 ms.

FIG. 6B shows a timing diagram illustrating a passive scanning operation 600B. As shown, a wireless communication device such as a STA initially camps on the home channel, and remains on the home channel until after the beacon frame BF2 is transmitted over the second wireless channel from AP2, at time $t_0$. Since the STA is not on the second wireless channel at time $t_0$, the STA misses the beacon frame BF2. At time $t_1$, the STA performs a passive scanning operation on the second wireless channel for an off-channel scan time of approximately 110 ms. Specifically, the STA passively listens for beacon frames on the second wireless channel for a continuous period of time between times $t_1$ and $t_5$. This passive scanning allows the STA to receive beacon frame BF3 from AP3 at time $t_2$, to receive beacon frame BF4 from AP4 at time $t_3$, and to receive beacon frame BF2 from AP2 at time $t_4$. At time $t_5$, the STA returns to the home channel and terminates the passive scanning operation 600B.

Although the passive scanning operation 600B may allow the STA to receive beacon frames BF2-BF4 from respective access points AP2-AP4, the STA is away from the home channel during the entire passive scanning operation 600B. As such, the STA is not able to transmit, receive, or detect signals on the home channel for an entire beacon interval, which may increase latencies and reduce throughput of the low-latency application associated with the home channel. Moreover, because the STA may be continuously off-channel for more than 100 ms during each passive listening period, the passive scanning operation 600B depicted in FIG. 6B may not be suitable for use with low-latency applications that limit such off-channel durations to less than approximately 100 ms. For example, if the low-latency application associated with the home channel specifies that a STA cannot leave the home channel for more than 45 ms, performing the passive scanning operation 600B of FIG. 6B may violate the maximum off-channel scanning period specified by the low-latency application.

Figure 6C:
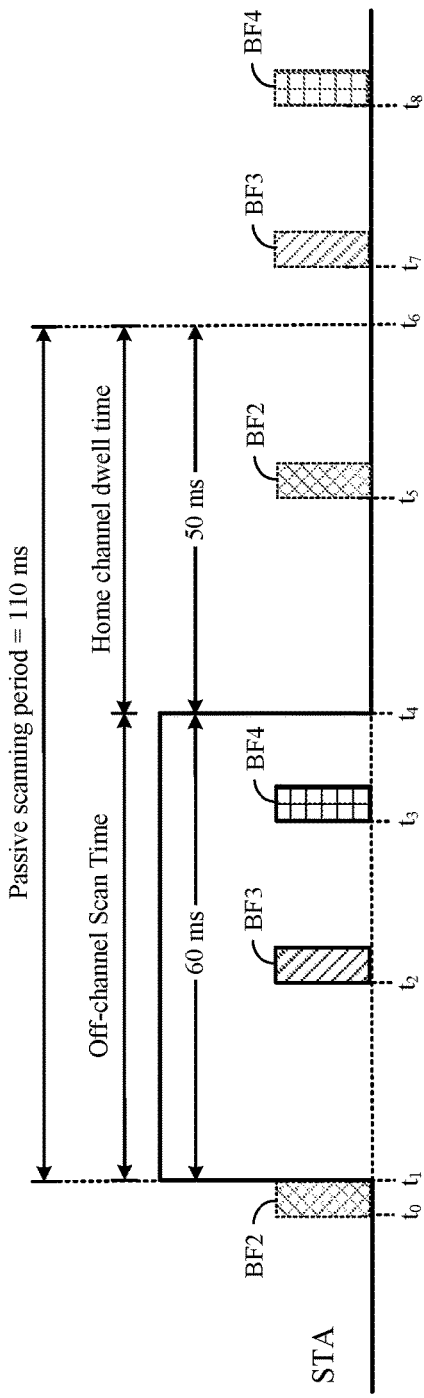
FIG. 6C shows a timing diagram illustrating another example passive scanning operation.

FIG. 6C shows a timing diagram illustrating another passive scanning operation 600C. The passive scanning operation 600C has a scanning period of approximately 110 ms, and includes an off-channel scan time of approximately 60 ms and a home channel dwell time of approximately 50 ms. Specifically, the STA camps on the home channel until time $t_1$, and misses the beacon frame BF2 transmitted from AP2 at time $t_0$. The STA passively listens for beacon frames on the second wireless channel during the off-channel scan time between times $t_1$ and $t_4$, and receives beacon frames BF3 and BF4 at times $t_2$ and $t_3$, respectively. The STA dwells on the home channel during the home channel dwell time between times $t_4$ and $t_6$, and misses the beacon frame BF2 from AP2 at time $t_5$. Although the passive scanning operation 600C uses a shorter off-channel scan time than the passive scanning operation 600B of FIG. 6B, performing the passive scanning operation 600C may violate the maximum off-channel scan time of 45 ms specified by the low-latency application associated with the home channel.

Figure 6D:
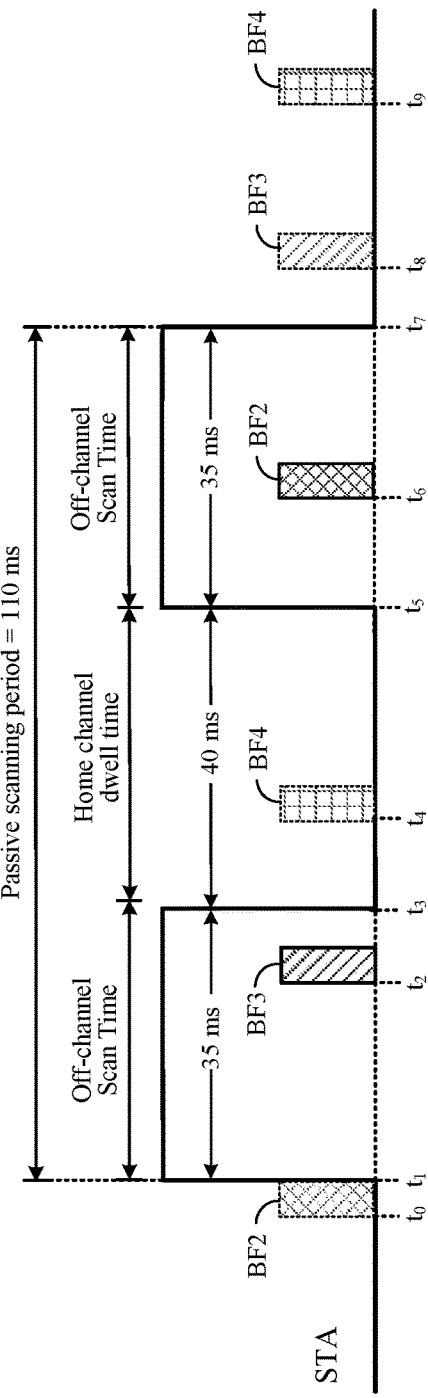
FIG. 6D shows a timing diagram illustrating another example passive scanning operation.

FIG. 6D shows a timing diagram illustrating another passive scanning operation 600D. The passive scanning operation 600D has a scanning period of approximately 110 ms, and includes two off-channel scan windows interleaved with a home channel dwell window. In the example of FIG. 6D, each of the off-channel scan windows has an off-channel scan time of approximately 35 ms, and the home channel dwell window has a home channel dwell time of approximately 40 ms. Specifically, the STA camps on the home channel until time $t_1$, and misses the beacon frame BF2 transmitted from AP2 at time $t_0$. The STA passively listens for beacon frames on the second wireless channel during a first off-channel scan time between times $t_1$ and $t_3$, dwells on the home channel between times $t_3$ and $t_5$, and passively listens for beacon frames on the second wireless channel during a second off-channel scan time between times $t_5$ and $t_7$. This allows the STA to receive the beacon frame BF3 from AP3 at time $t_2$, and to receive the beacon frame BF2 from AP2 at time $t_6$.

Although the off-channel scan time of 35 ms allows a STA to use the passive scanning operation 600D to discover other nearby APs without violating the maximum off-channel scan time specified by the low-latency application associated with the home channel, the passive scanning operation 600D ends at time $t_7$, and therefore may cause the STA to miss the beacon frames BF4 transmitted from AP4 at times $t_4$ and $t_9$.

Figure 7A:
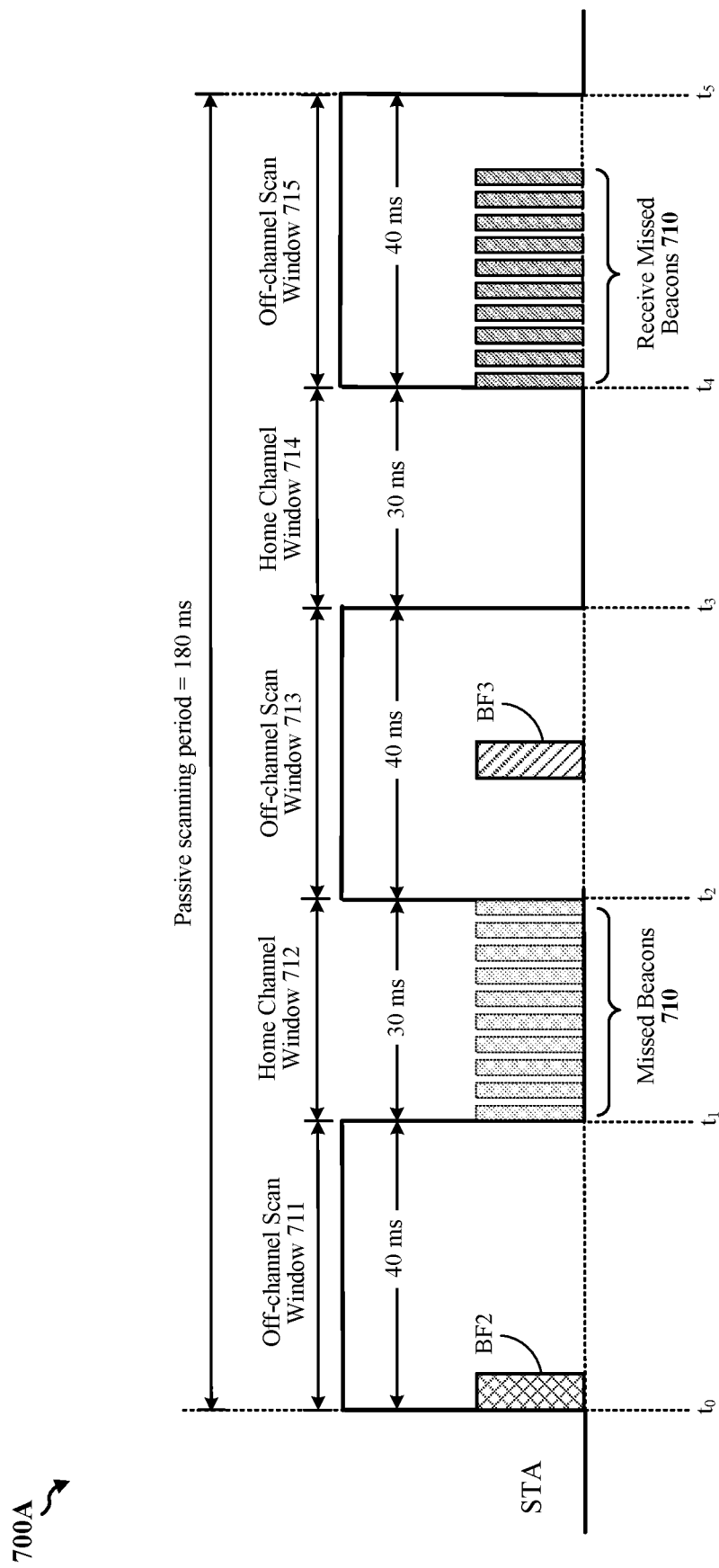
FIG. 7A shows a timing diagram illustrating an example multi-pass passive scanning operation.

FIG. 7A shows a timing diagram illustrating an example mirrored passive scanning operation 700A. The passive scanning operation 700A is shown to include three off-channel scan windows 711, 713, and 715 interleaved with two home channel dwell windows 712 and 714. In some implementations, the STA may configure the off-channel scan windows 711, 713, and 715 to have an off-channel scan time of approximately 40 ms, and may configure the home channel dwell windows 712 and 714 to have a home channel dwell time of approximately 40 ms. Specifically, the STA initially camps on the home channel, and initiates the passive scanning operation 700A on the second wireless channel at time $t_0$. Specifically, the STA passively listens for beacon frames on the second wireless channel for the configured off-channel scan time of 40 ms between times $t_0$ and $t_1$, and receives beacon frame BF2 from AP2 at time $t_0$.

At time $t_1$, the STA leaves the second wireless channel, and dwells on the home channel for the configured home channel dwell time of 30 ms between times $t_1$ and $t_2$. The STA misses one or more beacon frames 710 transmitted on the second wireless channel during the home channel dwell window between times $t_1$ and $t_2$. At time $t_2$, the STA returns to the second wireless channel and passively listens for beacon frames on the second wireless channel for the configured off-channel scan time of 40 ms between times $t_2$ and $t_3$. The STA receives beacon frame BF3 from AP3 on the second wireless channel between times $t_2$ and $t_3$.

At time $t_3$, the STA leaves the second wireless channel, and dwells on the home channel for the configured home channel dwell time of 30 ms between times $t_3$ and $t_4$. At time $t_4$, the STA returns to the second wireless channel and passively listens for beacon frames on the second wireless channel for the configured off-channel scan time of 40 ms between times $t_4$ and $t_5$. The STA receives a subsequent transmission of the one or more beacon frames 710 that were missed while the STA dwelled on the home channel between times $t_1$ and $t_2$.

As described, the passive scanning operation 700A may allow the STA to receive beacon frames 710 that were missed while the STA dwells on the home channel by extending the scan time from approximately 110 ms to approximately 180 ms (as compared with the passive scanning operations 600A-600D described above with reference to FIGS. 6A-6D). In this way, the passive scanning operation 700A may allow the STA to receive beacon frames transmitted from other nearby APs without violating the maximum off-channel scan time specified by the low-latency application associated with the home channel. However, the 180 ms scanning period of the passive scanning operation 700A exceeds the maximum passive scanning period of 160 ms specified by the low-latency application. As such, performing the passive scanning operation 700A may violate at least one of the latency or timing requirements specified by the low-latency application associated with the home channel.

Figure 7B:
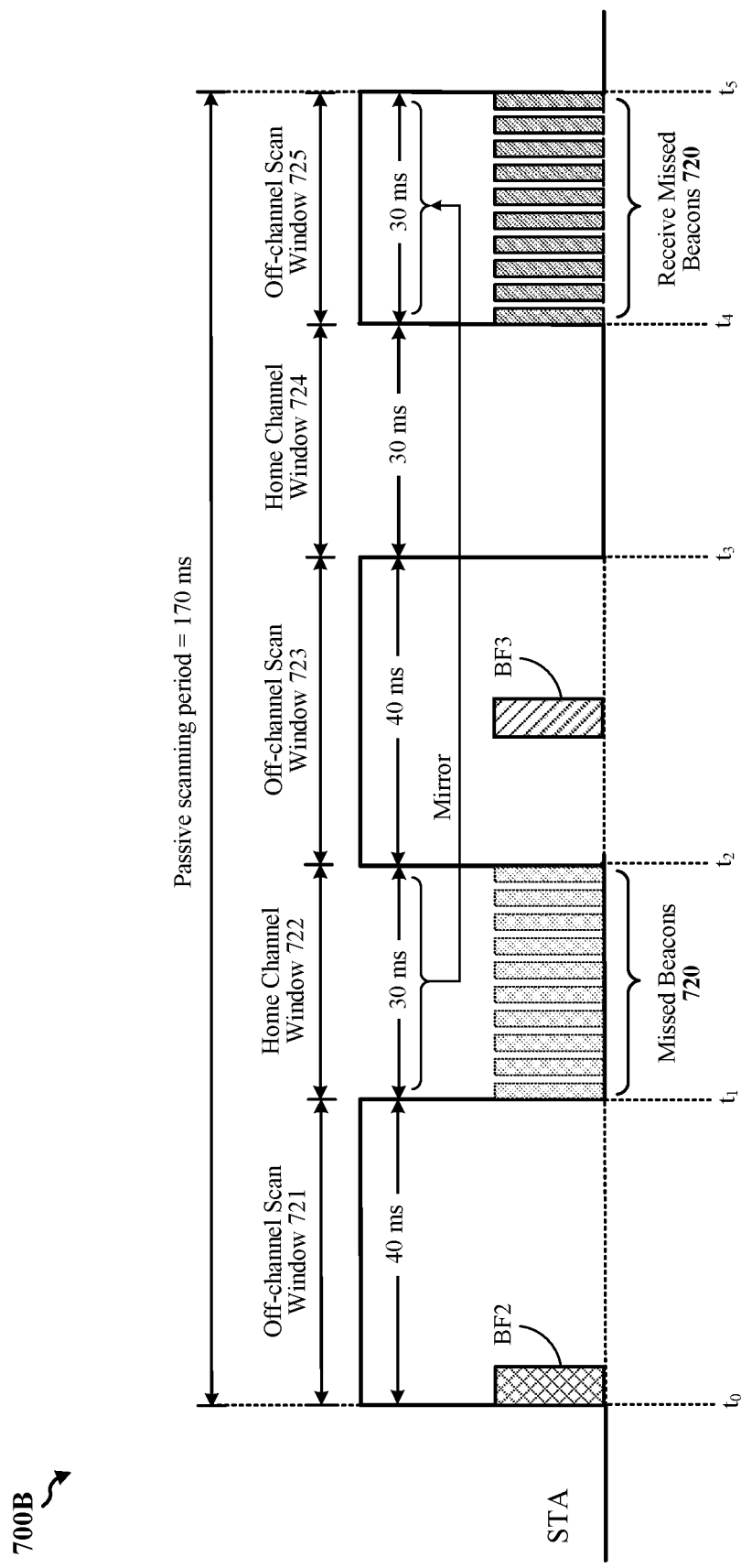
FIG. 7B shows a timing diagram illustrating an example mirrored passive scanning operation.

FIG. 7B shows a timing diagram illustrating another example mirrored passive scanning operation 700B. The passive scanning operation 700B is shown to include three off-channel scan windows 721, 723, and 725 interleaved with two home channel dwell windows 722 and 724. The STA may configure the first and second off-channel scan windows 721 and 723 to have an off-channel scan time of approximately 40 ms, and may configure the home channel dwell windows 722 and 724 to have a home channel dwell time of approximately 30 ms. The STA also may configure the passive scanning operation 700B to have a passive scanning period of approximately 170 ms. In some implementations, the third off-channel scan window 725 may be configured to have an off-channel scan time that is mirrored from the duration of the first home channel dwell window 722. Thus, in the example of FIG. 7B, the third off-channel scan window 725 may have a duration of approximately 30 ms mirrored from the home channel dwell time of 30 ms.

As shown in the example of FIG. 7B, the STA initially camps on the home channel, and initiates the passive scanning operation 700B on the second wireless channel at time $t_0$. The STA passively listens for beacon frames on the second wireless channel for the configured off-channel scan time of 40 ms between times $t_0$ and $t_1$, and receives beacon frame BF2 from AP2. At time $t_1$, the STA leaves the second wireless channel, and dwells on the home channel for the configured home channel dwell time of 30 ms between times $t_1$ and $t_2$. While dwelling on the home channel, the STA misses one or more beacon frames 720 transmitted over the second wireless channel between times $t_1$ and $t_2$.

At time $t_2$, the STA returns to the second wireless channel and passively listens for beacon frames on the second wireless channel for the configured off-channel scan time of 40 ms between times $t_2$ and $t_3$, and receives beacon frame BF3 from AP3. At time $t_3$, the STA leaves the second wireless channel, and dwells on the home channel for the configured home channel dwell time of 30 ms between times $t_3$ and $t_4$.

At time $t_4$, the STA returns to the second wireless channel and passively listens for beacon frames on the second wireless channel for the mirrored off-channel scan time of 30 ms between times $t_4$ and $t_5$. The STA receives a subsequent transmission of the one or more beacon frames 720 that were missed while the STA dwelled on the home channel between times $t_1$ and $t_2$.

As described, the passive scanning operation 700B may allow the STA to receive beacon frames 720 that were missed while the STA dwells on the home channel between times $t_1$ and $t_2$. In this way, the passive scanning operation 700B may allow the STA to receive beacon frames transmitted from other nearby APs without violating the maximum off-channel scan time specified by the low-latency application associated with the home channel. However, the 170 ms scanning period of the passive scanning operation 700B exceeds the maximum passive scanning period of 160 ms specified by the low-latency application. As such, performing the passive scanning operation 700B may violate at least one of the latency or timing requirements specified by the low-latency application associated with the home channel.

Figure 7C:
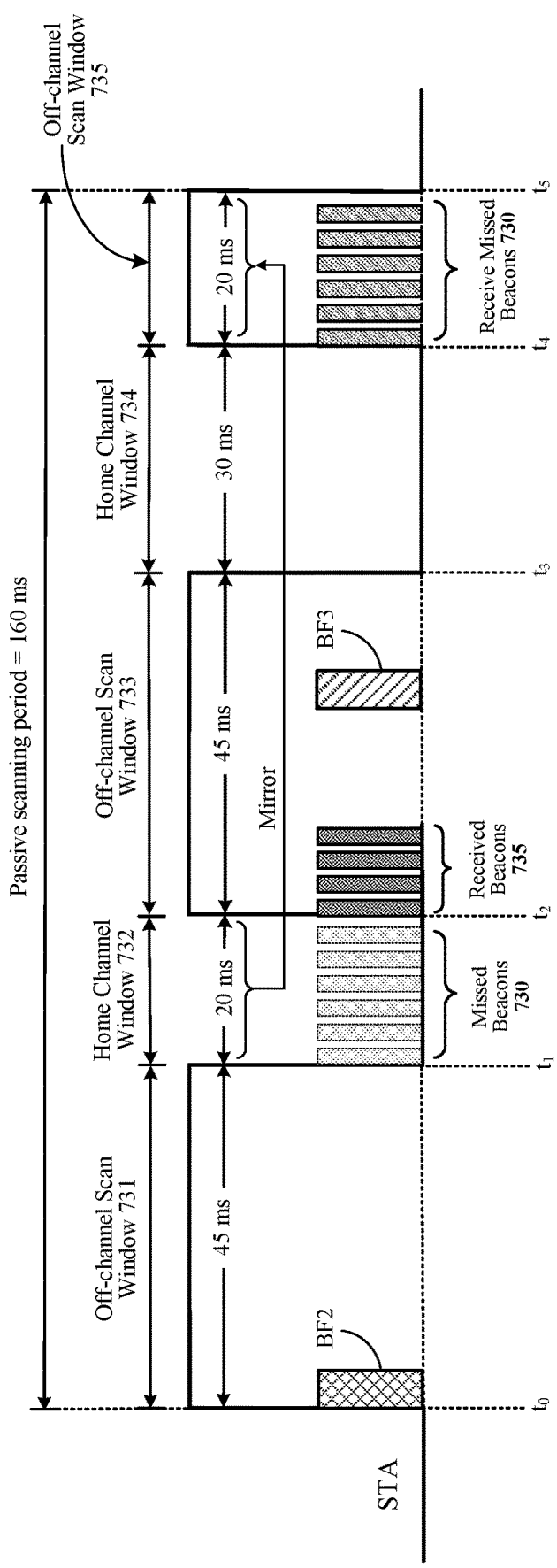
FIG. 7C shows a timing diagram illustrating an example mirrored passive scanning operation.

FIG. 7C shows a timing diagram illustrating another mirrored passive scanning operation 700C. The passive scanning operation 700C is shown to include three off-channel scan windows 731, 733, and 735 interleaved with two home channel dwell windows 732 and 734. The STA may configure the first and second off-channel scan windows 731 and 733 to have an off-channel scan time of approximately 45 ms, may configure the first home channel dwell window 732 to have a home channel dwell time of approximately 20 ms, and may configure the second home channel dwell window 734 to have a home channel dwell time of approximately 30 ms. The STA also may configure the passive scanning operation 700C to have a passive scanning period of approximately 160 ms. In some implementations, the third off-channel scan window 735 may be configured to have an off-channel scan time that is mirrored from the duration of the first home channel dwell window 732. Thus, in the example of FIG. 7C, the third off-channel scan window 735 may have a duration of approximately 20 ms mirrored from the home channel dwell time of 20 ms.

As shown in the example of FIG. 7C, the STA initially camps on the home channel, and initiates the passive scanning operation 700C on the second wireless channel at time $t_0$. The STA passively listens for beacon frames on the second wireless channel for the configured off-channel scan time of 45 ms between times $t_0$ and $t_1$, and receives beacon frame BF2 from AP2. At time $t_1$, the STA leaves the second wireless channel, and dwells on the home channel for the configured home channel dwell time of 20 ms between times $t_1$ and $t_2$. While dwelling on the home channel, the STA misses a first group of beacon frames 730 transmitted over the second wireless channel between times $t_1$ and $t_2$.

At time $t_2$, the STA returns to the second wireless channel and passively listens for beacon frames on the second wireless channel for the configured off-channel scan time of 45 ms between times $t_2$ and $t_3$. During the off-channel scan window 733, the STA receives beacon frame BF3 from AP3, and also receives a second group of beacon frames 735 transmitted over the second wireless channel. At time $t_3$, the STA leaves the second wireless channel, and dwells on the home channel for the configured home channel dwell time of 30 ms between times $t_3$ and $t_4$.

At time $t_4$, the STA returns to the second wireless channel and passively listens for beacon frames on the second wireless channel for the mirrored off-channel scan time of 20 ms between times $t_4$ and $t_5$. The STA receives a subsequent transmission of the first group of beacon frames 730 that were missed while the STA dwelled on the home channel between times $t_1$ and $t_2$.

As described, the passive scanning operation 700C may allow the STA to receive the first group of beacon frames 730 that were missed while the STA dwells on the home channel between times $t_1$ and $t_2$. In this way, the passive scanning operation 700C may allow the STA to receive beacon frames transmitted from other nearby APs without violating the maximum off-channel scan time specified by the low-latency application associated with the home channel. Additionally, since the passive scanning operation 700C has a total scanning period of approximately 160 ms, the STA may perform the passive scanning operation 700C without violating the maximum passive scanning period specified by the low-latency application.

Figure 7D:
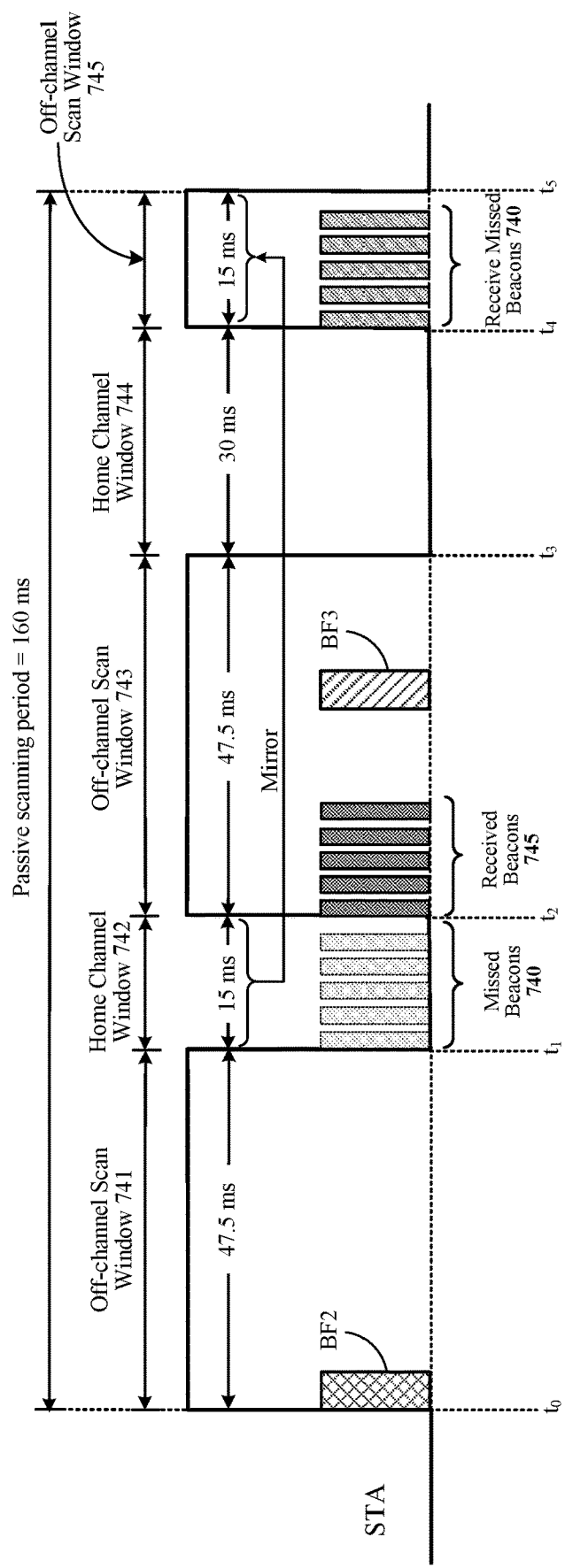
FIG. 7D shows a timing diagram illustrating an example mirrored passive scanning operation.

FIG. 7D shows a timing diagram illustrating another mirrored passive scanning operation 700D. The passive scanning operation 700D is shown to include three off-channel scan windows 741, 743, and 745 interleaved with two home channel dwell windows 742 and 744. The STA may configure the first and second off-channel scan windows 741 and 743 to have an off-channel scan time of approximately 47.5 ms, may configure the first home channel dwell window 742 to have a home channel dwell time of approximately 15 ms, and may configure the second home channel dwell window 744 to have a home channel dwell time of approximately 30 ms. The STA also may configure the passive scanning operation 700D to have a passive scanning period of approximately 160 ms. In some implementations, the third off-channel scan window 745 may be configured to have an off-channel scan time that is mirrored from the duration of the first home channel dwell window 742. Thus, in the example of FIG. 7D, the third off-channel scan window 745 may have a duration of approximately 15 ms mirrored from the home channel dwell time of 15 ms.

As shown in the example of FIG. 7D, the STA initially camps on the home channel, and initiates the passive scanning operation 700D on the second wireless channel at time $t_0$. The STA passively listens for beacon frames on the second wireless channel for the configured off-channel scan time of 47.5 ms between times $t_0$ and $t_1$, and receives beacon frame BF2 from AP2. At time $t_1$, the STA leaves the second wireless channel, and dwells on the home channel for the configured home channel dwell time of 15 ms between times $t_1$ and $t_2$. While dwelling on the home channel, the STA misses a first group of beacon frames 740 transmitted over the second wireless channel between times $t_1$ and $t_2$.

At time $t_2$, the STA returns to the second wireless channel and passively listens for beacon frames on the second wireless channel for the configured off-channel scan time of 47.5 ms between times $t_2$ and $t_3$. During the off-channel scan window 743, the STA receives beacon frame BF3 from AP3, and also receives a second group of beacon frames 745 transmitted over the second wireless channel. At time $t_3$, the STA leaves the second wireless channel, and dwells on the home channel for the configured home channel dwell time of 30 ms between times $t_3$ and $t_4$.

At time $t_4$, the STA returns to the second wireless channel and passively listens for beacon frames on the second wireless channel for the mirrored off-channel scan time of 15 ms between times $t_4$ and $t_5$. The STA receives a subsequent transmission of the first group of beacon frames 740 that were missed while the STA dwelled on the home channel between times $t_1$ and $t_2$.

As described, the passive scanning operation 700D may allow the STA to receive the first group of beacon frames 740 that were missed while the STA dwells on the home channel between times $t_1$ and $t_2$. In this way, the passive scanning operation 700D may allow the STA to receive beacon frames transmitted from other nearby APs without violating the maximum off-channel scan time specified by the low-latency application associated with the home channel. Additionally, since the passive scanning operation 700D has a total scanning period of approximately 160 ms, the STA may perform the passive scanning operation 700D without violating the maximum passive scanning period specified by the low-latency application.

Figure 8:
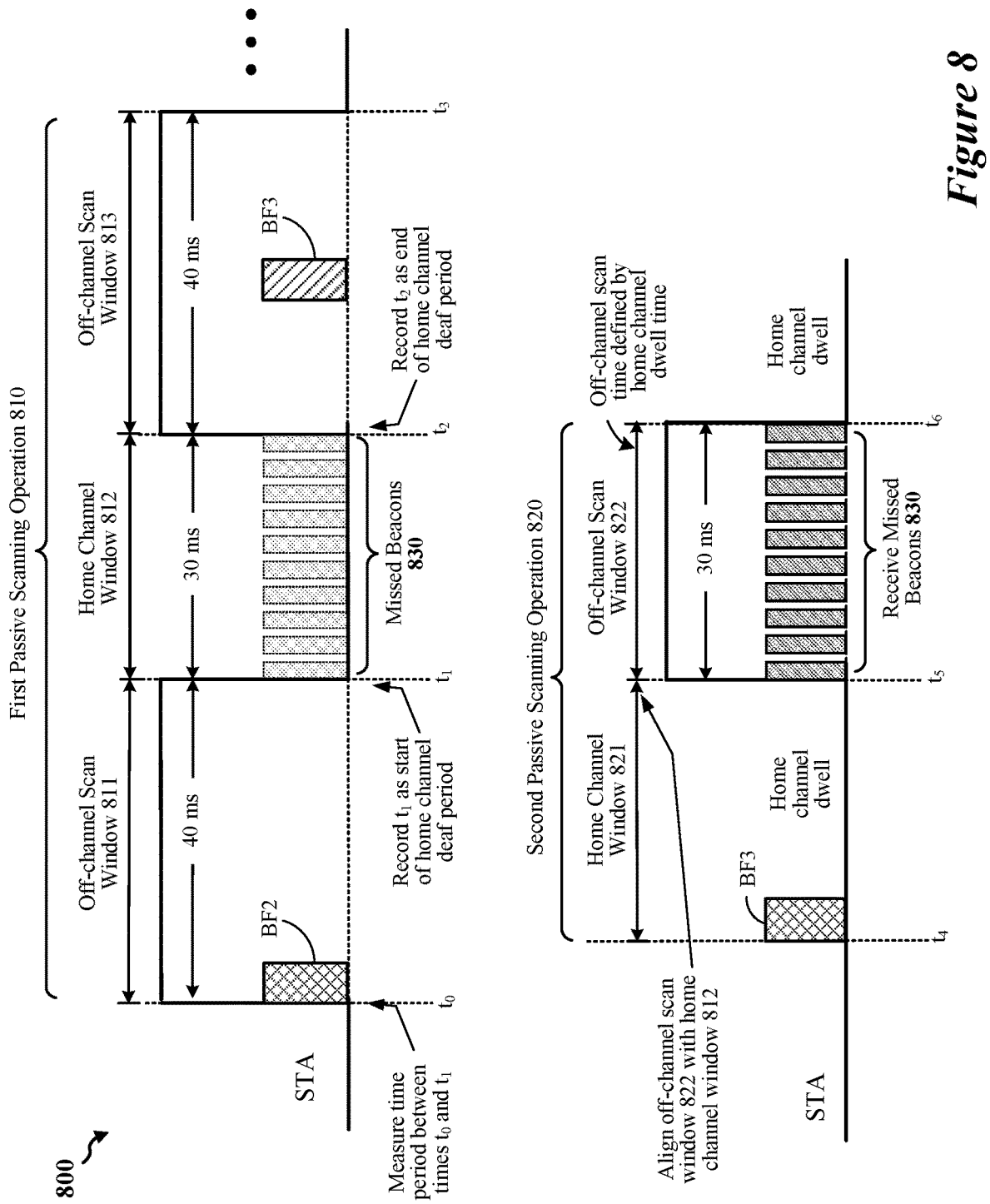
FIG. 8 shows a timing diagram illustrating an example batched mirrored passive scanning operation.

FIG. 8 shows a timing diagram illustrating a batched mirrored passive scanning operation 800. The passive scanning operation 800 is shown to include a first passive scanning operation 810 and a second passive scanning operation 820. The first passive scanning operation 810 includes two off-channel scan windows 811 and 813 interleaved with one home channel dwell window 812. The second passive scanning operation 820 includes one home channel dwell window 821 and one off-channel scan window 822. The STA may configure the first and second off-channel scan windows 811 and 813 to have an off-channel scan time of approximately 40 ms, and may configure the first home channel dwell window 812 to have a home channel dwell time of approximately 30 ms. The STA also may configure the first passive scanning operation 810 to have a passive scanning period of approximately 110 ms. In some implementations, the off-channel scan window 822 of the second passive scanning operation 820 may be configured to have an off-channel scan time that is mirrored from the duration of the home channel dwell window 812 of the first passive scanning operation 810. Thus, in the example of FIG. 8, the off-channel scan window 822 of the second passive scanning operation 820 may have a duration of approximately 30 ms mirrored from the home channel dwell time of 30 ms.

As shown in the example of FIG. 8, the STA initially camps on the home channel, and initiates the first passive scanning operation 810 on the second wireless channel at time $t_0$. The STA passively listens for beacon frames on the second wireless channel for the configured off-channel scan time of 40 ms between times $t_0$ and $t_1$, and receives beacon frame BF2 from AP2. In some implementations, the STA may use a counter or timer to measure the time period between times $t_1$ and $t_2$, which is indicative of the duration of the first off-channel scan window 811. At time $t_1$, the STA leaves the second wireless channel, and dwells on the home channel for the configured home channel dwell time of 30 ms between times $t_1$ and $t_2$. While dwelling on the home channel, the STA misses a group of beacon frames 830 transmitted over the second wireless channel between times $t_1$ and $t_2$.

At time $t_2$, the STA returns to the second wireless channel and passively listens for beacon frames on the second wireless channel for the configured off-channel scan time of 40 ms between times $t_2$ and $t_3$. During the off-channel scan window 813, the STA receives beacon frame BF3 from AP3. In some implementations, the STA may record time $t_2$ as the end of the home channel window 812. At time $t_3$, the STA leaves the second wireless channel, and dwells on the home channel.

At time $t_5$, the STA initiates the second passive scanning operation 820 on the second wireless channel. In some implementations, the STA may initiate a countdown of the counter or timer at time $t_4$, and may determine time $t_5$ based on the counter or timer reaching a zero value. In some instances, the STA may configure the time period between times $t_4$ and $t_5$ to be of the same duration as the first off-channel scan window 811. In this way, the STA may align the off-channel scan window 822 of the second passive scanning operation 820 with the off-channel scan window 812 of the first passive scanning operation 810 relative to the beacon interval associated with the beacon frames 830. That is, the second passive scanning operation 820 may be configured for the STA to receive beacon frames that were missed by the STA while dwelling on the home channel during the first passive scanning operation 810.

As described, the passive scanning operation 800 may allow the STA to receive the group of beacon frames 830 that were missed while the STA dwells on the home channel during the first passive scanning operation 810 between times $t_1$ and $t_2$. In this way, the passive scanning operation 800 may allow the STA to receive beacon frames transmitted from other nearby APs without violating the maximum off-channel scan time specified by the low-latency application associated with the home channel. Additionally, since the passive scanning operation 800 has a total scanning period of approximately 160 ms, the STA may perform the passive scanning operation 800 without violating the maximum passive scanning period specified by the low-latency application.

In some implementations, the STA may discover one or more other APs during the first passive scanning operation 810, and may determine an AP presence level on a given wireless channel provided by the discovered APs before performing the second passive scanning operation 820. In some instances, the STA may perform the second passive scanning operation 820 only when the determined AP presence level is less than a value. In some other instances, the STA may refrain from performing the second passive scanning operation when the determined AP presence level is greater than or equal to the value. In addition, or in the alternative, the STA may report the discovered APs from a medium access control (MAC) layer of the STA to an application layer of the STA before performing the second passive scanning operation 820.

In some implementations, the STA may sequentially scan one or more second wireless channels using the same radio of the STA. In some other implementations, the STA may concurrently scan the one or more second wireless channels using one or more corresponding radios of the STA.

Figure 9A:
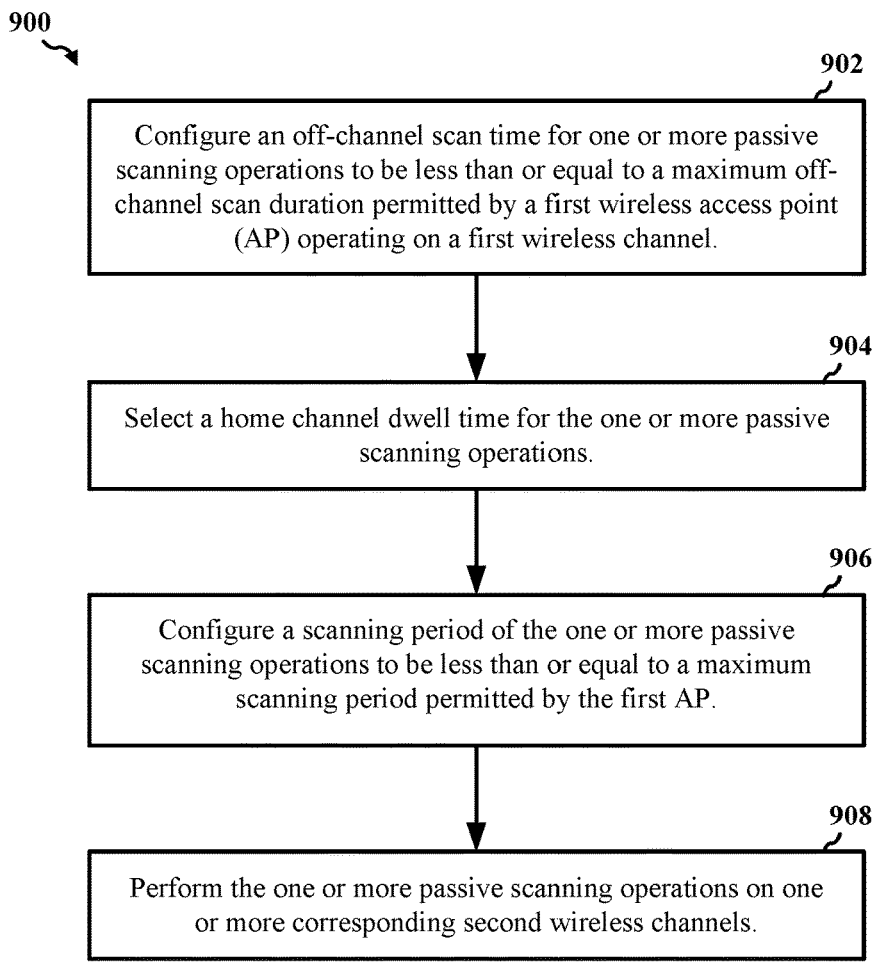
FIGS. 9A and 9B show flowcharts illustrating example operations for wireless communication that support passive scanning operations, according to some implementations.

FIG. 9A shows a flowchart illustrating an example operation 900 for wireless communication that supports passive scanning operations. The operation 900 may be performed by an apparatus of a wireless communication device such as the wireless communication device 400 described above with reference to FIG. 4. In some implementations, the operation 900 may be performed by a wireless communication device operating as or within a STA, such as one of the STAs 104 and 504 described above with reference to FIGS. 1 and 5B, respectively.

For example, at block 902, the wireless communication device configures an off-channel scan time for one or more passive scanning operations to be less than or equal to a maximum off-channel scan duration permitted by a first wireless access point (AP) operating on a first wireless channel. At block 904, the wireless communication device selects a home channel dwell time for the one or more passive scanning operations. At block 906, the wireless communication device configures a scanning period of the one or more passive scanning operations to be less than or equal to a maximum scanning period permitted by the first AP. At block 908, the wireless communication device performs the one or more passive scanning operations on one or more corresponding second wireless channels.

In some implementations, the maximum off-channel scan duration and the maximum scanning period may be specified by an off-channel scanning procedure associated with a low-latency application. The first wireless channel may be a home channel associated with the real-time gaming application. In some instances, the one or more second wireless channels may include 16 dynamic frequency selection (DFS) channels in a 5 GHz frequency spectrum. In other instances, the one or more second wireless channels may include one or more preferred scanning channels (PSCs) in a 6 GHz frequency spectrum.

In some implementations, the one or more second wireless channels may be sequentially scanned using a same radio of the wireless communication device. In some other implementations, the one or more second wireless channels may be concurrently scanned using one or more corresponding radios of the wireless communication device.

Figure 9B:
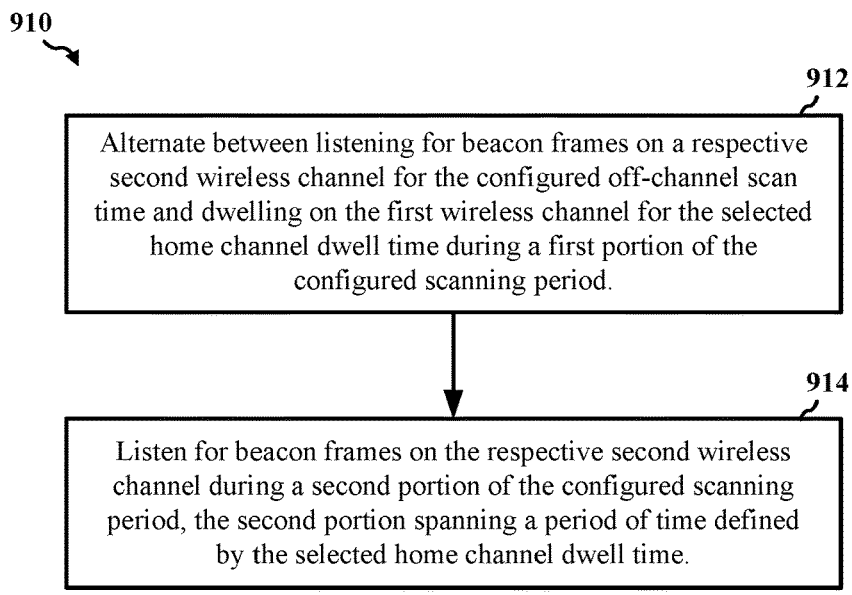

FIG. 9B shows a flowchart illustrating an example operation 910 for wireless communication that supports passive scanning operations. The operation 910 may be performed by an apparatus of a wireless communication device such as the wireless communication device 400 described above with reference to FIG. 4. In some implementations, the operation 910 may be performed by a wireless communication device operating as or within a STA, such as one of the STAs 104 and 504 described above with reference to FIGS. 1 and 5B, respectively. In some instances, the operation 910 may be one example of performing the one or more passive scanning operations in block 908 of FIG. 9A.

For example, at block 912, the wireless communication device alternates between listening for beacon frames on a respective second wireless channel for the configured off-channel scan time, and dwelling on the first wireless channel for the selected home channel dwell time during a first portion of the configured scanning period. At block 914, the wireless communication device listens for beacon frames on the respective second wireless channel during a second portion of the configured scanning period, where the second portion spanning a period of time defined by the selected home channel dwell time.

The wireless communication device may alternate between listening for beacon frames on the respective second wireless channel and dwelling on the first wireless channel for any suitable number of instances or cycles. In some implementations, the wireless communication device may configure the off-channel scan time to be approximately 40 milliseconds (ms), and may select the home channel dwell time to be approximately 30 ms. In some instances, the wireless communication device may listen for beacon frames on the respective second wireless channel for an off-channel scan time of approximately 40 ms, dwell on the first wireless channel for a selected home channel dwell time of approximately 30 ms, listen for beacon frames on the respective second wireless channel for another off-channel scan time of approximately 40 ms, and dwell on the first wireless channel for another selected home channel dwell time of approximately 30 ms. The wireless communication device may return to the respective second wireless channel and listen for beacon frames for a duration equal to the selected home channel dwell time, or approximately 30 ms. In this way, the wireless communication device may detect a presence of beacon frames on the respective second wireless channel that may have been missed while the wireless communication device was previously dwelling on the first wireless channel.

In some other implementations, the wireless communication device may configure the off-channel scan time to be approximately 45 ms, and may select the home channel dwell time to be approximately 20 ms. In some instances, the wireless communication device may listen for beacon frames on the respective second wireless channel for an off-channel scan time of approximately 45 ms, dwell on the first wireless channel for a selected home channel dwell time of approximately 20 ms, listen for beacon frames on the respective second wireless channel for another off-channel scan time of approximately 45 ms, and dwell on the first wireless channel for another selected home channel dwell time of approximately 30 ms. The wireless communication device may return to the respective second wireless channel and listen for beacon frames for a duration equal to the selected home channel dwell time, or approximately 20 ms. In this way, the wireless communication device may detect a presence of beacon frames on the respective second wireless channel that may have been missed while the wireless communication device was previously dwelling on the first wireless channel.

In some other implementations, the wireless communication device may configure the off-channel scan time to be approximately 47.5 ms, and may select the home channel dwell time to be approximately 15 ms. In some instances, the wireless communication device may listen for beacon frames on the respective second wireless channel for an off-channel scan time of approximately 47.5 ms, dwell on the first wireless channel for a selected home channel dwell time of approximately 15 ms, listen for beacon frames on the respective second wireless channel for another off-channel scan time of approximately 47.5 ms, and dwell on the first wireless channel for another selected home channel dwell time of approximately 30 ms. The wireless communication device may return to the respective second wireless channel and listen for beacon frames for a duration equal to the selected home channel dwell time, or approximately 15 ms. In this way, the wireless communication device may detect a presence of beacon frames on the respective second wireless channel that may have been missed while the wireless communication device was previously dwelling on the first wireless channel.

Figure 10A:
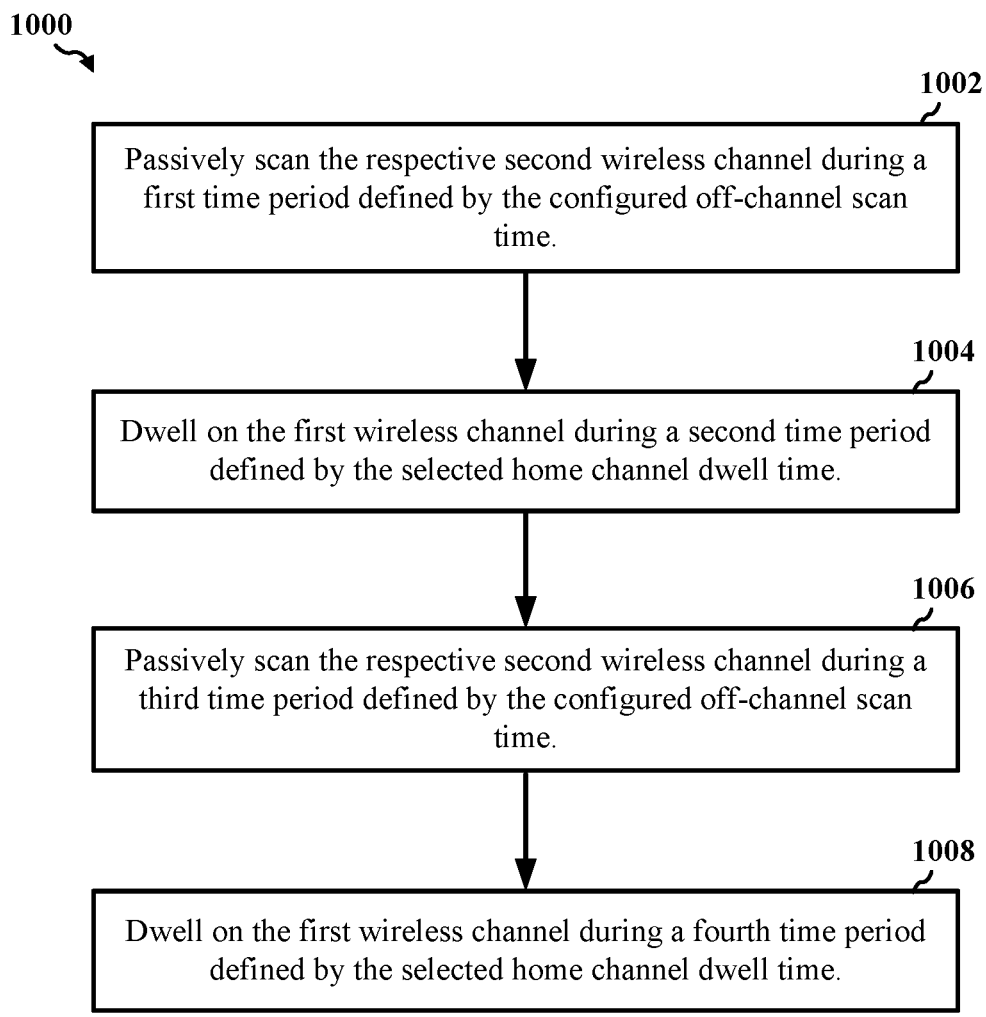
FIGS. 10A and 10B show flowcharts illustrating example operations for wireless communication that support passive scanning operations, according to some implementations.

FIG. 10A shows a flowchart illustrating an example operation 1000 for wireless communication that supports passive scanning operations. The operation 1000 may be performed by an apparatus of a wireless communication device such as the wireless communication device 400 described above with reference to FIG. 4. In some implementations, the operation 1000 may be performed by a wireless communication device operating as or within a STA, such as one of the STAs 104 and 504 described above with reference to FIGS. 1 and 5B, respectively. In some instances, the operation 1000 may be one example of alternating between listening for beacon frames on the respective second wireless channel and dwelling on the first wireless channel in block 912 of FIG. 9B.

For example, at block 1002, the wireless communication device passively scans the respective second wireless channel during a first time period defined by the configured off-channel scan time. At block 1004, the wireless communication device dwells on the first wireless channel during a second time period defined by the selected home channel dwell time. At block 1006, the wireless communication device passively scans the respective second wireless channel during a third time period defined by the configured off-channel scan time. At block 1008, the wireless communication device dwells on the first wireless channel during a fourth time period defined by the selected home channel dwell time.

Figure 10B:
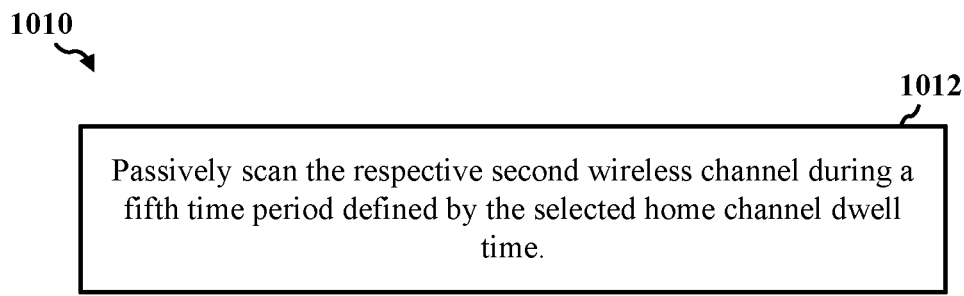

FIG. 10B shows a flowchart illustrating an example operation 1010 for wireless communication that supports passive scanning operations. The operation 1010 may be performed by an apparatus of a wireless communication device such as the wireless communication device 400 described above with reference to FIG. 4. In some implementations, the operation 1010 may be performed by a wireless communication device operating as or within a STA, such as one of the STAs 104 and 504 described above with reference to FIGS. 1 and 5B, respectively. In some instances, the operation 1010 may be one example of the listening in block 914 of FIG. 9B. For example, at block 1012, the wireless communication device passively scans the respective second wireless channel during a fifth time period defined by the selected home channel dwell time.

Figure 11:
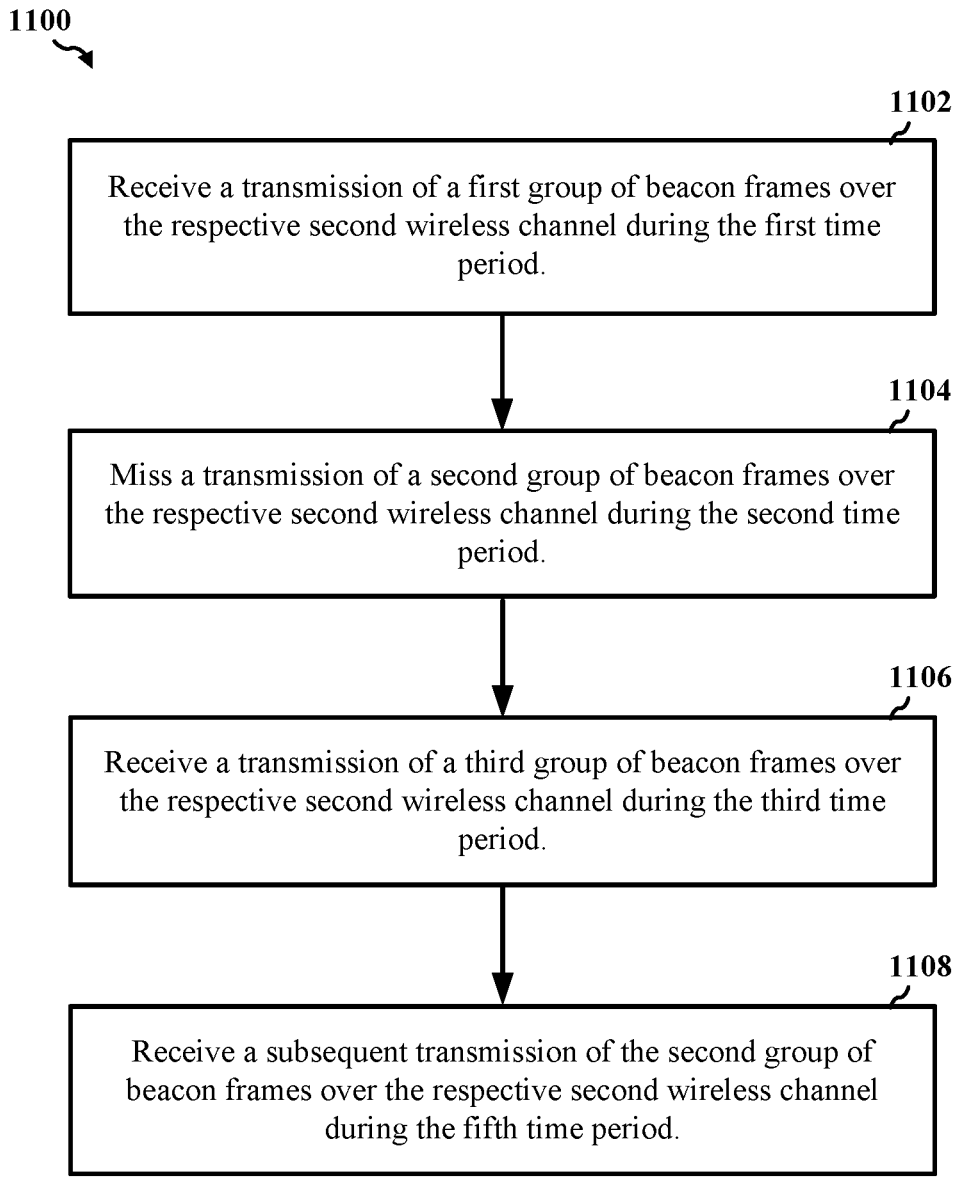
FIG. 11 shows a flowchart illustrating an example operation for wireless communication that supports passive scanning operations, according to some implementations.

FIG. 11 shows a flowchart illustrating an example operation 1100 for wireless communication that supports passive scanning operations. The operation 1100 may be performed by an apparatus of a wireless communication device such as the wireless communication device 400 described above with reference to FIG. 4. In some implementations, the operation 1100 may be performed by a wireless communication device operating as or within a STA, such as one of the STAs 104 and 504 described above with reference to FIGS. 1 and 5B, respectively. In some instances, the operation 1100 may be one example of the listening in block 914 of FIG. 9B.

For example, at block 1102, the wireless communication device receives a transmission of a first group of beacon frames over the respective second wireless channel during the first time period. At block 1104, the wireless communication device misses a transmission of a second group of beacon frames over the respective second wireless channel during the second time period. At block 1106, the wireless communication device receives a transmission of a third group of beacon frames over the respective second wireless channel during the third time period. At block 1108, the wireless communication device receives a subsequent transmission of the second group of beacon frames over the respective second wireless channel during the fifth time period.

Figure 12A:
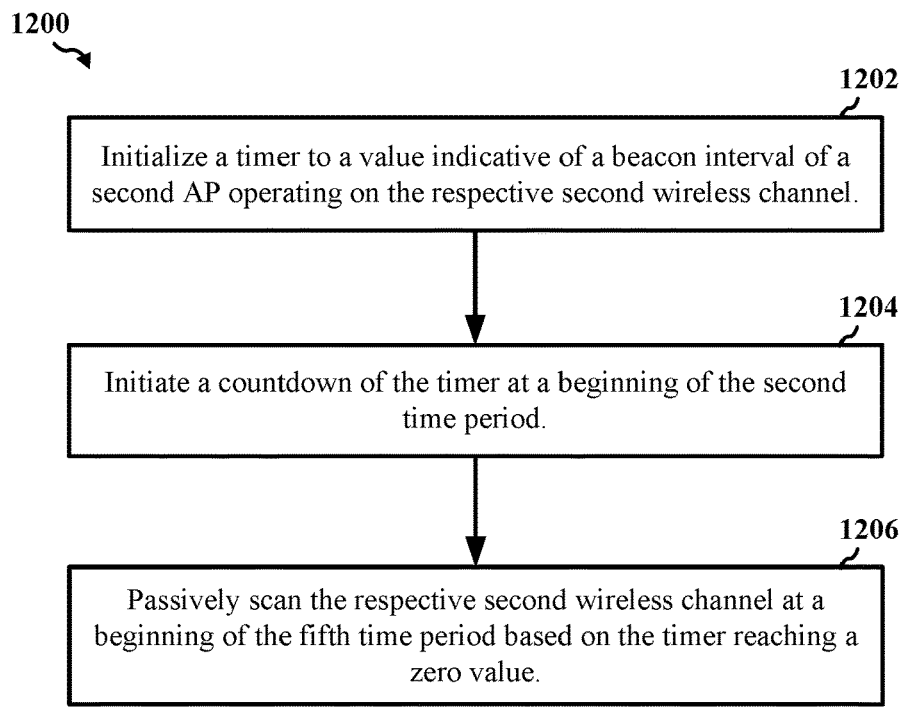
FIG. 12A shows a flowchart illustrating an example operation for wireless communication that supports passive scanning operations, according to some implementations.

FIG. 12A shows a flowchart illustrating an example operation 1200 for wireless communication that supports passive scanning operations. The operation 1200 may be performed by an apparatus of a wireless communication device such as the wireless communication device 400 described above with reference to FIG. 4. In some implementations, the operation 1200 may be performed by a wireless communication device operating as or within a STA, such as one of the STAs 104 and 504 described above with reference to FIGS. 1 and 5B, respectively. In some instances, the operation 1200 may be one example of the listening in block 914 of FIG. 9B.

For example, at block 1202, the wireless communication device initializes a timer to a value indicative of a beacon interval of a second AP operating on the respective second wireless channel. At block 1204, the wireless communication device initiates a countdown of the timer at a beginning of the second time period. At block 1206, the wireless communication device passively scans the respective second wireless channel at a beginning of the fifth time period based on the timer reaching a zero value.

Figure 12B:
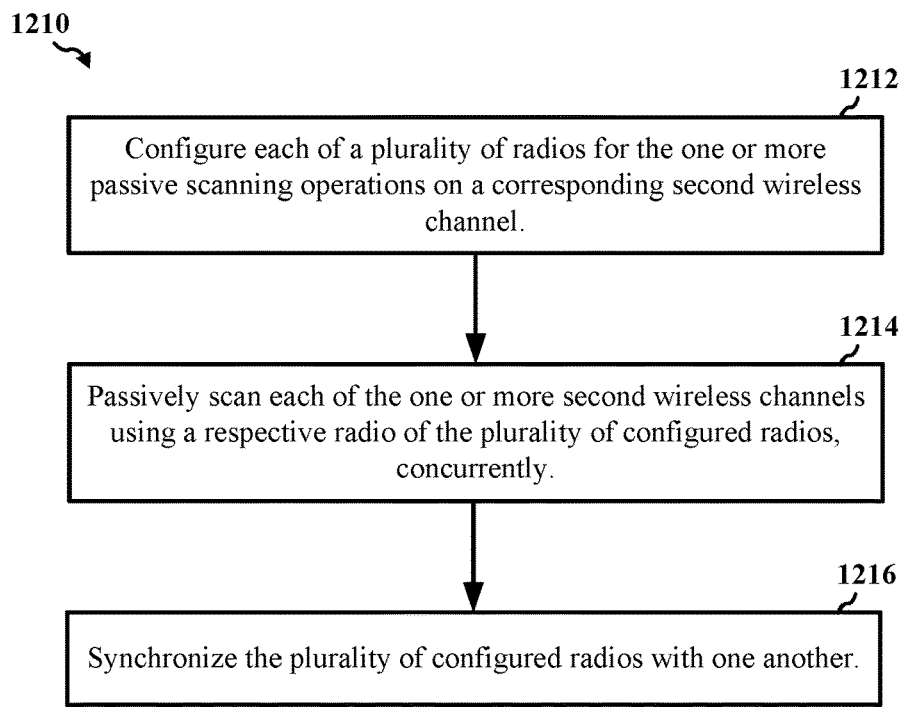
FIG. 12B shows a flowchart illustrating an example operation for wireless communication that supports passive scanning operations, according to some implementations.

FIG. 12B shows a flowchart illustrating an example operation 1210 for wireless communication that supports passive scanning operations. The operation 1210 may be performed by an apparatus of a wireless communication device such as the wireless communication device 400 described above with reference to FIG. 4. In some implementations, the operation 1210 may be performed by a wireless communication device operating as or within a STA, such as one of the STAs 104 and 504 described above with reference to FIGS. 1 and 5B, respectively. In some instances, the operation 1210 may be one example of performing the one or more passive scanning operations in block 908 of FIG. 9A.

For example, at block 1212, the wireless communication device configures each of a plurality of radios for the one or more passive scanning operations on a corresponding second wireless channel. At block 1214, the wireless communication device passively scans each of the one or more second wireless channels using a respective radio of the plurality of configured radios, concurrently. In some implementations, the operation 1210 may continue at block 1216, where the wireless communication device synchronizes the plurality of configured radios with one another. In this way, implementations of the subject matter disclosed herein may ensure that each of the plurality of configured radios begins and ends the respective passive scanning operation at the same time, thereby preventing some configured radios from transmitting wireless signals while other configured radios are passively listening for beacon frames.

Figure 13A:
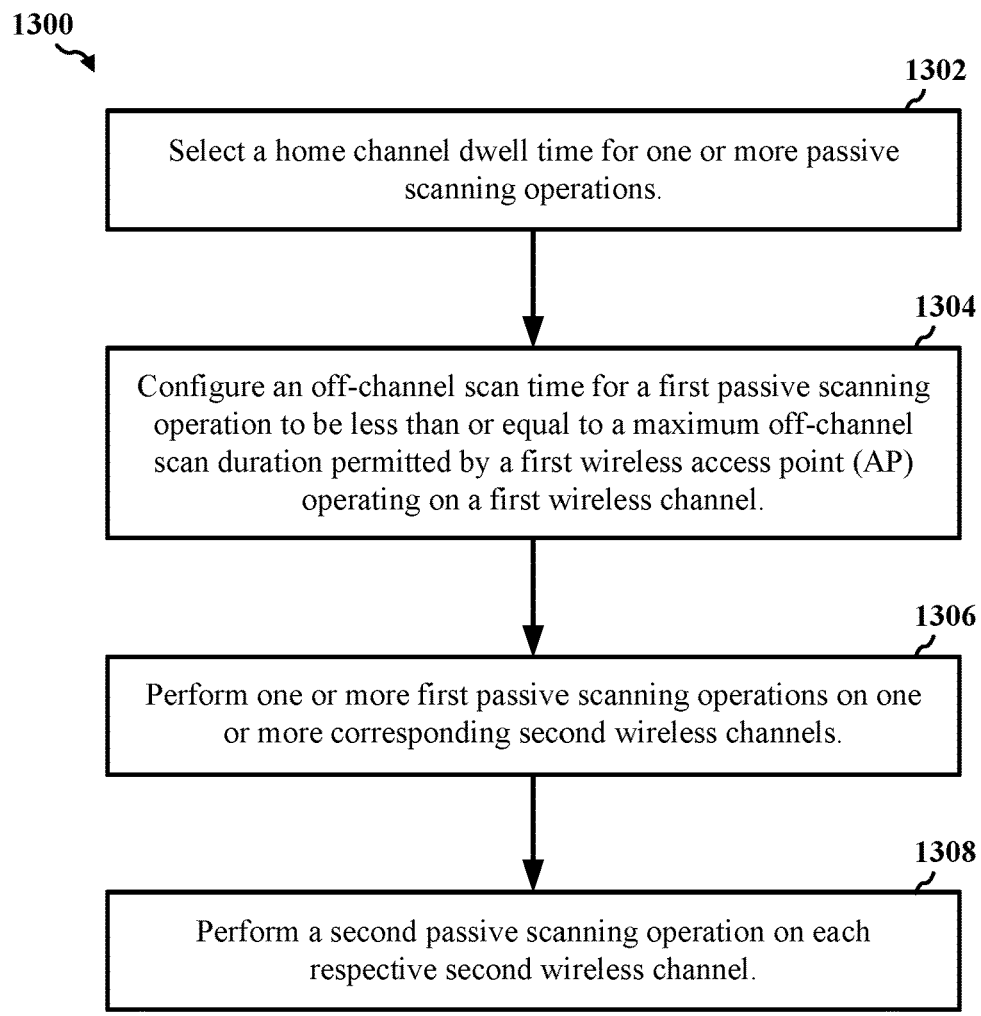
FIGS. 13A, 13B, and 13C show flowcharts illustrating example operations for wireless communication that support passive scanning operations, according to some other implementations.

FIG. 13A shows a flowchart illustrating an example operation 1300 for wireless communication that supports passive scanning operations. The operation 1300 may be performed by an apparatus of a wireless communication device such as the wireless communication device 400 described above with reference to FIG. 4. In some implementations, the operation 1300 may be performed by a wireless communication device operating as or within a STA, such as one of the STAs 104 and 504 described above with reference to FIGS. 1 and 5B, respectively.

For example, at block 1302, the wireless communication device selects a home channel dwell time for one or more passive scanning operations. At block 1304, the wireless communication device configures an off-channel scan time for a first passive scanning operation to be less than or equal to a maximum off-channel scan duration permitted by a first wireless access point (AP) operating on a first wireless channel. At block 1306, the wireless communication device performs one or more first passive scanning operations on one or more corresponding second wireless channels. At block 1308, the wireless communication device performs a second passive scanning operation on each respective second wireless channel.

In some implementations, the maximum off-channel scan duration and the maximum scanning period may be specified by an off-channel scanning procedure associated with a low-latency application. The first wireless channel may be a home channel associated with the real-time gaming application. In some instances, the one or more second wireless channels may include 16 dynamic frequency selection (DFS) channels in a 5 GHz frequency spectrum. In other instances, the one or more second wireless channels may include one or more preferred scanning channels (PSCs) in a 6 GHz frequency spectrum.

In some implementations, the one or more second wireless channels are sequentially scanned using a same radio of the wireless communication device. In some other implementations, the one or more second wireless channels are concurrently scanned using one or more corresponding radios of the wireless communication device.

Figure 13B:
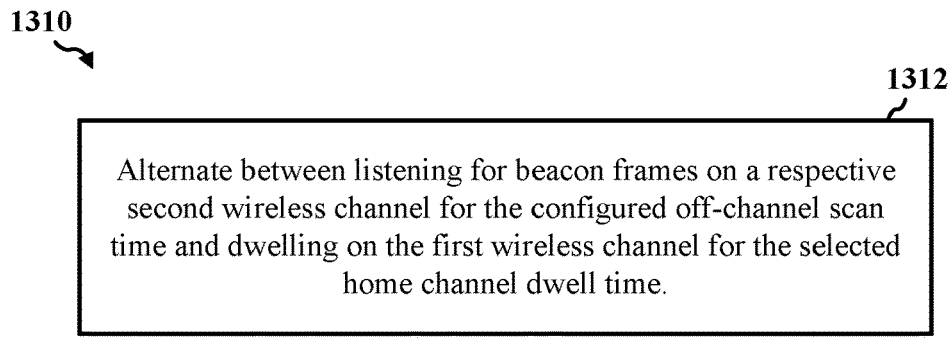

FIG. 13B shows a flowchart illustrating an example operation 1310 for wireless communication that supports passive scanning operations. The operation 1310 may be performed by an apparatus of a wireless communication device such as the wireless communication device 400 described above with reference to FIG. 4. In some implementations, the operation 1310 may be performed by a wireless communication device operating as or within a STA, such as one of the STAs 104 and 504 described above with reference to FIGS. 1 and 5B, respectively. In some instances, the operation 1310 may be one example of performing the one or more passive scanning operations in block 1306 of FIG. 13A.

For example, at block 1312, the wireless communication device alternates between listening for beacon frames on a respective second wireless channel for the configured off-channel scan time and dwelling on the first wireless channel for the selected home channel dwell time. At block 1314, the wireless communication device listens for beacon frames on the respective second wireless channel during a second portion of the configured scanning period, the second portion spanning a period of time defined by the selected home channel dwell time.

Figure 13C:
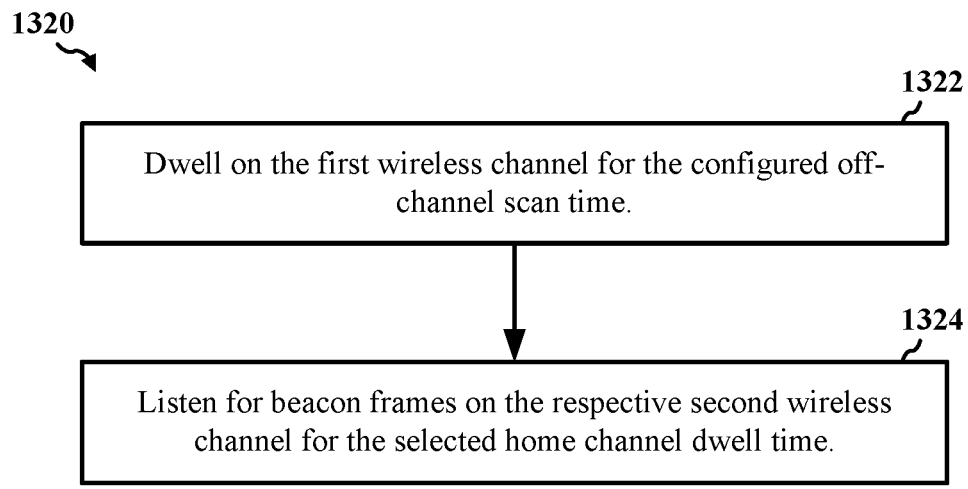

FIG. 13C shows a flowchart illustrating an example operation 1320 for wireless communication that supports passive scanning operations. The operation 1320 may be performed by an apparatus of a wireless communication device such as the wireless communication device 400 described above with reference to FIG. 4. In some implementations, the operation 1320 may be performed by a wireless communication device operating as or within a STA, such as one of the STAs 104 and 504 described above with reference to FIGS. 1 and 5B, respectively. In some instances, the operation 1320 may be one example of performing a respective second passive scanning operation in block 1308 of FIG. 13A.

For example, at block 1322, the wireless communication device dwells on the first wireless channel for the configured off-channel scan time. At block 1324, the wireless communication device listens listening for beacon frames on the respective second wireless channel for the selected home channel dwell time.

Figure 14:
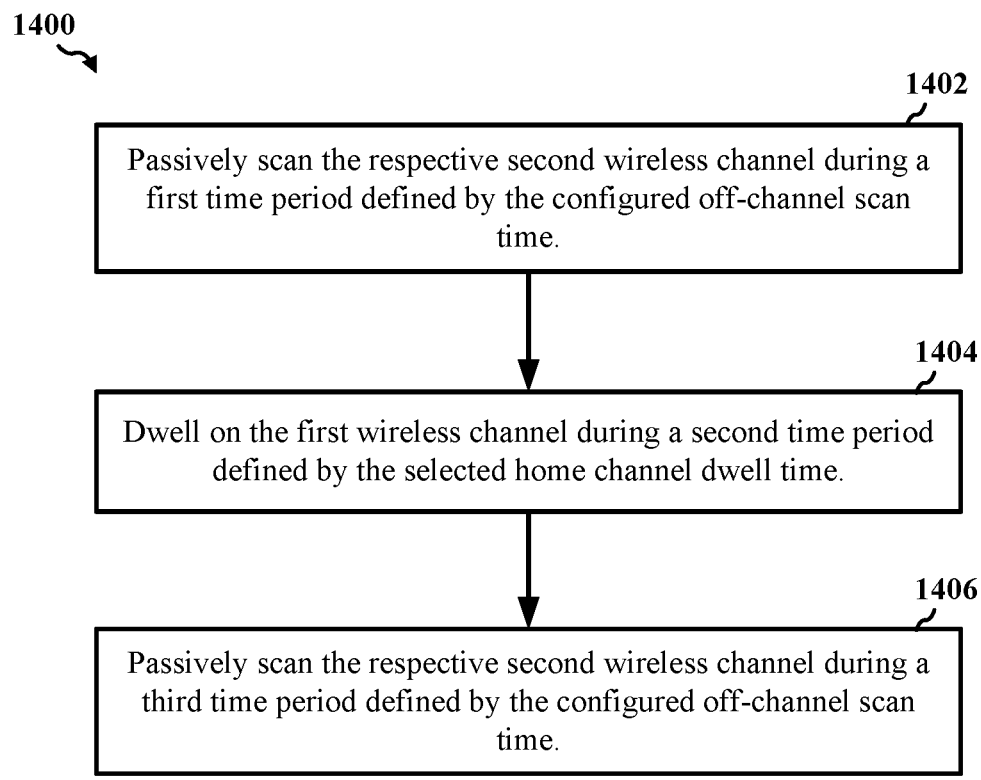
FIG. 14 shows a flowchart illustrating an example operation for wireless communication that supports passive scanning operations, according to some other implementations.

FIG. 14 shows a flowchart illustrating an example operation 1400 for wireless communication that supports passive scanning operations. FIG. 14A shows a flowchart illustrating an example operation 1400 for wireless communication that supports passive scanning operations. The operation 1400 may be performed by an apparatus of a wireless communication device such as the wireless communication device 400 described above with reference to FIG. 4. In some implementations, the operation 1400 may be performed by a wireless communication device operating as or within a STA, such as one of the STAs 104 and 504 described above with reference to FIGS. 1 and 5B, respectively. In some instances, the operation 1400 may be one example of alternating between listening for beacon frames on the respective second wireless channel and dwelling on the first wireless channel in block 1312 of FIG. 13B.

For example, at block 1402, the wireless communication device passively scans the respective second wireless channel during a first time period defined by the configured off-channel scan time. At block 1404, the wireless communication device dwells on the first wireless channel during a second time period defined by the selected home channel dwell time. At block 1406, the wireless communication device passively scans the respective second wireless channel during a third time period defined by the configured off-channel scan time.

Figure 15A:
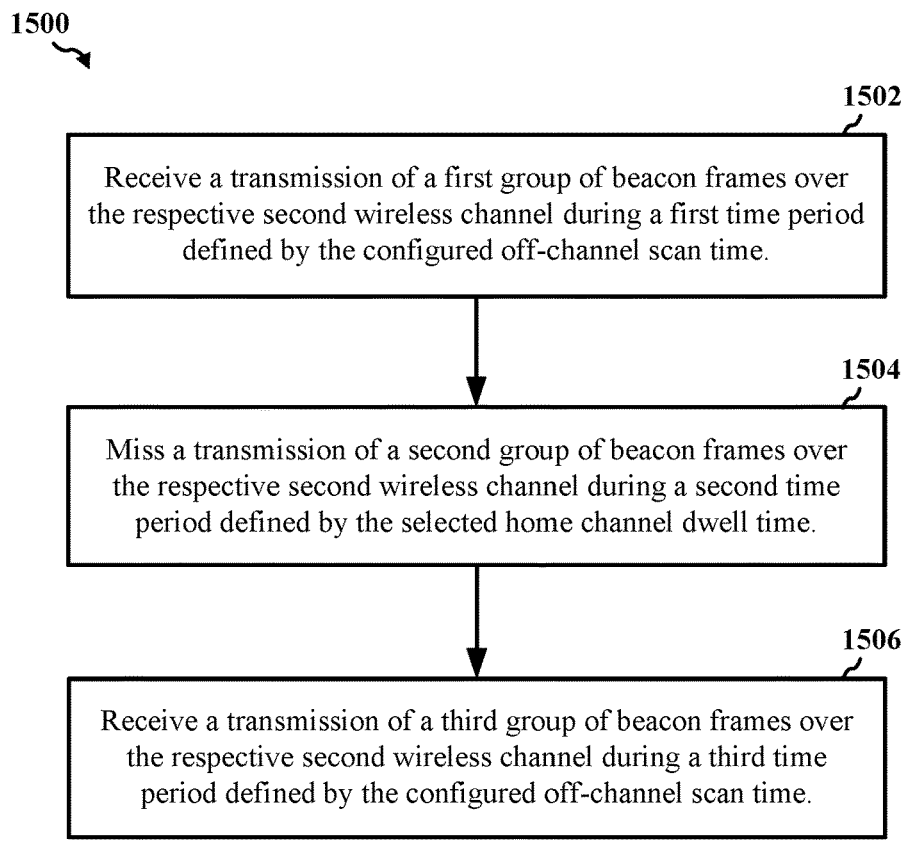
FIGS. 15A and 15B show flowcharts illustrating example operations for wireless communication that support passive scanning operations, according to some other implementations.

FIG. 15A shows a flowchart illustrating an example operation 1500 for wireless communication that supports passive scanning operations. The operation 1500 may be performed by an apparatus of a wireless communication device such as the wireless communication device 400 described above with reference to FIG. 4. In some implementations, the operation 1500 may be performed by a wireless communication device operating as or within a STA, such as one of the STAs 104 and 504 described above with reference to FIGS. 1 and 5B, respectively. In some instances, the operation 1500 may be one example of alternating between listening for beacon frames on the respective second wireless channel and dwelling on the first wireless channel in block 1312 of FIG. 13B.

For example, at block 1502, the wireless communication device receives a transmission of a first group of beacon frames over the respective second wireless channel during a first time period defined by the configured off-channel scan time. At block 1504, the wireless communication device misses a transmission of a second group of beacon frames over the respective second wireless channel during a second time period defined by the selected home channel dwell time. At block 1506, the wireless communication device receives a transmission of a third group of beacon frames over the respective second wireless channel during a third time period defined by the configured off-channel scan time.

Figure 15B:
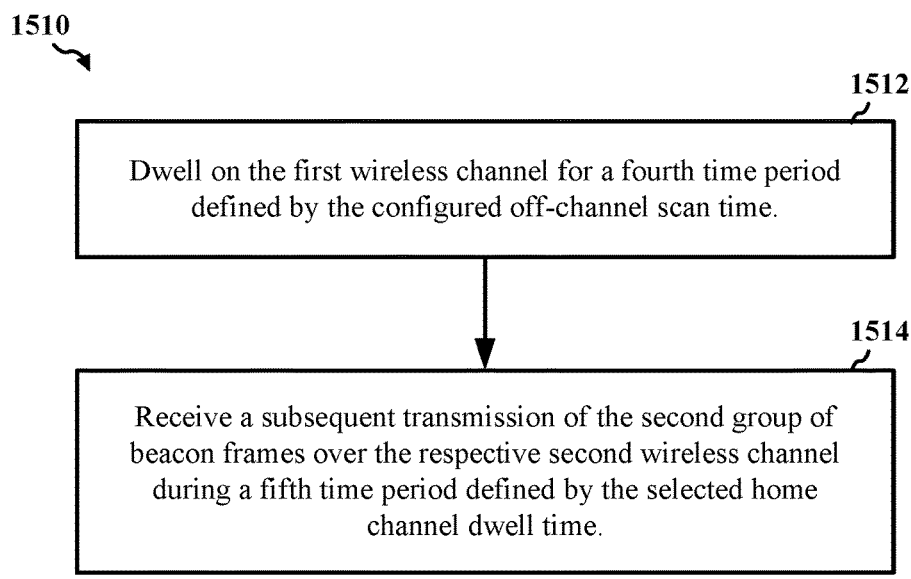

FIG. 15B shows a flowchart illustrating an example operation 1510 for wireless communication that supports passive scanning operations. The operation 1510 may be performed by an apparatus of a wireless communication device such as the wireless communication device 400 described above with reference to FIG. 4. In some implementations, the operation 1510 may be performed by a wireless communication device operating as or within a STA, such as one of the STAs 104 and 504 described above with reference to FIGS. 1 and 5B, respectively. In some instances, the operation 1510 may be one example of performing the second passive scanning operation in block 1308 of FIG. 13A.

For example, at block 1512, the wireless communication device dwells on the first wireless channel for a fourth time period defined by the configured off-channel scan time. At block 1514, the wireless communication device receives a subsequent transmission of the second group of beacon frames over the respective second wireless channel during a fifth time period defined by the selected home channel dwell time.

Figure 16:
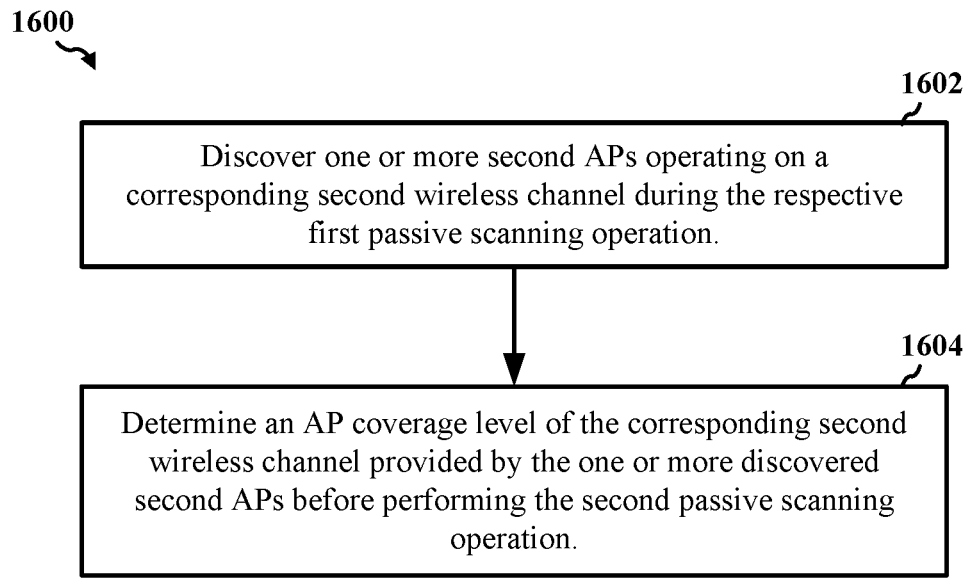
FIG. 16 shows a flowchart illustrating an example operation for wireless communication that supports passive scanning operations, according to some other implementations.

FIG. 16 shows a flowchart illustrating an example operation 1600 for wireless communication that supports passive scanning operations. The operation 1600 may be performed by an apparatus of a wireless communication device such as the wireless communication device 400 described above with reference to FIG. 4. In some implementations, the operation 1600 may be performed by a wireless communication device operating as or within a STA, such as one of the STAs 104 and 504 described above with reference to FIGS. 1 and 5B, respectively. In some instances, the operation 1600 may be performed in conjunction with performing the one or more first passive scanning operations in block 1306 of FIG. 13.

For example, at block 1602, the wireless communication device discovers one or more second APs operating on a corresponding second wireless channel during the respective first passive scanning operation. At block 1604, the wireless communication device determines an AP presence level of the corresponding second wireless channel provided by the one or more discovered second APs before performing the second passive scanning operation. In some implementations, the second passive scanning operation is performed only when the determined AP presence level is less than a value. In addition, or in the alternative, the wireless communication device may refrain from performing the second passive scanning operation when the determined AP presence level is greater than or equal to the value. In some instances, the one or more discovered APs may be reported to an application layer of the wireless communication device from a medium access control (MAC) layer of the wireless communication device before performing the second passive scanning operation.

Figure 17:
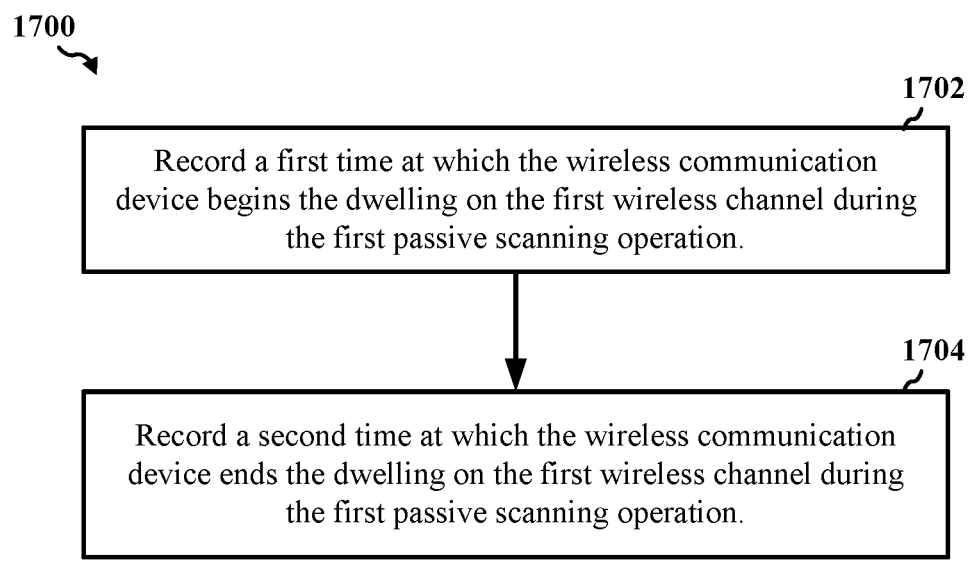
FIG. 17 shows a flowchart illustrating an example process for wireless communication that supports passive scanning operations, according to some other implementations.

FIG. 17 shows a flowchart illustrating an example operation 1700 for wireless communication that supports passive scanning operations. The operation 1700 may be performed by an apparatus of a wireless communication device such as the wireless communication device 400 described above with reference to FIG. 4. In some implementations, the operation 1700 may be performed by a wireless communication device operating as or within a STA, such as one of the STAs 104 and 504 described above with reference to FIGS. 1 and 5B, respectively. In some instances, the operation 1700 may be performed in conjunction with performing the one or more first passive scanning operations in block 1306 of FIG. 13.

For example, at block 1702, the wireless communication device records a first time at which the wireless communication device begins the dwelling on the first wireless channel during the first passive scanning operation. At block 1704, the wireless communication device records a second time at which the wireless communication device ends the dwelling on the first wireless channel during the first passive scanning operation. In some implementations, the time period between the first time and the second time recorded for the first passive scanning operation defines a duration of the selected home channel dwell time for the second passive scanning operation.

Passive scanning operations and techniques disclosed herein may be configured to meet various timing, latency, and throughput requirements specified by an application or system. In some implementations, the passive scanning operations disclosed herein may be configured or adjusted to comply with various timing requirements such as (but not limited to) a minimum dwell time that the STA is to remain on the home channel, a maximum period of time that the STA can be away from the home channel, and a maximum scanning period. For example, when a real-time gaming application specifies an overall scanning duration of 160 TUs, specifies that the STA cannot be off-channel for more than 45 ms at a time, and specifies that the STA is to dwell on the home channel for at least 20 ms at a time, passive scanning operations suitable for the real-time gaming application are limited to scanning periods of 160 TUs, maximum off-channel scan times of 45 ms, and minimum home channel dwell times of 20 ms. These performance metrics may limit the number of parameters of a passive scanning operation that can be adjusted.

When an application or system has less stringent timing, latency, or throughput requirements, a greater number of a passive scanning parameters may be adjusted without sacrificing AP coverage levels. For example, an infotainment system configured to stream movies to the occupants of a vehicle may not specify a maximum off-channel scan time, a minimum home channel dwell time, or a maximum scan period. As such, passive scanning operations configured for the infotainment system may have longer scan periods, longer off-channel scan times, or shorter home channel dwell times than passive scanning operations configured for the example real-time gaming application referenced herein.

Figure 18:
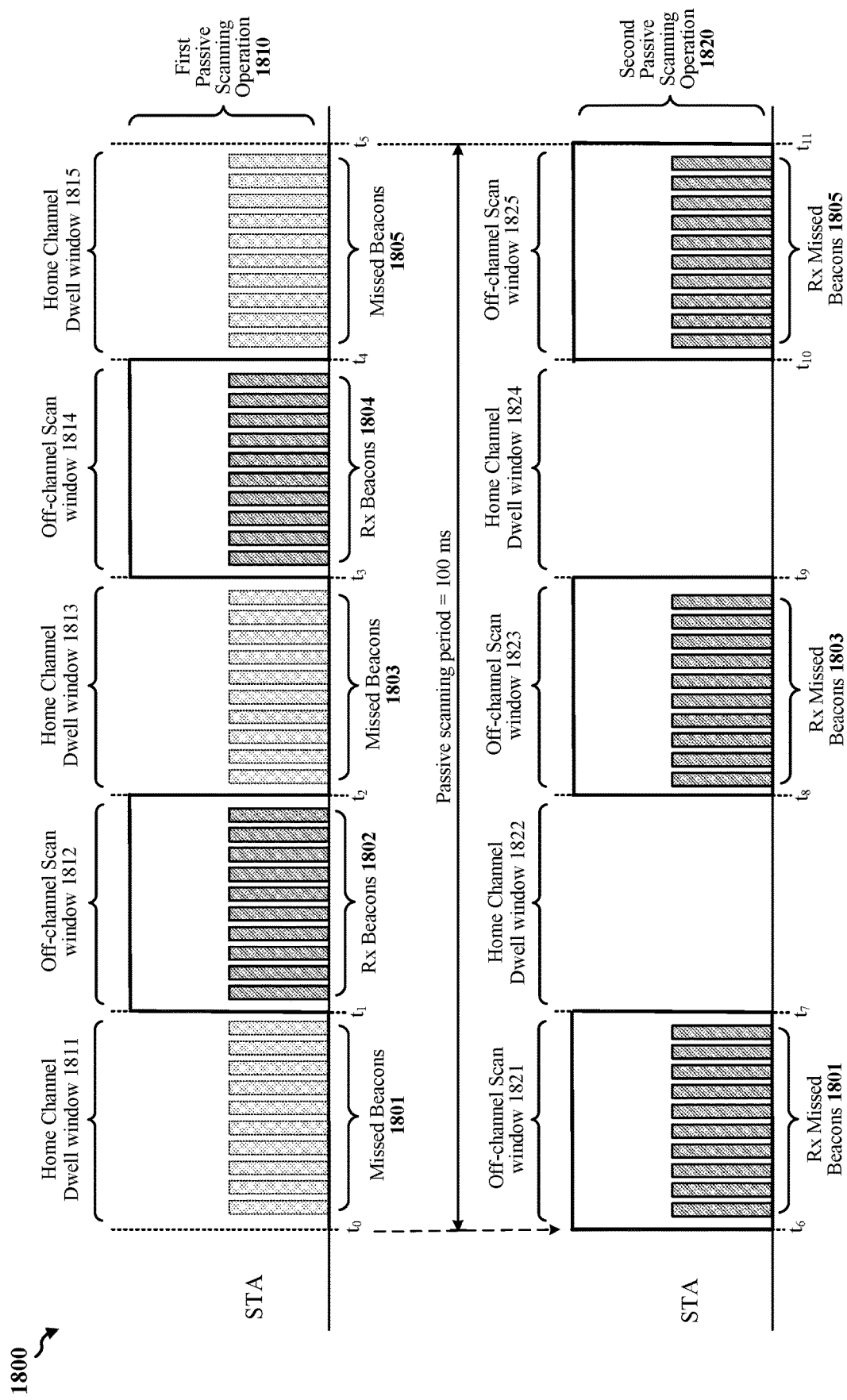
FIG. 18 shows a timing diagram illustrating another example passive scanning operation.

FIG. 18 shows a timing diagram of another example operation 1800 for wireless communication that supports passive scanning operations. The operation 1800 may be performed by an apparatus of a wireless communication device such as the wireless communication device 400 described above with reference to FIG. 4. In some implementations, the operation 1800 may be performed by a wireless communication device operating as or within a STA, such as one of the STAs 104 and 504 described above with reference to FIGS. 1 and 5B, respectively. For purposes of illustration, the example operation 1800 is described below with reference to a STA.

The operation 1800 is shown to include a first passive scanning operation 1810 and a second passive scanning operation 1820. The first passive scanning operation 1810 includes two off-channel scan windows 1812 and 1814 interleaved with three home channel dwell windows 1811, 1813, and 1815. The second passive scanning operation 1820 includes three off-channel scan windows 1821, 1823, and 1825 interleaved with two home channel dwell windows 1822 and 1824. In some implementations, the windows 1811-1815 of the first passive scanning operation 1810 may be of equal durations, and the windows 1821-1825 of the second passive scanning operation 1820 may be of equal durations. In some instances, the windows 1811-1815 of the first passive scanning operation 1810 may have the same durations as the windows 1821-1825 of the second passive scanning operation 1820.

In some implementations, the duration of the home channel dwell windows and the off-channel scan windows of the first and second passive scanning operations 1810 and 1820 may be based at least in part on the scanning period of the operation 1800. As an example, if the scanning period of the operation 1800 is 100 TUs, then each of the five windows 1811-1815 of the first passive scanning operation 1810 may have a duration of 20 TUs, and each of the five windows 1821-1825 of the second passive scanning operation 1820 may have a duration of 20 TUs. That is, the dwell time for the home channel dwell windows 1811, 1813, and 1815 of the first passive scanning operation 1810 is 20 TUs, and the scan time for the off-channel scan windows 1812 and 1814 of the first passive scanning operation 1810 is 20 TUs. Similarly, the scan time for the off-channel scan windows 1821, 1823, and 1825 of the second passive scanning operation 1820 is 20 TUs, and the dwell time for the home channel dwell windows 1822 and 1824 of the second passive scanning operation 1820 is 20 TUs.

As another example, if the scanning period of the operation 1800 is 150 TUs, then each of the five windows 1811-1815 of the first passive scanning operation 1810 may have a duration of 30 TUs, and each of the five windows 1821-1825 of the second passive scanning operation 1820 may have a duration of 30 TUs. That is, the dwell time for each of the home channel dwell windows 1811, 1813, and 1815 of the first passive scanning operation 1810 is 30 TUs, the scan times for the off-channel scan windows 1812 and 1814 of the first passive scanning operation 1810 is 30 TUs, the dwell time for each of the home channel dwell windows 1821, 1823, and 1825 of the second passive scanning operation 1820 is 30 TUs, and the scan times for the off-channel scan windows 1822 and 1824 of the first passive scanning operation 1820 is 30 TUs.

The number of home channel dwell windows, the number of off-channel scan windows, the duration of the home channel dwell windows, and the duration of the off-channel scan windows in a respective passive scanning operation also may be based on the scanning period. As an example, when the passive scanning period is 100 TUs, the first and second passive scanning operations 1810 and 1820 can include five windows each having a duration of 20 ms, as shown in FIG. 18. As another example, the first and second passive scanning operations 1810 and 1820 can each include seven windows instead of five windows. More specifically, in some instances, the first passive scanning operation 1810 can include four off-channel scan windows interleaved with three home channel dwell windows, and the second passive scanning operation 1820 can include four home channel dwell windows interleaved with three off-channel scan windows, where the home channel dwell windows and the off-channel scan windows each have a duration of 14 TUs.

In some instances, latencies associated with transmitting or receiving data on the home channel may be affected by the durations of the off-channel scan windows of a passive scanning operation (such as the operation 1800 of FIG. 18). These latencies tend to increase when the STA dwells on the home channel relatively infrequently or for relatively short periods of time, and tend to decrease when the STA dwells on the home channel relatively frequently or for relatively long periods of time. If the off-channel scan times of a passive scanning operation are decreased (such as from 20 TUs to 14 TUs), the STA may spend less time performing off-channel scans and more time dwelling on the home channel, thereby increasing the likelihood that the STA is available for transmitting and receiving data on the home channel. In this way, wireless communication devices that practice aspects of the subject matter disclosed herein may increase throughput and reduce latencies by adjusting the off-channel scan times of the passive scanning operations disclosed herein.

Thus, although the first and second passive scanning operations 1810 and 1820 are shown in the example of FIG. 18 as including five windows arranged in a certain sequence (such as two home channel dwell windows interleaved between three off-channel scan windows), in some other implementations, one or both of the first and second passive scanning operations 1810 and 1820 may include other numbers of scan windows and dwell windows arranged in other sequences. In some implementations, one or more of the passive scanning period, the off-channel scan times, and the home channel dwell times can be configured or adjusted in response to a number of specified performance requirements. In some instances, the specified scanning period may be obtained from an application layer of the STA. For example, when the STA is streaming video in conjunction with an infotainment system of a vehicle, the application layer may be responsible for presenting the video on a display screen of the STA or the infotainment system. In response to obtaining the scanning period, the STA may select one or more of the number of scan windows, the off-channel scan times, or the home channel dwell times based on one or more performance metrics specified by the infotainment system. In addition, or in the alternative, one or both of the off-channel scan times or the home channel dwell times may be obtained from the application layer.

The STA initially camps on the first wireless channel (also referred to herein as the home channel), and starts the passive scanning operation 1800 at time $t_0$ by dwelling on the first wireless channel during the home channel dwell window 1811 between times to and $t_1$. While dwelling on the home channel, the STA misses a number of first beacon frames 1801 transmitted over the second wireless channel between times $t_0$ and $t_1$. In some implementations, the STA may use a counter or timer to measure the home channel dwell time based on timestamps captured for $t_0$ and $t_1$. In some instances, the measured home channel dwell time may be used to configure or adjust the duration of a corresponding off-channel scan window in the second passive scanning operation 1820.

At time $t_1$, the STA leaves the first wireless channel, switches to the second wireless channel, and passively listens for beacon frames on the second wireless channel during the off-channel scan window 1812 between times $t_1$ and $t_2$. In some implementations, the STA may use the counter or timer to measure the off-channel scan time based on timestamps captured for $t_1$ and $t_2$. In some instances, the STA may use the measured off-channel scan time to configure or adjust the duration of a corresponding home channel dwell window in the second passive scanning operation 1820. The STA receives one or more second beacon frames 1802 transmitted over the second wireless channel during the off-channel scan window 1812.

At time $t_2$, the STA leaves the second wireless channel, switches to the first wireless channel, and dwells on the first wireless channel during the home channel dwell window 1813 between times $t_2$ and $t_3$. While dwelling on the home channel, the STA misses a number of third beacon frames 1803 transmitted over the second wireless channel between times $t_2$ and $t_3$. At time $t_3$, the STA leaves the first wireless channel, switches to the second wireless channel, and passively listens for beacon frames on the second wireless channel during the off-channel scan window 1814 between times $t_3$ and $t_4$. The STA receives one or more fourth beacon frames 1804 transmitted over the second wireless channel during the off-channel scan window 1814.

At time $t_4$, the STA leaves the second wireless channel, switches to the first wireless channel, and dwells on the first wireless channel during the home channel dwell window 1815 between times $t_4$ and $t_5$. In some implementations, time $t_5$ may indicate an end of the first passive scanning operation 1810. In some instances, the STA may continue dwelling on the first wireless channel until the second passive scanning operation 1820 is initiated.

At time $t_6$, which may be contemporaneous with time $t_5$ or may be later than time $t_5$ by a suitable interframe spacing (IFS) duration, the second passive scanning operation 1820 begins. The STA leaves the first wireless channel, switches to the second wireless channel, and passively listens for beacon frames on the second wireless channel during the off-channel scan window 1821 between times $t_6$ and $t_7$. When the off-channel scan window 1821 of the second passive scanning operation 1820 is aligned with the home channel dwell window 1811 of the first passive scanning operation 1810, the off-channel scan window 1821 may allow the STA to receive or obtain subsequent transmissions of the first beacon frames 1801 that were not previously received by the STA while dwelling on the home channel between times $t_0$ and $t_1$. That is, although the STA missed the first beacon frames 1801 broadcast at a target beacon transmission time (TBTT) of a first beacon period, the STA can receive the first beacon frames 1801 broadcast at the TBTT in a second beacon period that is aligned with the off-channel scan window 1821. As shown, the STA receives the subsequent transmission of first beacon frames 1801 over the second wireless channel between times $t_6$ and $t_7$.

In some implementations, the duration of the off-channel scan window 1821 may be selected or adjusted based on the duration of the home channel dwell window 1811 of the first passive scanning operation 1810. In some instances, the home channel dwell time determined for the home channel dwell window 1811 may be used as the duration of the off-channel scan window 1821. In this way, the off-channel scan window 1821 may have the same duration as the home channel dwell window 1811 and may be aligned with the beacon period of the first beacon frames, thereby ensuring that all of the first beacon frames 1801 missed while the STA was dwelling on the home channel between times $t_0$ and $t_1$ can be received in a subsequent transmission of the first beacon frames 1801 between times $t_6$ and $t_7$.

At time $t_7$, the STA leaves the second wireless channel, switches to the first wireless channel, and dwells on the first wireless channel during the home channel dwell window 1822 between times $t_7$ and $t_8$. Although the STA does not receive the subsequent transmission of the second beacon frames 1802 during the second passive scanning operation 1820, the STA already received the second beacon frames 1802 during the first passive scanning operation 1810.

At time $t_8$, the STA leaves the first wireless channel, switches to the second wireless channel, and passively listens for beacon frames on the second wireless channel during the off-channel scan window 1823 between times $t_8$ and $t_9$. When the off-channel scan window 1823 of the second passive scanning operation 1820 is aligned with the home channel dwell window 1813 of the first passive scanning operation 1810, the off-channel scan window 1823 may allow the STA to receive or obtain subsequent transmissions of the third beacon frames 1803 that were not previously received by the STA while dwelling on the home channel between times $t_2$ and $t_3$. That is, although the STA missed the third beacon frames 1803 broadcast at a TBTT of one beacon period, the STA can receive the third beacon frames 1803 broadcast at the TBTT in a next beacon period that is aligned with the off-channel scan window 1823. As shown, the STA receives the subsequent transmission of third beacon frames 1803 over the second wireless channel between times $t_6$ and $t_7$.

In some implementations, the duration of the off-channel scan window 1823 may be selected or adjusted based on the duration of the home channel dwell window 1813 of the first passive scanning operation 1810. In some instances, the home channel dwell time determined for the home channel dwell window 1813 may be used as the duration of the off-channel scan window 1823. In this way, the off-channel scan window 1823 may have the same duration as the home channel dwell window 1813 and may be aligned with the beacon period of the third beacon frames 1803, thereby ensuring that all of the third beacon frames 1803 missed while the STA was dwelling on the home channel between times $t_2$ and $t_3$ can be received in a subsequent transmission of the third beacon frames 1803 between times $t_6$ and $t_7$.

At time $t_9$, the STA leaves the second wireless channel, switches to the first wireless channel, and dwells on the first wireless channel during the home channel dwell window 1824 between times $t_9$ and $t_{10}$. Although the STA does not receive the subsequent transmission of the fourth beacon frames 1804 during the second passive scanning operation 1820, the STA already received the fourth beacon frames 1804 during the first passive scanning operation 1810.

At time $t_{10}$, the STA leaves the first wireless channel, switches to the second wireless channel, and passively listens for beacon frames on the second wireless channel during the off-channel scan window 1825 between times $t_{10}$ and $t_{11}$. When the off-channel scan window 1825 of the second passive scanning operation 1820 is aligned with the home channel dwell window 1815 of the first passive scanning operation 1810, the off-channel scan window 1825 may allow the STA to receive or obtain subsequent transmissions of the fifth beacon frames 1805 that were not previously received by the STA while dwelling on the home channel between times $t_4$ and $t_5$. That is, although the STA missed the fifth beacon frames 1805 broadcast at a TBTT of one beacon period, the STA can receive the fifth beacon frames 1805 broadcast at the TBTT in a next beacon period that is aligned with the off-channel scan window 1825. As shown, the STA receives the subsequent transmission of fifth beacon frames 1805 over the second wireless channel between times $t_{10}$ and $t_{11}$.

In some implementations, the duration of the off-channel scan window 1825 may be selected or adjusted based on the duration of the home channel dwell window 1815 of the first passive scanning operation 1810. In some instances, the home channel dwell time determined for the home channel dwell window 1815 may be used as the duration of the off-channel scan window 1825. In this way, the off-channel scan window 1825 may have the same duration as the home channel dwell window 1815 and may be aligned with the beacon period of the fifth beacon frames 1805, thereby ensuring that all of the fifth beacon frames 1805 missed while the STA was dwelling on the home channel between times $t_4$ and $t_5$ can be received in a subsequent transmission of the fifth beacon frames 1805 between times $t_{10}$ and $t_{11}$. In some implementations, time $t_{11}$ may indicate an end of the second passive scanning operation 1820.

Aligning the off-channel scan windows 1821, 1823, and 1825 of the second passive scanning operation 1820 with corresponding home channel dwell windows 1812 and 1814 of the first passive scanning operation 1810 may ensure that beacon frame transmissions missed by the STA while dwelling on the home channel during the first passive scanning operation 1810 occur within the off-channel scan windows of the second passive scanning operation 1820. In some instances, the durations of the off-channel scan windows 1821, 1823, and 1825 may be based on or equal to the home channel dwell times of the home channel dwell windows 1811, 1813, and 1815, respectively. In this way, the STA can receive subsequent transmissions of beacon frames missed during the first passive scanning operation 1810 without violating the timing, latency, or throughput requirements specified by an application or system.

In some implementations, the first wireless channel may be the home channel for low-latency traffic, low-latency wireless communication devices, or low-latency applications. For example, the first wireless channel may be the home channel for a real-time gaming application or a real-time AR/VR application running on or in conjunction with the STA. In some instances, the home channel dwell time and the off-channel scan time may be obtained from the application layer of the STA. In some other instances, the home channel dwell time and the off-channel scan time may be based on one or more of a quality-of-service (QoS), a traffic class, a traffic identifier (TID), or an access category (AC) of low-latency traffic received by or transmitted from the STA.

In some implementations, the STA may capture timestamps of the start and end times (such as $t_0$ and $t_5$) of the first passive scanning operation 1810, and may capture timestamps of the start and end times (such as $t_6$ and $t_{11}$) of the second passive scanning operation 1820. The captured timestamps may be used to align timing aspects of the first and second passive scanning operations 1810 and 1820 with one another. As an example, the start time $t_6$ of the second passive scanning operation 1820 may be synchronized with the start time $t_0$ of the first passive scanning operation 1810, thereby aligning the off-channel scan window 1821 of the second passive scanning operation 1820 with the home channel dwell window 1811 of the first passive scanning operation 1810. As another example, time $t_8$ of the second passive scanning operation 1820 may be synchronized with time $t_2$ of the first passive scanning operation 1810, thereby aligning the off-channel scan window 1823 of the second passive scanning operation 1820 with the home channel dwell window 1813 of the first passive scanning operation 1810. The ability to align timing aspects of the first and second passive scanning operations 1810 and 1820 may ensure that STAs can discover all nearby APs while complying with various timing, latency, and throughput requirements.

In some instances, the STA also may capture timestamps associated with its channel switching operations. The captured channel switching timestamps may indicate temporal boundaries between the interleaved home channel dwell windows and the off-channel scan windows within each of the first and second passive scanning operations 1810 and 1820. The temporal boundaries between the interleaved dwell and scan windows of the second passive scanning operation 1820 may be synchronized with the temporal boundaries between the interleaved scan and dwell windows of the first passive scanning operation 1810. As an example, the timestamp captured at time $t_4$ may indicate the instant in time at which the first passive scanning operation 1810 transitions from the off-channel scan window 1814 to the home channel dwell window 1815, and the timestamp captured at time $t_{10}$ may indicate the instant in time at which the second passive scanning operation 1820 transitions from the home channel dwell window 1824 to the off-channel scan window 1825. As such, the off-channel scan window 1825 of the second passive scanning operation 1820 can be aligned with the home channel dwell window 1815 of the first passive scanning operation 1810 by synchronizing the timestamps for $t_4$ and $t_{10}$ with each other.

In some implementations, the STA may discover one or more other APs during the first passive scanning operation 1810, and may determine an AP coverage level on a given wireless channel provided by the discovered APs before performing the second passive scanning operation 1820. In some instances, the STA may perform the second passive scanning operation 1820 only when the determined AP coverage level is less than a value. In some other instances, the STA may refrain from performing the second passive scanning operation 1820 when the determined AP coverage level is greater than or equal to the value. In addition, or in the alternative, the STA may report the discovered APs from a medium access control (MAC) layer of the STA to an application layer of the STA before performing the second passive scanning operation 1820.

Figure 19:
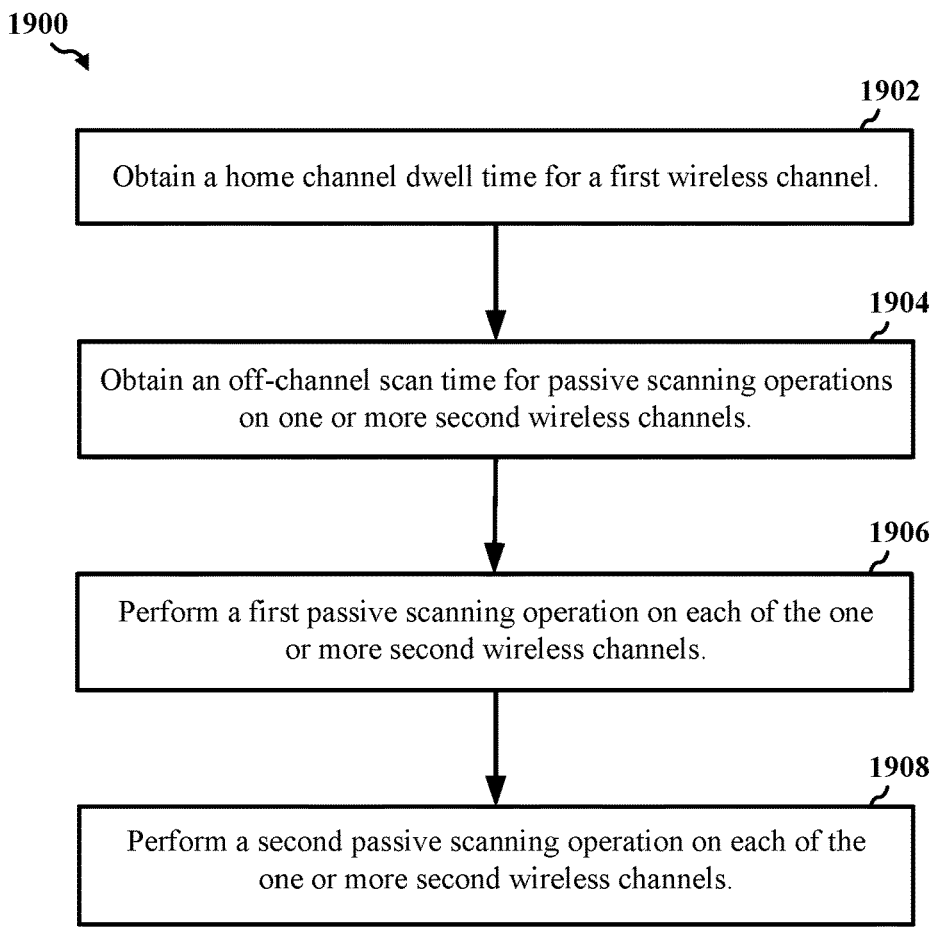
FIG. 19 shows a flowchart illustrating an example operation for wireless communication that supports passive scanning operations, according to some other implementations.

FIG. 19 shows a flowchart illustrating an example operation 1900 for wireless communication that supports passive scanning operations. The operation 1900 may be performed by an apparatus of a wireless communication device such as the wireless communication device 400 of FIG. 4. In some implementations, the operation 1900 may be performed by a wireless communication device operating as or within a STA, such as one of the STAs 104 and 504 described above with reference to FIGS. 1 and 5B, respectively. For example, at block 1902, the wireless communication device obtains a home channel dwell time for a first wireless channel. At block 1904, the wireless communication device obtains an off-channel scan time for passive scanning operations on one or more second wireless channels. At block 1906, the wireless communication device performs a first passive scanning operation on each of the one or more second wireless channels. At block 1908, the wireless communication device performs a second passive scanning operation on each of the one or more second wireless channels. The second passive scanning operation may be used to discover one or more beacon frames missed while dwelling on the first wireless channel during the first passive scanning operation. In some implementations, the second wireless channels may be sequentially scanned using a same radio of the wireless communication device. In some other implementations, the second wireless channels may be concurrently scanned using corresponding radios of the wireless communication device. In some instances, the one or more second wireless channels may include 16 DFS channels in the 5 GHz frequency spectrum. In other instances, the one or more second wireless channels may include one or more PSCs in the 6 GHz frequency spectrum.

In some implementations, the first wireless channel may be a home channel associated with low-latency traffic or low-latency wireless communication devices (such as real-time gaming applications, AR/VR applications, etc.). In some other implementations, the first wireless channel may be a home channel associated with an automotive infotainment system. In some instances, one or both of the home channel dwell time or the off-channel scan time may be obtained from an application layer of the wireless communication device. For example, the application layer may be responsible for displaying received information to the user when the wireless communication device executes real-time gaming applications, real-time AR/VR applications, and other low-latency applications.

In some implementations, the scanning period of the first and second passive scanning operations may be based on a beacon interval of an access point operating on a respective second wireless channel. In some other implementations, the duration of at least one of the home channel dwell time or the off-channel scan time may be based on one or more of a quality-of-service (QoS), a traffic class, a traffic identifier (TID), or an access category (AC) of low-latency traffic received by or transmitted from the wireless communication device. In some instances, the scanning period of the first and second passive scanning operations is approximately 100 time units (TUs). In some other instances, the home channel dwell time is approximately 20 ms, and the off-channel scan time is approximately 20 ms.

Figure 20:
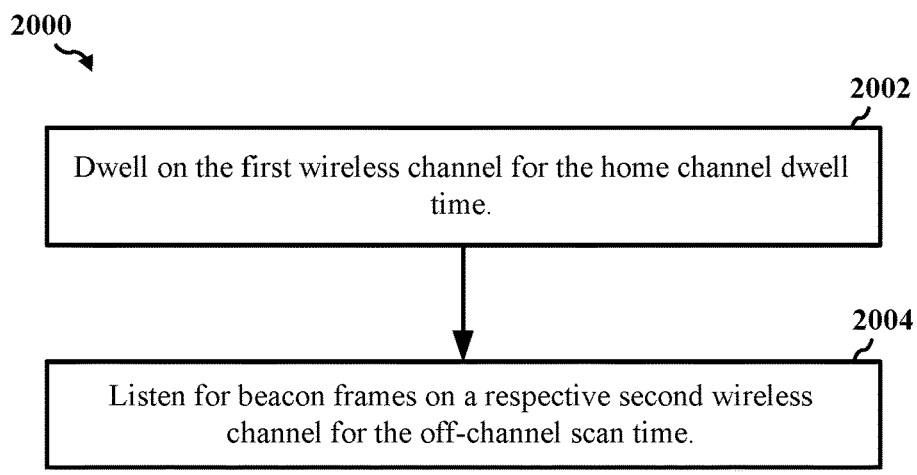
FIG. 20 shows a flowchart illustrating another example operation for wireless communication that supports passive scanning operations, according to some other implementations.

FIG. 20 shows a flowchart illustrating another example operation 2000 for wireless communication that supports passive scanning operations. The operation 2000 may be performed by an apparatus of a wireless communication device such as the wireless communication device 400 of FIG. 4. In some implementations, the operation 2000 may be performed by a wireless communication device operating as or within a STA, such as one of the STAs 104 and 504 described above with reference to FIGS. 1 and 5B, respectively. In some instances, the operation 2000 may be one example of performing the first passive scanning operation in block 1906 of FIG. 19. For example, at block 2002, the wireless communication device dwells on the first wireless channel for the home channel dwell time. At block 2004, the wireless communication device listens for beacon frames on a respective second wireless channel for the off-channel scan time.

Figure 21:
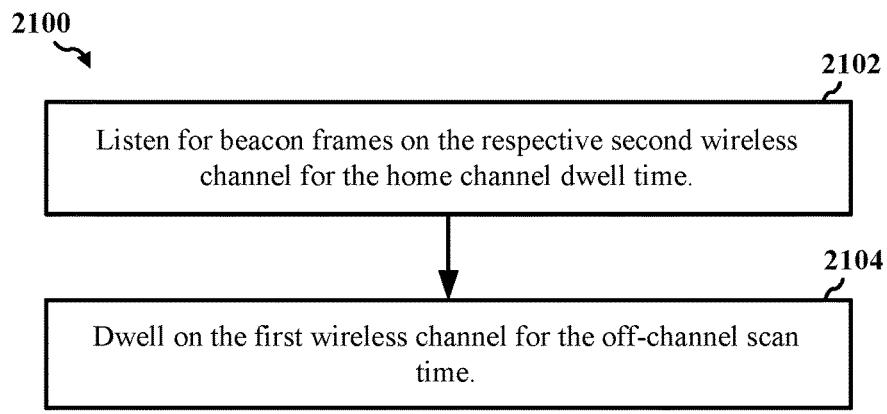
FIG. 21 shows a flowchart illustrating another example operation for wireless communication that supports passive scanning operations, according to some other implementations.

FIG. 21 shows a flowchart illustrating another example operation 2100 for wireless communication that supports passive scanning operations. The operation 2100 may be performed by an apparatus of a wireless communication device such as the wireless communication device 400 of FIG. 4. In some implementations, the operation 2100 may be performed by a wireless communication device operating as or within a STA, such as one of the STAs 104 and 504 described above with reference to FIGS. 1 and 5B, respectively. In some instances, the operation 2100 may be one example of performing the second passive scanning operation in block 1908 of FIG. 19. For example, at block 2102, the wireless communication device listens for beacon frames on the respective second wireless channel for the home channel dwell time. At block 2104, the wireless communication device dwells on the first wireless channel for the off-channel scan time.

Figure 22:
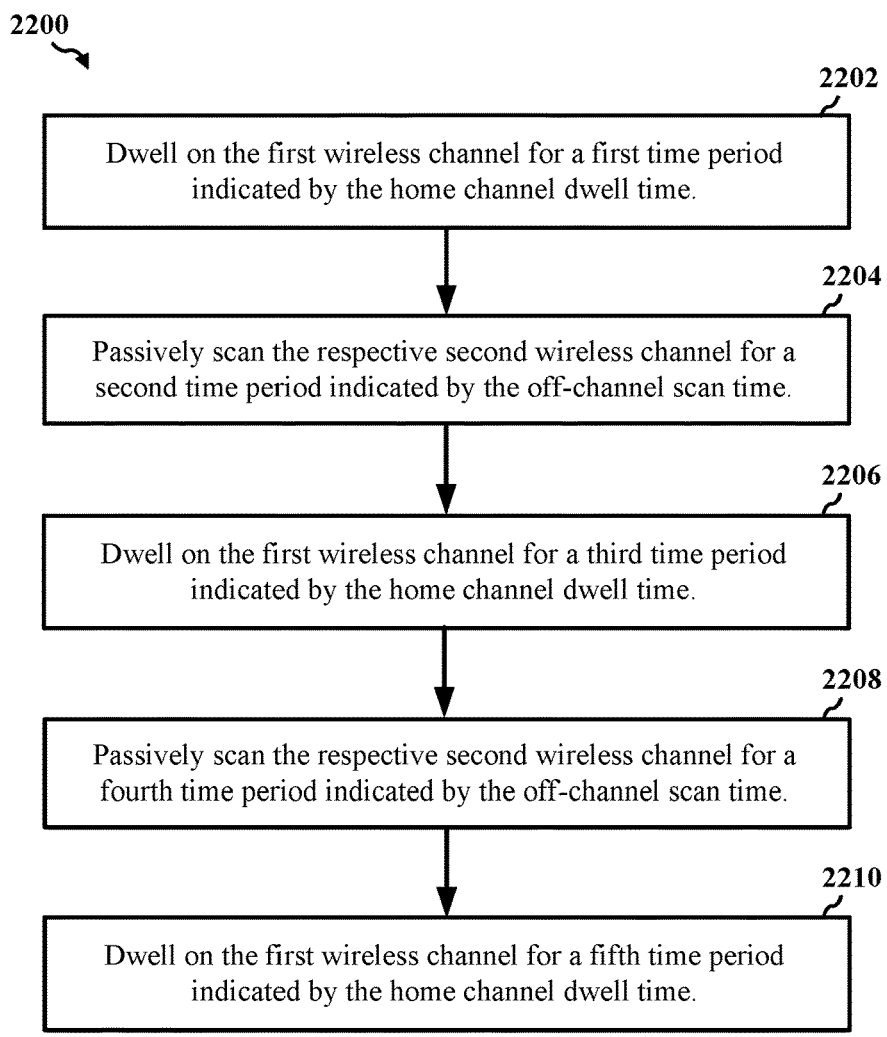
FIG. 22 shows a flowchart illustrating another example operation for wireless communication that supports passive scanning operations, according to some other implementations.

FIG. 22 shows a flowchart illustrating another example operation 2200 for wireless communication that supports passive scanning operations. The operation 2200 may be performed by an apparatus of a wireless communication device such as the wireless communication device 400 of FIG. 4. In some implementations, the operation 2200 may be performed by a wireless communication device operating as or within a STA, such as one of the STAs 104 and 504 described above with reference to FIGS. 1 and 5B, respectively. In some instances, the operation 2200 may be one example of alternating between dwelling on the home channel and passively scanning the respective second wireless channel during the passive scanning operation of block 1906 of FIG. 19.

For example, at block 2202, the wireless communication device dwells on the first wireless channel for a first time period indicated by the home channel dwell time. At block 2204, the wireless communication device passively scans the respective second wireless channel for a second time period indicated by the off-channel scan time. At block 2206, the wireless communication device dwells on the first wireless channel for a third time period indicated by the home channel dwell time. At block 2208, the wireless communication device passively scans the respective second wireless channel for a fourth time period indicated by the off-channel scan time. At block 2210, the wireless communication device dwells on the first wireless channel for a fifth time period indicated by the home channel dwell time.

Figure 23:
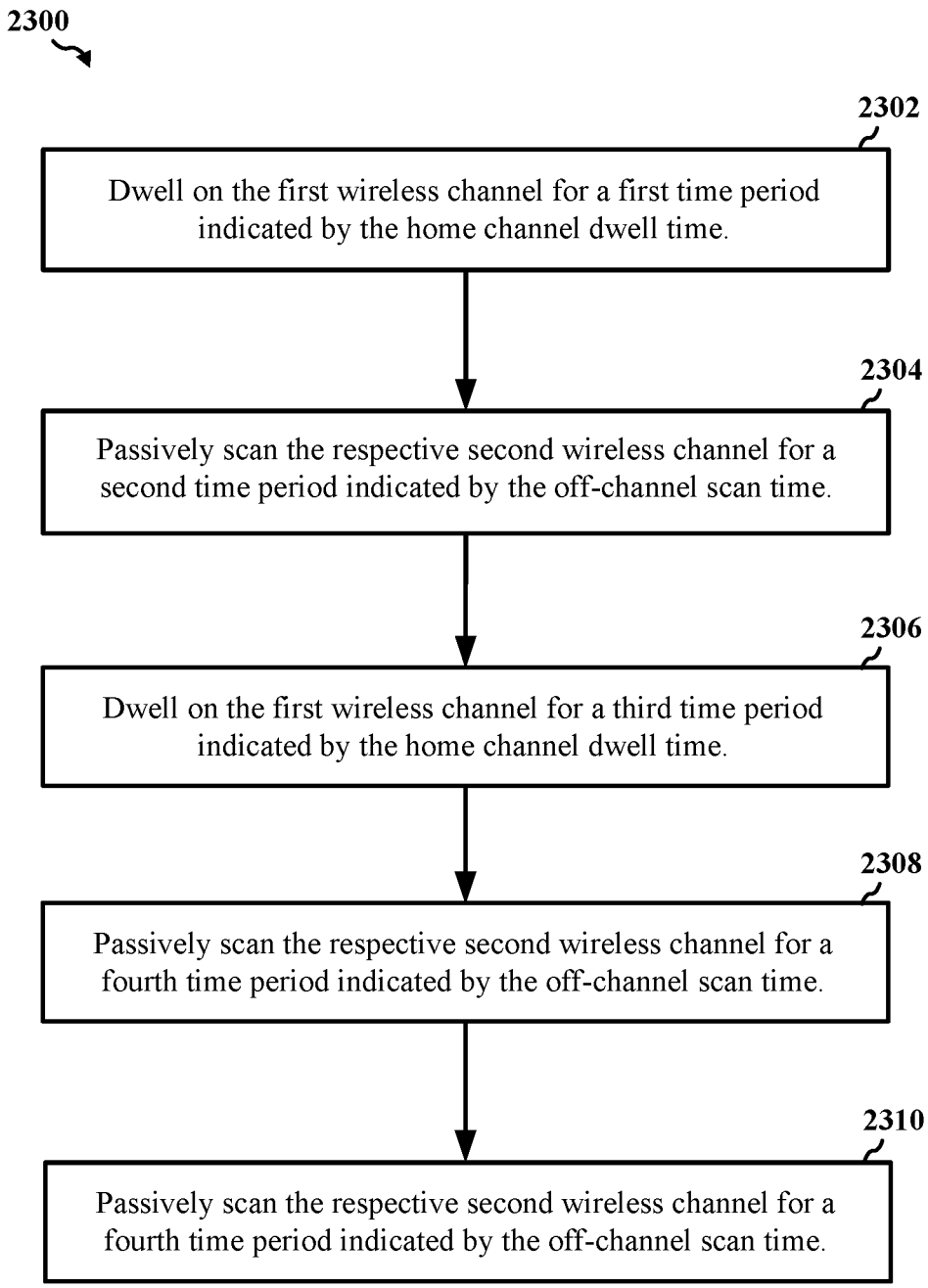
FIG. 23 shows a flowchart illustrating another example operation for wireless communication that supports passive scanning operations, according to some other implementations.

FIG. 23 shows a flowchart illustrating another example operation 2300 for wireless communication that supports passive scanning operations. The operation 2300 may be performed by an apparatus of a wireless communication device such as the wireless communication device 400 of FIG. 4. In some implementations, the operation 2300 may be performed by a wireless communication device operating as or within a STA, such as one of the STAs 104 and 504 described above with reference to FIGS. 1 and 5B, respectively. In some instances, the operation 2300 may be one example of alternating between dwelling on the home channel and passively scanning the respective second wireless channel during the passive scanning operation of block 1908 of FIG. 19.

For example, at block 2302, the wireless communication device passively scans the respective second wireless channel for the first time period indicated by the home channel dwell time. At block 2304, the wireless communication device dwells on the first wireless channel for the second time period indicated by the off-channel scan time. At block 2306, the wireless communication device passively scans the respective second wireless channel for the third time period indicated by the home channel dwell time. At block 2308, the wireless communication device dwells on the first wireless channel for the fourth time period indicated by the off-channel scan time. At block 2310, the wireless communication device passively scans the respective second wireless channel for a fifth time period indicated by the home channel dwell time.

Figure 24:
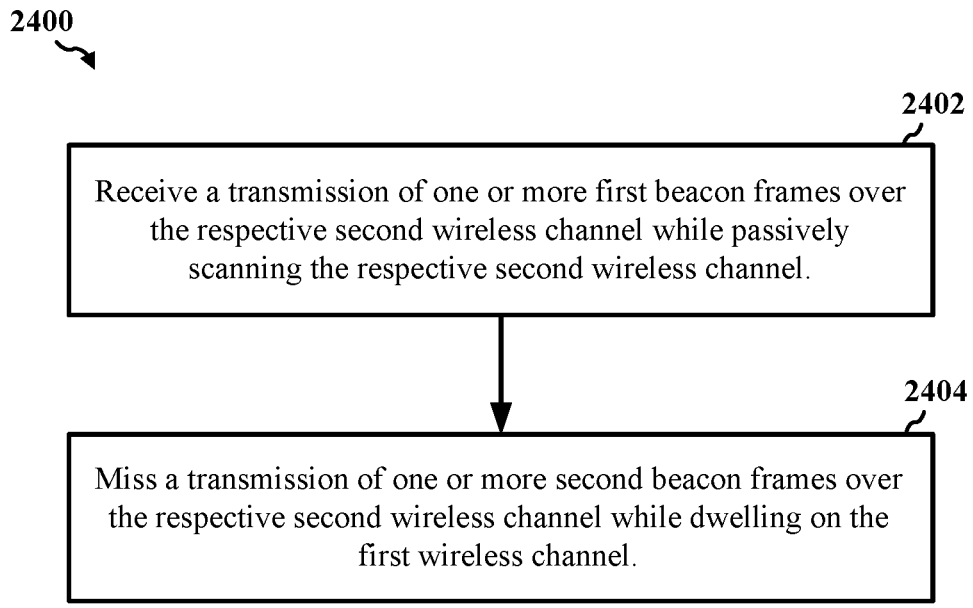
FIG. 24 shows a flowchart illustrating another example operation for wireless communication that supports passive scanning operations, according to some other implementations.

FIG. 24 shows a flowchart illustrating another example operation 2400 for wireless communication that supports passive scanning operations. The operation 2400 may be performed by an apparatus of a wireless communication device such as the wireless communication device 400 of FIG. 4. In some implementations, the operation 2400 may be performed by a wireless communication device operating as or within a STA, such as one of the STAs 104 and 504 described above with reference to FIGS. 1 and 5B, respectively. In some instances, the operation 2400 may be performed after the example operation 1900 of FIG. 19. For example, at block 2402, the wireless communication device receives a transmission of one or more first beacon frames over the respective second wireless channel while passively scanning the respective second wireless channel. At block 2404, the wireless communication device misses transmission of one or more second beacon frames over the respective second wireless channel while dwelling on the first wireless channel.

Figure 25:
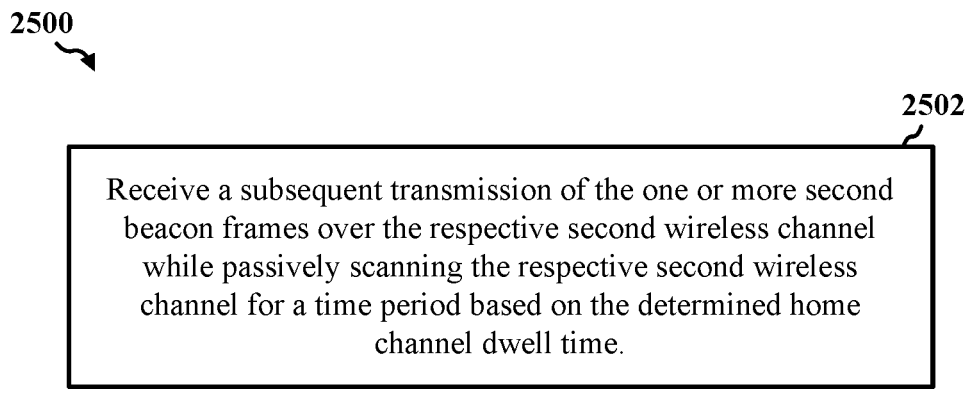
FIG. 25 shows a flowchart illustrating another example operation for wireless communication that supports passive scanning operations, according to some other implementations.

FIG. 25 shows a flowchart illustrating another example operation 2500 for wireless communication that supports passive scanning operations. The operation 2500 may be performed by an apparatus of a wireless communication device such as the wireless communication device 400 of FIG. 4. In some implementations, the operation 2500 may be performed by a wireless communication device operating as or within a STA, such as one of the STAs 104 and 504 described above with reference to FIGS. 1 and 5B, respectively. In some instances, the operation 2500 may be performed after the example operation 2400 of FIG. 24. For example, at block 2502, the wireless communication device receives a subsequent transmission of the one or more second beacon frames over the respective second wireless channel while passively scanning the respective second wireless channel for a time period based on the determined home channel dwell time.

When a wireless communication device switches its transmission and reception operations from a first wireless channel to a second wireless channel, the antenna elements and front-end circuitry of the wireless communication device may be adjusted to change the device's carrier frequency from a center frequency of the first wireless channel to a center frequency of the second wireless channel. Similarly, when the wireless communication device switches its transmission and reception operations from the second wireless channel to the first wireless channel, the antenna elements and front-end circuitry may be adjusted to return the device's carrier frequency from the second wireless channel to the first wireless channel. Adjusting the antenna elements and front-end circuitry of the wireless communication device to change the device's carrier frequency may introduce timing delays in a passive scanning operation. As such, it may be desirable to consider these timing delays when selecting or configuring a passive scanning operation for a particular application or a particular set of performance metrics.

Figure 26:
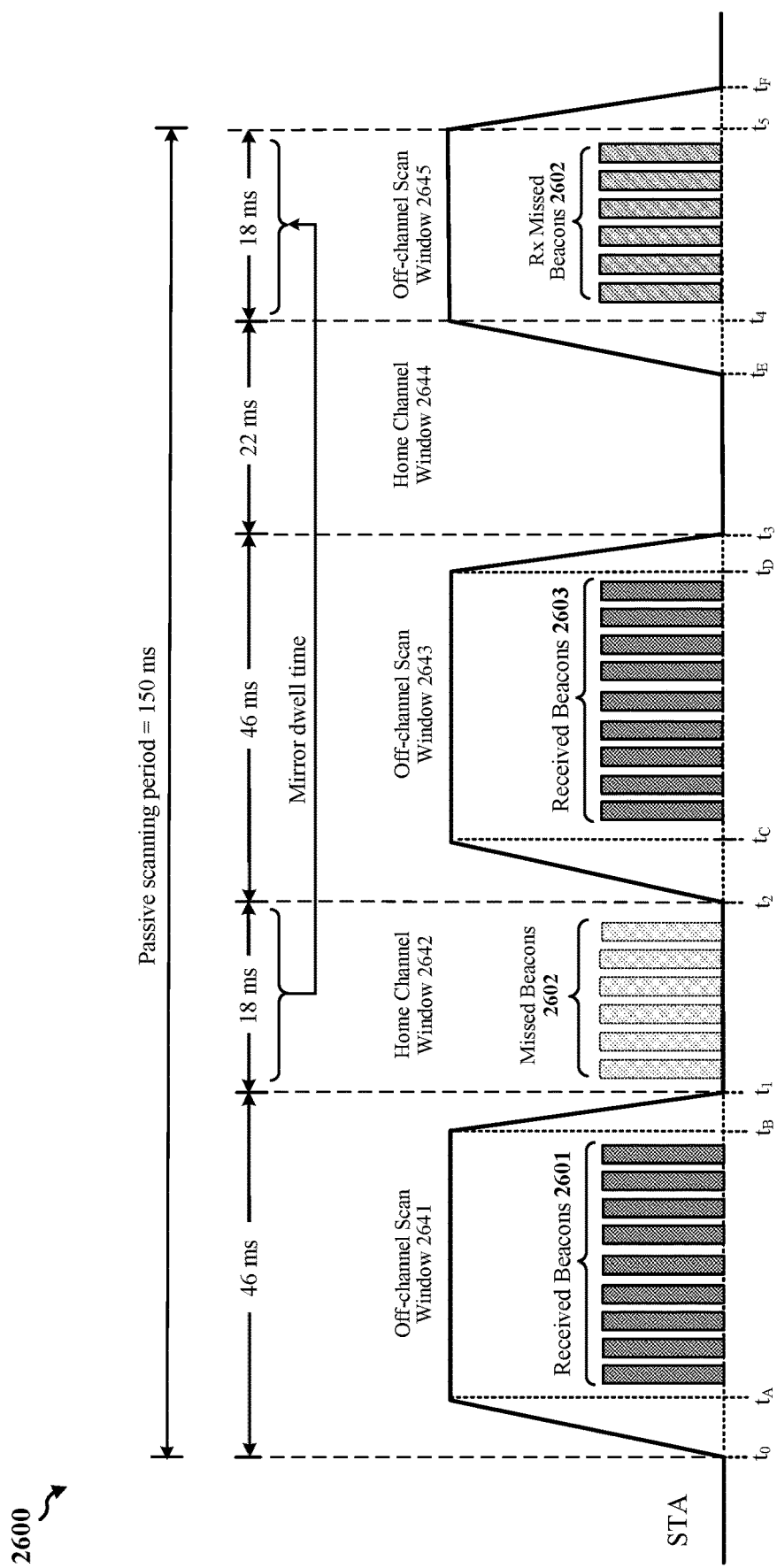
FIG. 26 shows a timing diagram illustrating another example passive scanning operation.

FIG. 26 shows a timing diagram illustrating another example passive scanning operation 2600. The operation 2600 may be performed by an apparatus of a wireless communication device such as the wireless communication device 400 described above with reference to FIG. 4. In some implementations, the operation 2600 may be performed by a wireless communication device operating as or within a STA, such as one of the STAs 104 and 504 described above with reference to FIGS. 1 and 5B, respectively. For purposes of illustration, the example operation 2600 is described below with reference to a STA.

The passive scanning operation 2600 is similar to the passive scanning operation 700D of FIG. 7D in many aspects, and also incorporates time delays associated with wireless communication devices (such as the STA) switching between wireless channels. In the example of FIG. 26, time delays associated with the STA switching from the first wireless channel to a respective second wireless channel may be represented as $t_{ch1 \to ch2}=5$ ms, and time delays associated with the STA switching from the respective second wireless channel to the first wireless channel may be represented as $t_{ch2 \to ch1}=3$ ms. In some other implementations, the time delays $t_{ch1 \to ch2}$ and $t_{ch2 \to ch1}$ may have other values.

The passive scanning operation 2600 is shown to include three off-channel scan windows 2641, 2643, and 2645 interleaved with two home channel dwell windows 2642 and 2644. The STA initially camps on the first wireless channel (also referred to herein as the home channel), and starts the passive scanning operation 2600 on the second wireless channel at time $t_0$. Specifically, the STA leaves the home channel at time $t_0$, switches to the second wireless channel at or before time $t_A$, and listens for beacon frames on the second wireless channel between times $t_A$ and $t_B$. The time period between to and $t_A$ may be indicative of time delays associated with the STA switching from the first wireless channel to the respective second wireless channel (such that $t_A - t_0 = t_{ch1 \to ch2}$). In the example of FIG. 26, the STA receives first beacon frames 2601 transmitted over the second wireless channel during the off-channel scan window 2641 between times $t_A$ and $t_B$.

At time $t_B$, the STA leaves the second wireless channel, switches to the home channel at or before time $t_1$, and dwells on the home channel during the home channel dwell window 2642. The time period between $t_B$ and $t_1$ may be indicative of time delays associated with the STA switching from the second wireless channel to the first wireless channel (such that $t_1 - t_B = t_{ch2 \to ch1}$). While dwelling on the home channel, the STA misses second beacon frames 2602 transmitted over the second wireless channel between times $t_1$ and $t_2$.

At time $t_2$, the STA leaves the home channel, switches to the second wireless channel at or before time $t_C$, and listens for beacon frames on the second wireless channel between times $t_C$ and $t_D$. The time period between $t_2$ and $t_C$ may be indicative of time delays associated with the STA switching from the first wireless channel to the respective second wireless channel (such that $t_C - t_2 = t_{ch1 \to ch2}$). In the example of FIG. 26, the STA receives third beacon frames 2603 transmitted over the second wireless channel between times $t_C$ and $t_D$.

At time $t_D$, the STA leaves the second wireless channel, switches to the home channel at or before time $t_3$, and dwells on the home channel during the home channel dwell window 2644. The time period between $t_3$ and $t_D$ may be indicative of time delays associated with the STA switching from the second wireless channel to the first wireless channel (such that $t_3 - t_D = t_{ch2 \to ch1}$).

At time $t_E$, the STA leaves the home channel, switches to the second wireless channel at or before time $t_4$, and passively listens for beacon frames on the second wireless channel during the off-channel scan window 2645. The time period between $t_4$ and $t_D$ may be indicative of time delays associated with the STA switching from the first wireless channel to the respective second wireless channel (such that $t_4 - t_E = t_{ch1 \to ch2}$). The STA receives a subsequent transmission of the third beacon frames 2603 over the second wireless channel between times $t_4$ and $t_5$. At time $t_5$, the STA leaves the second wireless channel, switches to the home channel at or before time $t_F$, and concludes the passive scanning operation 2600.

In some implementations, the passive scanning operation 2600 may have a scanning period of 150 TUs, the first off-channel scan window 2641 may have a duration of 46 ms, the first home channel dwell window 2642 may have a duration of 18 ms, the second off-channel scan window 2643 may have a duration of 46 ms, the second home channel dwell window 2644 may have a duration of 22 ms, and the third off-channel scan window 2645 may have a duration of 18 ms. In some instances, the scanning period of 150 TUs may be specified by a low-latency application, and the time periods for the scan windows 2461, 2643, 2645 and the dwell windows 2644 and 2644 may be selected in response to the specified scanning period. For example, the 46 ms duration selected for the first off-channel scan window 2641 may be based on a number of beacon frames transmitted over the second wireless channel during an initial portion of a beacon interval. The 18 ms duration selected for the first home channel dwell window 2642 may be based on the number of beacon frames transmitted over the second wireless channel during a remaining portion of the beacon interval. The 46 ms duration selected for the second off-channel scan window 2643 may be based at least in part on the specified scanning period. The 22 ms duration selected for the second home channel dwell window 2644 also may be based at least in part on the specified scanning period. The 18 ms duration for the third off-channel scan window 2645 may be the same as the 18 ms duration selected for the first home channel dwell window 2642. In some other implementations, the off-channel scan windows 2641, 2643, and 2645 and the home channel dwell windows 2642 and 2644 may have other durations.

Implementation examples are described in the following numbered clauses:

1. A method of wireless communication performed by an apparatus of a wireless communication device, including:
    configuring an off-channel scan time for one or more passive scanning operations to be less than or equal to a maximum off-channel scan duration permitted by a first wireless access point (AP) operating on a first wireless channel;
    selecting a home channel dwell time for the one or more passive scanning operations;
    configuring a scanning period of the one or more passive scanning operations to be less than or equal to a maximum scanning period permitted by the first AP; and
    performing the one or more passive scanning operations on one or more corresponding second wireless channels, each of the one or more passive scanning operations including:
    alternating between:
      listening for beacon frames on a respective second wireless channel for the configured off-channel scan time; and
      dwelling on the first wireless channel for the selected home channel dwell time during a first portion of the configured scanning period; and
    listening for beacon frames on the respective second wireless channel during a second portion of the configured scanning period, the second portion spanning a period of time defined by the selected home channel dwell time.
2. The method of clause 1, where the maximum off-channel scan duration and the maximum scanning period are specified by an off-channel scanning procedure associated with the first AP.

3. The method of clause 2, where the first wireless channel includes a home channel associated with an active real-time application specifying one or more low-latency requirements.
4. The method of any one or more of clauses 1-3, where the one or more second wireless channels include 16 dynamic frequency selection (DFS) channels in a 5 GHz frequency spectrum.
5. The method of any one or more of clauses 1-3, where the one or more second wireless channels include one or more preferred scanning channels (PSCs) in a 6 GHz frequency spectrum.
6. The method of any one or more of clauses 1-5, where each of the one or more second wireless channels occupies a unique frequency subband.
7. The method of any one or more of clauses 1-6, where the one or more second wireless channels are sequentially scanned using a same radio of the wireless communication device.
8. The method of any one or more of clauses 1-6, where the one or more second wireless channels are concurrently scanned using one or more corresponding radios of the wireless communication device.
9. The method of any one or more of clauses 1-8, further including:
    configuring each of a plurality of radios for the one or more passive scanning operations on a corresponding second wireless channel; and
    passively scanning each of the one or more second wireless channels using a respective radio of the plurality of configured radios, concurrently.
10. The method of clause 9, where a first radio of the plurality of radios is tuned to the home channel prior to performing the one or more passive scanning operations, and a second radio of the plurality of radios is tuned to another home channel prior to performing the one or more passive scanning operations.
11. The method of clause 9, where a first radio of the plurality of radios is tuned to the home channel prior to performing the one or more passive scanning operations, and a second radio of the plurality of radios is in a sleep state prior to performing the one or more passive scanning operations.
12. The method of clause 9, further including synchronizing the plurality of configured radios with one another.
13. The method of any one or more of clauses 1-12, where the alternating between includes:
    passively scanning the respective second wireless channel during a first time period defined by the configured off-channel scan time;
    dwelling on the first wireless channel during a second time period defined by the selected home channel dwell time;
    passively scanning the respective second wireless channel during a third time period defined by the configured off-channel scan time; and
    dwelling on the first wireless channel during a fourth time period defined by the selected home channel dwell time.
14. The method of clause 13, where the listening includes:
    passively scanning the respective second wireless channel during a fifth time period defined by the selected home channel dwell time.
15. The method of clause 14, where the fifth time period is configured to begin one beacon interval after a beginning of the second time period.
16. The method of any one or more of clauses 13-15, further including:
    receiving a transmission of a first group of beacon frames over the respective second wireless channel during the first time period;
    missing a transmission of a second group of beacon frames over the respective second wireless channel during the second time period;
    receiving a transmission of a third group of beacon frames over the respective second wireless channel during the third time period; and
    receiving a subsequent transmission of the second group of beacon frames over the respective second wireless channel during the fifth time period.
17. The method of any one or more of clauses 14-16, further including:
    initializing a timer to a value indicative of a beacon interval of a second AP operating on the respective second wireless channel;
    initiating a countdown of the timer at a beginning of the second time period; and
    passively scanning the respective second wireless channel at a beginning of the fifth time period based on the timer reaching a zero value.
18. The method of any one or more of clauses 14-17, where the fifth time period is configured for receiving one or more beacon frames over the respective second wireless channel that were missed by the wireless communication device while dwelling on the first wireless channel during the second time period.
19. The method of any one or more of clauses 1-18, where the maximum scanning period is approximately 160 milliseconds (ms), and the maximum off-channel scan time is approximately 45 ms.
20. The method of any one or more of clauses 1-19, where the configured off-channel scan time is approximately 40 ms, and the selected home channel dwell time is approximately 30 ms.
21. The method of any one or more of clauses 1-19, where the configured off-channel scan time is approximately 45 ms, and the selected home channel dwell time is approximately 20 ms.
22. The method of any one or more of clauses 1-19, where the configured off-channel scan time is approximately 47.5 ms, and the selected home channel dwell time is approximately 15 ms.
23. A method of wireless communication performed by an apparatus of a wireless communication device, including:
    selecting a home channel dwell time for one or more passive scanning operations;
    configuring an off-channel scan time for a first passive scanning operation to be less than or equal to a maximum off-channel scan duration permitted by a first wireless access point (AP) operating on a first wireless channel;
    performing one or more first passive scanning operations on one or more corresponding second wireless channels, each of the one or more first passive scanning operations including:
    alternating between:
    listening for beacon frames on a respective second wireless channel for the configured off-channel scan time; and
    dwelling on the first wireless channel for the selected home channel dwell time; and performing a second passive scanning operation on each respective second wireless channel, the second passive scanning operation including:
  dwelling on the first wireless channel for the configured off-channel scan time; and
  listening for beacon frames on the respective second wireless channel for the selected home channel dwell time.
24. The method of clause 23, where the maximum off-channel scan duration is specified by an off-channel scanning procedure associated with a real-time gaming application.
25. The method of clause 24, where the first wireless channel includes a home channel associated with the real-time gaming application.
26. The method of any one or more of clauses 23-25, where the one or more second wireless channels includes 16 dynamic frequency selection (DFS) channels in a 5 GHz frequency spectrum.
27. The method of any one or more of clauses 23-25, where the one or more second wireless channels include one or more preferred scanning channels (PSCs) in a 6 GHz frequency spectrum.
28. The method of any one or more of clauses 23-27, where each of the one or more second wireless channels occupies a unique frequency subband and is associated with a different AP.
29. The method of any one or more of clauses 23-27, where each of the one or more first passive scanning operations has a first scanning period of approximately 110 ms, and the second passive scanning operation has a second scanning period of approximately 70 ms.
30. The method of clause 29, where the first and second scanning periods are less than a maximum scanning period permitted by the first AP.
31. The method of clause 30, where the maximum scanning period is approximately 160 milliseconds (ms).
32. The method of any one or more of clauses 30-31, where the configured off-channel scan time is approximately 40 ms, and the selected home channel dwell time is approximately 30 ms.
33. The method of clause 23, where the alternating includes:
  passively scanning the respective second wireless channel during a first time period defined by the configured off-channel scan time;
  dwelling on the first wireless channel during a second time period defined by the selected home channel dwell time; and
  passively scanning the respective second wireless channel during a third time period defined by the configured off-channel scan time.
34. The method of any one or more of clauses 23-33, where the second passive scanning operation is configured to discover one or more beacon frames missed by the wireless communication device while dwelling on the first wireless channel during a respective first passive scanning operation.
35. The method of any one or more of clauses 23-34, where performing a respective first passive scanning operation includes:
  receiving a transmission of a first group of beacon frames over the respective second wireless channel during a first time period defined by the configured off-channel scan time;
  missing a transmission of a second group of beacon frames over the respective second wireless channel during a second time period defined by the selected home channel dwell time; and
  receiving a transmission of a third group of beacon frames over the respective second wireless channel during a third time period defined by the configured off-channel scan time.
36. The method of clause 35, where performing the second passive scanning operation includes:
  dwelling on the first wireless channel for a fourth time period defined by the configured off-channel scan time; and
  receiving a subsequent transmission of the second group of beacon frames over the respective second wireless channel during a fifth time period defined by the selected home channel dwell time.
37. The method of any one or more of clauses 23-36, further including:
  identifying a time period between a beginning of the respective first passive scanning operation and a beginning of the dwelling on the first wireless channel during the respective first passive scanning operation, where the selected home channel dwell time is defined by the identified time period.
38. The method of clause 23, further including:
  discovering one or more second APs operating on a corresponding second wireless channel during the respective first passive scanning operation; and
  determining an AP coverage level on the corresponding second wireless channel provided by the one or more discovered second APs before performing the second passive scanning operation.
39. The method of clause 38, where determining the AP coverage level includes:
  reporting the one or more discovered APs from a medium access control (MAC) layer of the wireless communication device to an application layer of the wireless communication device before performing the second passive scanning operation.
40. The method of clause 38 or clause 39, further including:
  performing the second passive scanning operation only when the determined AP coverage level is less than a value.
41. The method of clause 38 or clause 39, further including:
  refraining from performing the second passive scanning operation when the determined AP coverage level is greater than or equal to the value.
42. The method of any one or more of clauses 23-41, where the one or more second wireless channels are sequentially scanned using a same radio of the wireless communication device.
43. The method of any one or more of clauses 23-41, where the one or more second wireless channels are concurrently scanned using one or more corresponding radios of the wireless communication device.
44. The method of clause 42 or clause 43, further including recording, for each of the one or more second wireless channels:
  a first time at which the wireless communication device begins the dwelling on the first wireless channel during the first passive scanning operation; and
  a second time at which the wireless communication device ends the dwelling on the first wireless channel during the first passive scanning operation.
45. The method of clause 44, where a time period between the first time and the second time recorded for the first passive scanning operation defines a duration of the selected home channel dwell time for the second passive scanning operation.

46. A wireless communication device including:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to perform the method of any one or more of clauses 1-45.

47. A wireless communication device including means for performing the method of any one or more of clauses 1-45.

48. A wireless communication device, including:
   an interface; and
   a processing system coupled to the interface, the interface and the processing system configured to perform the method of any one or more of clauses 1-45.

49. A non-transitory computer-readable medium including instructions that, when executed by one or more processors of a wireless communication device, cause the wireless communication device to perform the operations of any one or more of clauses 1-45.

50. A method of wireless communication performed by an apparatus of a wireless communication device, including:
   obtaining a home channel dwell time for a first wireless channel;
   obtaining an off-channel scan time for passive scanning operations on one or more second wireless channels;
   performing a first passive scanning operation on each of the one or more second wireless channels, each of the first passive scanning operations including alternating between:
      dwelling on the first wireless channel for the home channel dwell time; and
      listening for beacon frames on a respective second wireless channel for the off-channel scan time; and
   performing a second passive scanning operation on each of the one or more second wireless channels, each of the second passive scanning operations including alternating between:
      listening for beacon frames on the respective second wireless channel for the home channel dwell time; and
      dwelling on the first wireless channel for the off-channel scan time.

51. The method of clause 50, where the second passive scanning operation is configured to discover one or more beacon frames missed by the wireless communication device while dwelling on the first wireless channel during the first passive scanning operation.

52. The method of any one or more of clauses 50-51, where the first wireless channel includes a home channel associated with low-latency traffic or low-latency wireless communication devices.

53. The method of any one or more of clauses 50-52, where the first wireless channel includes a home channel associated with an automotive infotainment system.

54. The method of any one or more of clauses 50-53, where the one or more second wireless channels include one or more dynamic frequency selection (DFS) channels in a 5 GHz frequency spectrum.

55. The method of any one or more of clauses 50-53, where the one or more second wireless channels include one or more preferred scanning channels (PSCs) in a 6 GHz frequency spectrum.

56. The method of any one or more of clauses 50-55, where each of the one or more second wireless channels occupies a unique frequency subband and is associated with a different AP.

57. The method of any one or more of clauses 50-56, where a scanning period of the first and second passive scanning operations is based on a beacon interval of an access point operating on a respective second wireless channel.

58. The method of any one or more of clauses 50-56, where a scanning period of the first and second passive scanning operations is approximately 100 time units (TUs).

59. The method of any one or more of clauses 50-58, where the obtained home channel dwell time is approximately 20 milliseconds (ms), and the obtained off-channel scan time is approximately 20 ms.

60. The method of any one or more of clauses 50-59, where at least one of the home channel dwell time or the off-channel scan time is obtained from an application layer of the wireless communication device.

61. The method of any one or more of clauses 50-59, where a duration of at least one of the home channel dwell time or the off-channel scan time is based on one or more of a quality-of-service (QoS), a traffic class, a traffic identifier (TID), or an access category (AC) of low-latency traffic received by or transmitted from the wireless communication device.

62. The method of any one or more of clauses 50-61, where alternating between the dwelling and the listening during the first passive scanning operation includes:
   dwelling on the first wireless channel for a first time period indicated by the home channel dwell time;
   passively scanning the respective second wireless channel for a second time period indicated by the off-channel scan time;
   dwelling on the first wireless channel for a third time period indicated by the home channel dwell time;
   passively scanning the respective second wireless channel for a fourth time period indicated by the off-channel scan time; and
   dwelling on the first wireless channel for a fifth time period indicated by the home channel dwell time.

63. The method of clause 62, where alternating between the dwelling and the listening during the second passive scanning operation includes:
   passively scanning the respective second wireless channel for the first time period indicated by the home channel dwell time;
   dwelling on the first wireless channel for the second time period indicated by the off-channel scan time;
   passively scanning the respective second wireless channel for the third time period indicated by the home channel dwell time;
   dwelling on the first wireless channel for the fourth time period indicated by the off-channel scan time; and
   passively scanning the respective second wireless channel for a fifth time period indicated by the home channel dwell time.

64. The method of clause 1, where performing the first passive scanning operation includes:

receiving a transmission of one or more first beacon frames over the respective second wireless channel while passively scanning the respective second wireless channel; and missing a transmission of one or more second beacon frames over the respective second wireless channel while dwelling on the first wireless channel.

65. The method of clause 64, where performing the second passive scanning operation includes:

receiving a subsequent transmission of the one or more second beacon frames over the respective second wireless channel while passively scanning the respective second wireless channel for a time period based on the determined home channel dwell time.

66. The method of any one or more of clauses 50-65, where at least one of the home channel dwell times partially overlaps a respective off-channel scan time.

67. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 50-66.

68. A wireless communication device, including:
an interface; and
a processing system coupled to the interface, the interface and the processing system configured to perform the method of any one or more of clauses 50-66.

69. A non-transitory computer-readable medium including instructions that, when executed by one or more processors of a wireless communication device, cause the wireless communication device to perform the operations of any one or more of clauses 50-66.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication performed by an apparatus of a wireless communication device, comprising:
configuring an off-channel scan time for one or more passive scanning operations to be less than or equal to a maximum off-channel scan duration permitted by a first wireless access point (AP) operating on a first wireless channel;
selecting a home channel dwell time for the one or more passive scanning operations;
configuring a scanning period of the one or more passive scanning operations to be less than or equal to a maximum scanning period permitted by the first wireless AP; and
performing the one or more passive scanning operations on one or more corresponding second wireless channels, each of the one or more passive scanning operations comprising:
alternating between:
listening for beacon frames on a respective second wireless channel for the configured off-channel scan time;
dwelling on the first wireless channel for the selected home channel dwell time during a first portion of the configured scanning period; and
listening for beacon frames on the respective second wireless channel during a second portion of the configured scanning period, the second portion spanning a period of time defined by the selected home channel dwell time.

2. The method of claim 1, wherein the alternating between comprises:

passively scanning the respective second wireless channel during a first time period defined by the configured off-channel scan time;

dwelling on the first wireless channel during a second time period defined by the selected home channel dwell time;

passively scanning the respective second wireless channel during a third time period defined by the configured off-channel scan time; and dwelling on the first wireless channel during a fourth time period defined by the selected home channel dwell time.

3. The method of claim 2, wherein the listening for beacon frames on the respective second wireless channel during the second portion of the configured scanning period comprises:

passively scanning the respective second wireless channel during a fifth time period defined by the selected home channel dwell time.

4. The method of claim 3, wherein the fifth time period is configured to begin one beacon interval after a beginning of the second time period.

5. The method of claim 3, further comprising:

receiving a transmission of a first group of beacon frames over the respective second wireless channel during the first time period;

missing a transmission of a second group of beacon frames over the respective second wireless channel during the second time period;

receiving a transmission of a third group of beacon frames over the respective second wireless channel during the third time period; and receiving a subsequent transmission of the second group of beacon frames over the respective second wireless channel during the fifth time period.

6. The method of claim 5, further comprising:

initializing a timer to a value indicative of a beacon interval of a second AP operating on the respective second wireless channel;

initiating a countdown of the timer at a beginning of the second time period; and passively scanning the respective second wireless channel at a beginning of the fifth time period based on the timer reaching a zero value.

7. The method of claim 6, wherein the fifth time period is configured for receiving one or more beacon frames over the respective second wireless channel that were missed by the wireless communication device while dwelling on the first wireless channel during the second time period.

8. A method of wireless communication performed by an apparatus of a wireless communication device, comprising:

selecting a home channel dwell time for one or more passive scanning operations;

configuring an off-channel scan time for a first passive scanning operation to be less than or equal to a maximum off-channel scan duration permitted by a first wireless access point (AP) operating on a first wireless channel;

performing one or more first passive scanning operations on one or more corresponding second wireless channels, each of the one or more first passive scanning operations including:

alternating between:

listening for beacon frames on a respective second wireless channel for the configured off-channel scan time; and dwelling on the first wireless channel for the selected home channel dwell time; and performing a second passive scanning operation on each respective second wireless channel, the second passive scanning operation including:

dwelling on the first wireless channel for the configured off-channel scan time; and listening for beacon frames on the respective second wireless channel for the selected home channel dwell time.

9. The method of claim 8, further comprising:

discovering one or more second APs operating on a corresponding second wireless channel during a respective first passive scanning operation; and determining an AP coverage level on the corresponding second wireless channel provided by the one or more discovered second APs before performing the second passive scanning operation.

10. The method of claim 9, wherein determining the AP coverage level comprises:

reporting the one or more discovered second APs from a medium access control (MAC) layer of the wireless communication device to an application layer of the wireless communication device before performing the second passive scanning operation.

11. A wireless communication device, comprising:

at least one memory; and at least one processor communicatively coupled with the at least one memory, the at least one processor operable to cause the wireless communication device to:

configure an off-channel scan time for one or more passive scanning operations to be less than or equal to a maximum off-channel scan duration permitted by a first wireless access point (AP) operating on a first wireless channel;

select a home channel dwell time for the one or more passive scanning operations;

configure a scanning period of the one or more passive scanning operations to be less than or equal to a maximum scanning period permitted by the first wireless AP; and perform the one or more passive scanning operations on one or more corresponding second wireless channels, wherein, to perform each of the one or more passive scanning operations, the at least one processor is operable to cause the wireless communication device to alternate between:

listening for beacon frames on a respective second wireless channel for the configured off-channel scan time;

dwelling on the first wireless channel for the selected home channel dwell time during a first portion of the configured scanning period; and listening for beacon frames on the respective second wireless channel during a second portion of the configured scanning period, the second portion spanning a period of time defined by the selected home channel dwell time.

12. The wireless communication device of claim 11, wherein the maximum off-channel scan duration and the maximum scanning period are specified by an off-channel scanning procedure associated with the first wireless AP.

13. The wireless communication device of claim 11, wherein the first wireless channel comprises a home channel associated with an active real-time application specifying one or more low-latency requirements.

14. The wireless communication device of claim 11, wherein the one or more second wireless channels comprise 16 dynamic frequency selection (DFS) channels in a 5 GHz frequency spectrum.

15. The wireless communication device of claim 11, wherein the one or more second wireless channels comprise one or more preferred scanning channels (PSCs) in a 6 GHz frequency spectrum.

16. The wireless communication device of claim 15, wherein each of the one or more second wireless channels occupies a unique frequency subband.

17. The wireless communication device of claim 11, wherein the one or more second wireless channels are sequentially scanned using a same radio of the wireless communication device.

18. The wireless communication device of claim 11, wherein the one or more second wireless channels are concurrently scanned using one or more corresponding radios of the wireless communication device.

19. The wireless communication device of claim 18, wherein the at least one processor is further operable to cause the wireless communication device to:
configure each of a plurality of radios for the one or more passive scanning operations on a corresponding second wireless channel; and
passively scan each of the one or more second wireless channels using a respective radio of the plurality of configured radios, concurrently.

20. The wireless communication device of claim 19, wherein a first radio of the plurality of radios is tuned to the first wireless channel prior to performing the one or more passive scanning operations, the first wireless channel comprising a home channel, and a second radio of the plurality of radios is tuned to another home channel prior to performing the one or more passive scanning operations.

21. The wireless communication device of claim 19, wherein a first radio of the plurality of radios is tuned to the first wireless channel prior to performing the one or more passive scanning operations, the first wireless channel comprising a home channel, and a second radio of the plurality of radios is in a sleep state prior to performing the one or more passive scanning operations.

22. The wireless communication device of claim 19, wherein the at least one processor is further operable to cause the wireless communication device to:
synchronize the plurality of configured radios with one another.

23. The wireless communication device of claim 11, wherein the maximum scanning period is approximately 160 milliseconds (ms), and the maximum off-channel scan duration is approximately 45 ms.

24. The wireless communication device of claim 11, wherein the configured off-channel scan time is one of approximately 40 ms, approximately 45 ms, or approximately 47.5 ms, and the selected home channel dwell time is one of approximately 30 ms, approximately 20 ms, or approximately 15 ms.

25. A wireless communication device, comprising:
at least one memory; and
at least one processor communicatively coupled with the at least one memory, the at least one processor operable to cause the wireless communication device to:
select a home channel dwell time for one or more passive scanning operations;
configure an off-channel scan time for a first passive scanning operation to be less than or equal to a maximum off-channel scan duration permitted by a first wireless access point (AP) operating on a first wireless channel;
perform one or more first passive scanning operations on one or more corresponding second wireless channels, wherein, to perform each of the one or more first passive scanning operations, the at least one processor is operable to cause the wireless communication device to:
alternate between:
listening for beacon frames on a respective second wireless channel for the configured off-channel scan time; and
dwelling on the first wireless channel for the selected home channel dwell time; and
perform a second passive scanning operation on each respective second wireless channel, wherein, to perform the second passive scanning operation, the at least one processor is operable to cause the wireless communication device to:
dwell on the first wireless channel for the configured off-channel scan time; and
listen for beacon frames on the respective second wireless channel for the selected home channel dwell time.

26. The wireless communication device of claim 25, wherein the maximum off-channel scan duration is specified by an off-channel scanning procedure associated with a real-time gaming application and the first wireless channel comprises a home channel associated with the real-time gaming application.

27. The wireless communication device of claim 25, wherein the one or more second wireless channels comprise 16 dynamic frequency selection (DFS) channels in a 5 GHz frequency spectrum.

28. The wireless communication device of claim 25, wherein the one or more second wireless channels comprise one or more preferred scanning channels (PSCs) in a 6 GHz frequency spectrum, each of the one or more second wireless channels occupying a unique frequency subband and associated with a different AP.

29. The wireless communication device of claim 25, wherein each of the one or more first passive scanning operations has a first scanning period and the second passive scanning operation has a second scanning period, the first scanning period and the second scanning period being less than a maximum scanning period permitted by the first wireless AP.

30. The wireless communication device of claim 25, wherein, to alternate between the listening for the beacon frames and the dwelling on the first wireless channel, the at least one processor is further operable to cause the wireless communication device to:
passively scan the respective second wireless channel during a first time period defined by the configured off-channel scan time;
dwell on the first wireless channel during a second time period defined by the selected home channel dwell time; and
passively scan the respective second wireless channel during a third time period defined by the configured off-channel scan time.

* * * * *